July 18, 1950 G. E. FORD 2,515,995
PARTIAL PRODUCT MULTIPLYING MACHINE
Filed Sept. 4, 1947 28 Sheets-Sheet 4

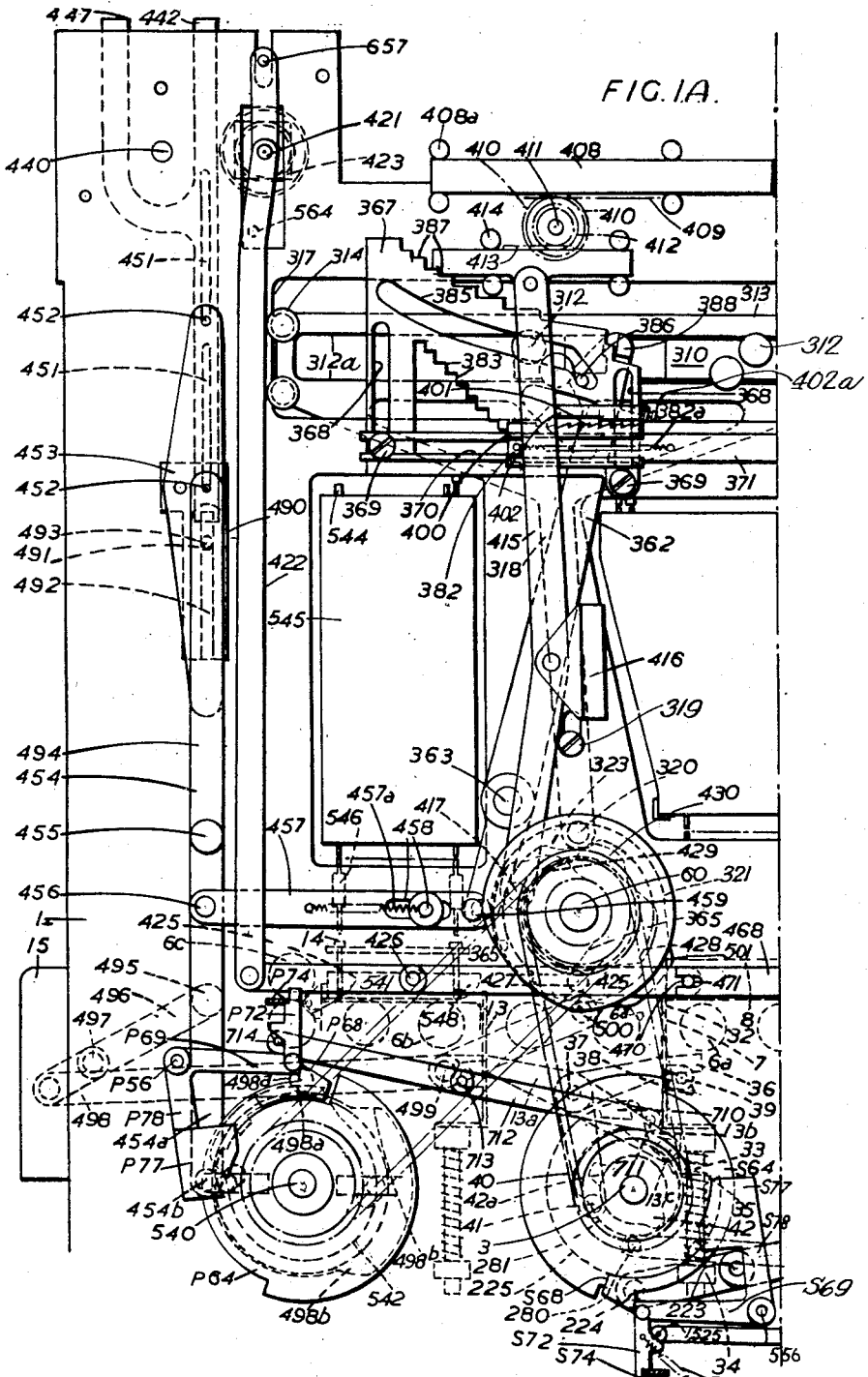
FIG. IA.
INVENTOR
GEORGE EDWARD FORD

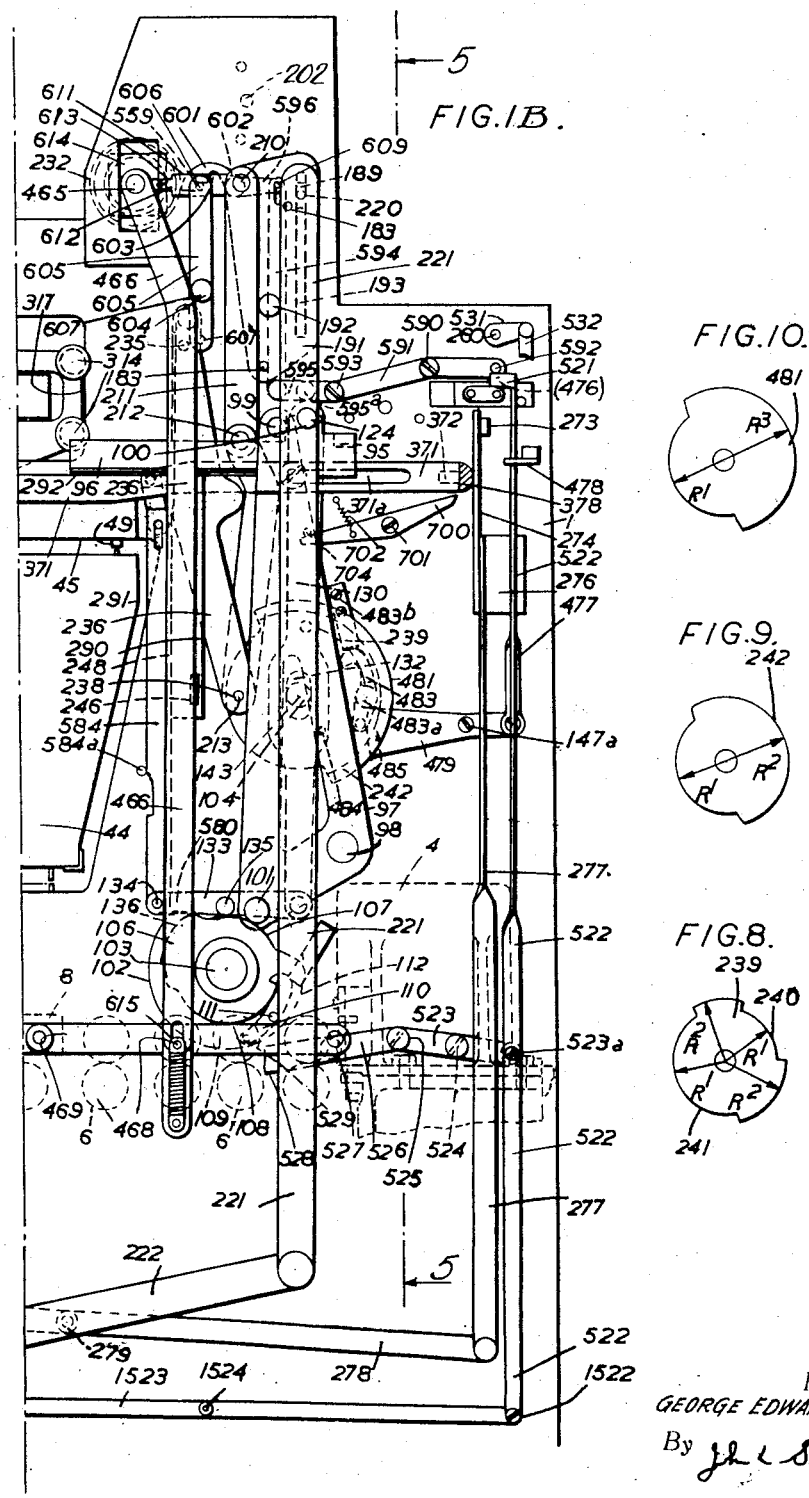

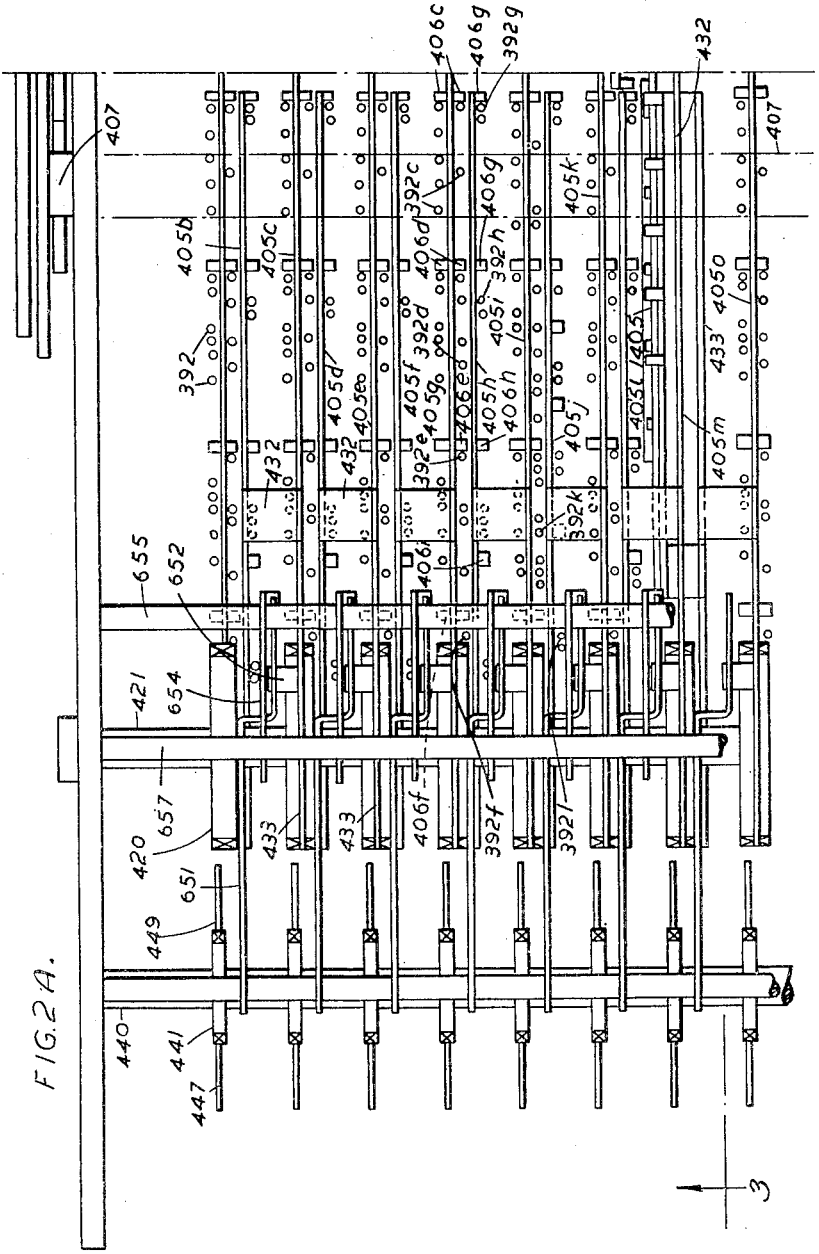

Inventor
GEORGE EDWARD FORD
By John L Sterling
Attorney

July 18, 1950
G. E. FORD
2,515,995
PARTIAL PRODUCT MULTIPLYING MACHINE
Filed Sept. 4, 1947
28 Sheets-Sheet 5
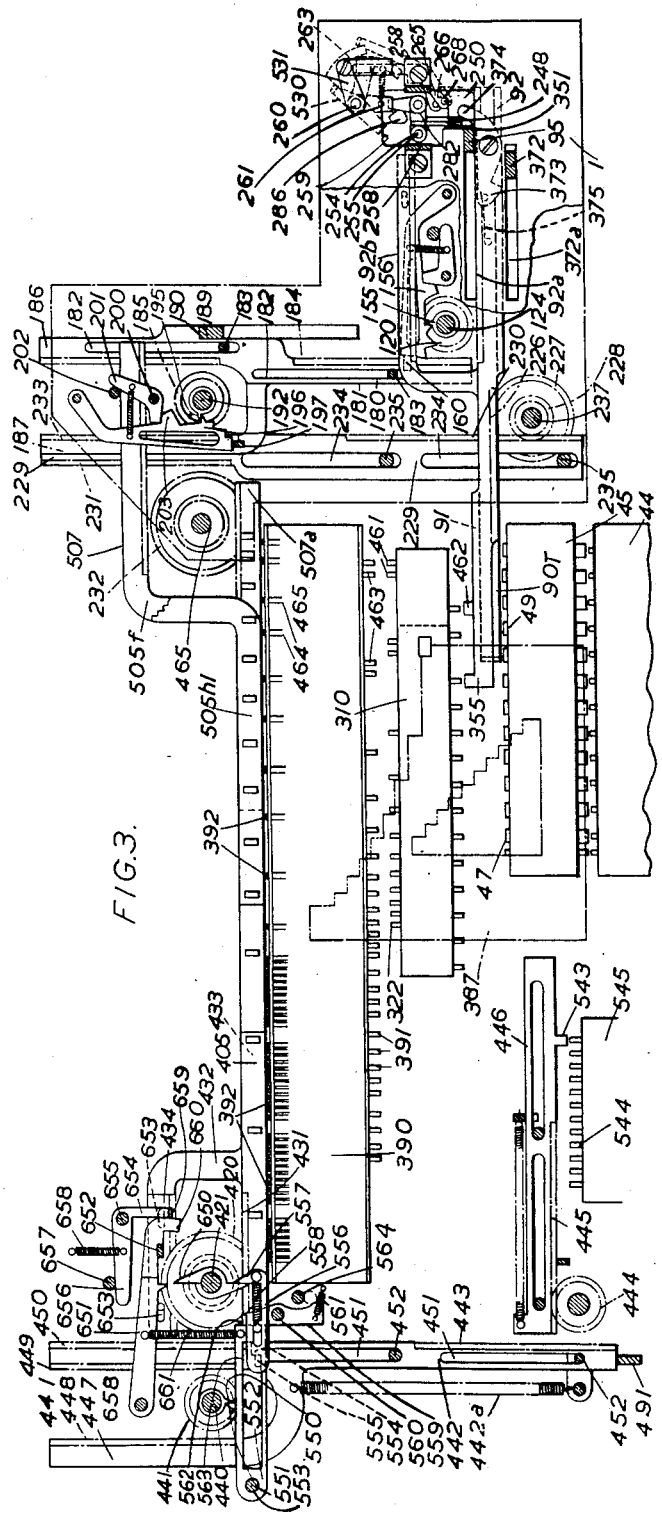
Inventor
GEORGE EDWARD FORD
By John L. Sterling
Attorney

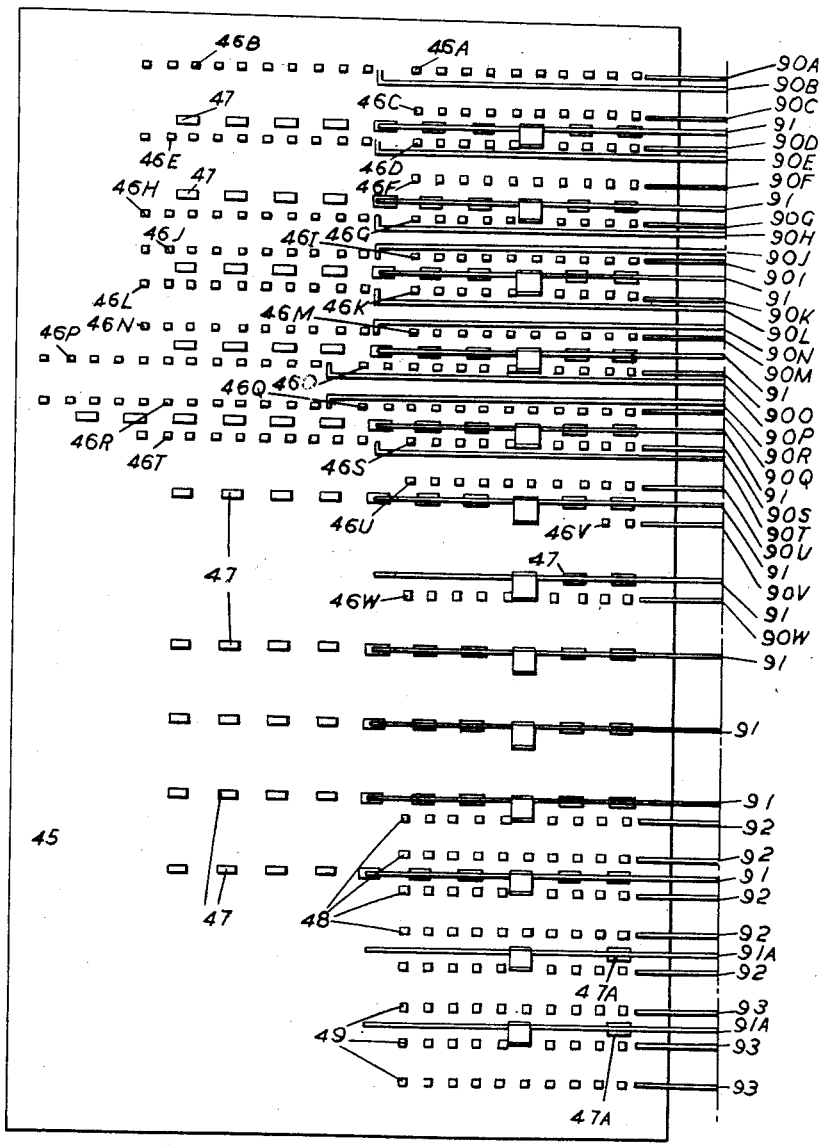

July 18, 1950 G. E. FORD 2,515,995
PARTIAL PRODUCT MULTIPLYING MACHINE
Filed Sept. 4, 1947 28 Sheets-Sheet 7
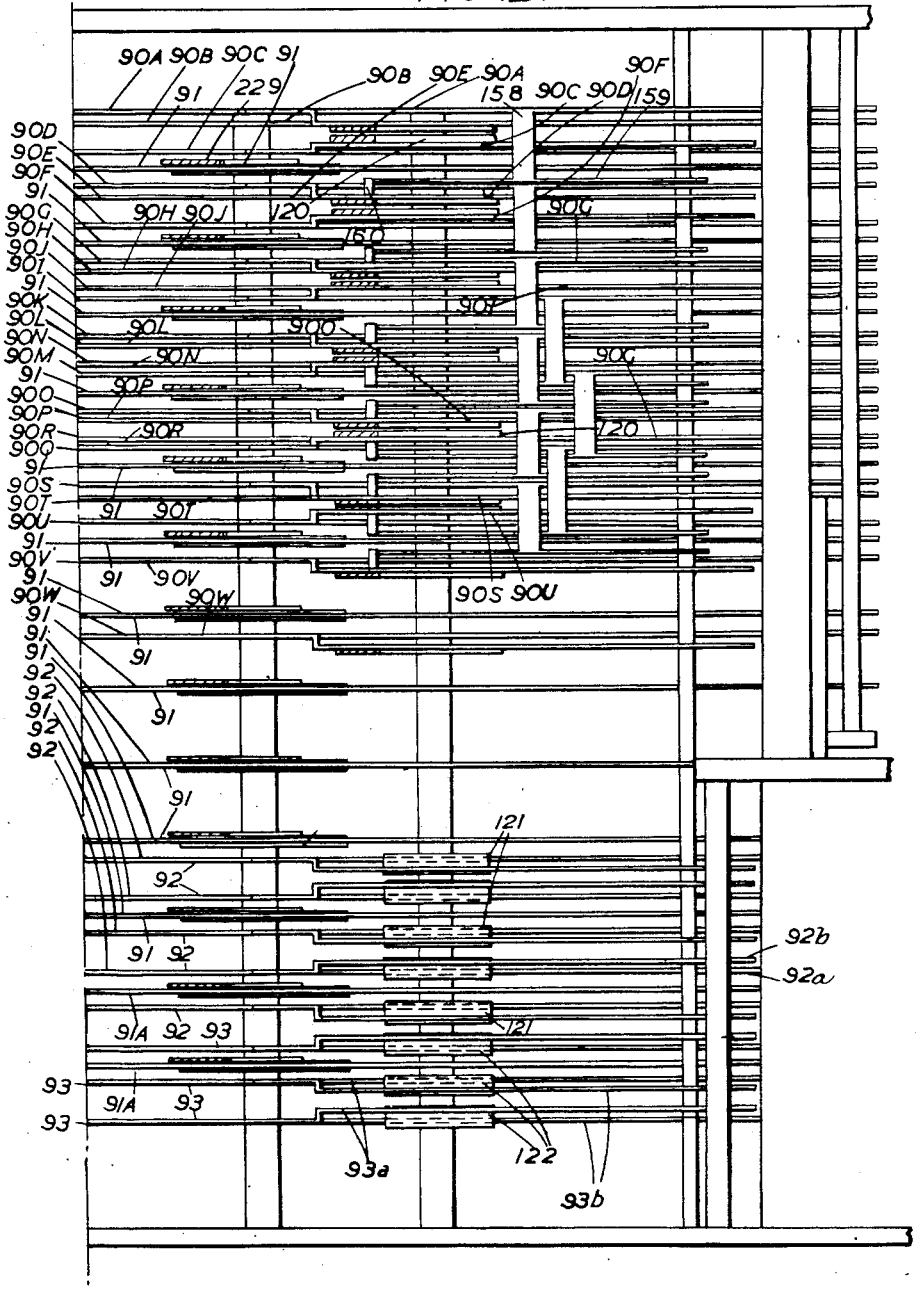
FIG.4.B.
Inventor
GEORGE EDWARD FORD
By John L Sterling
Attorney

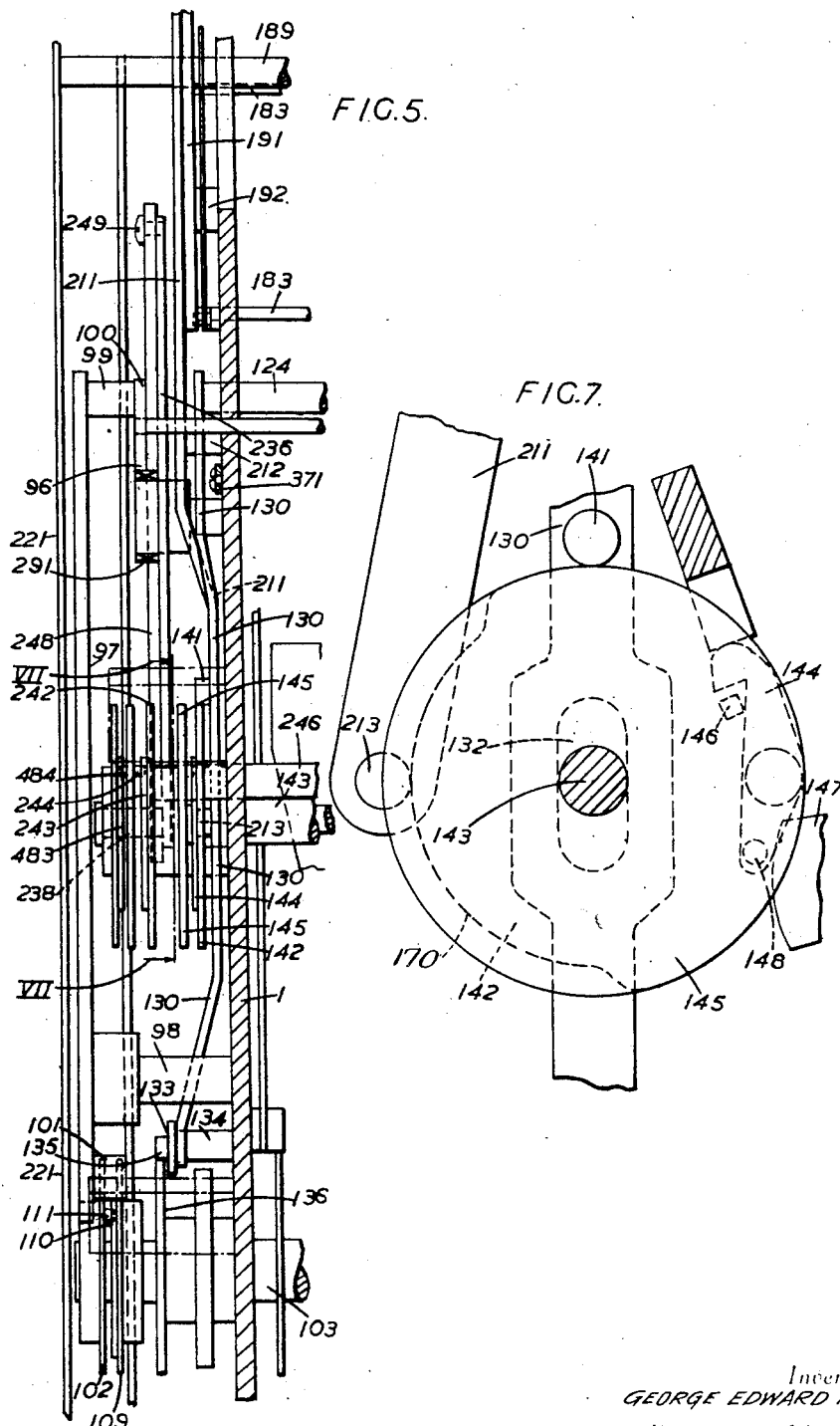

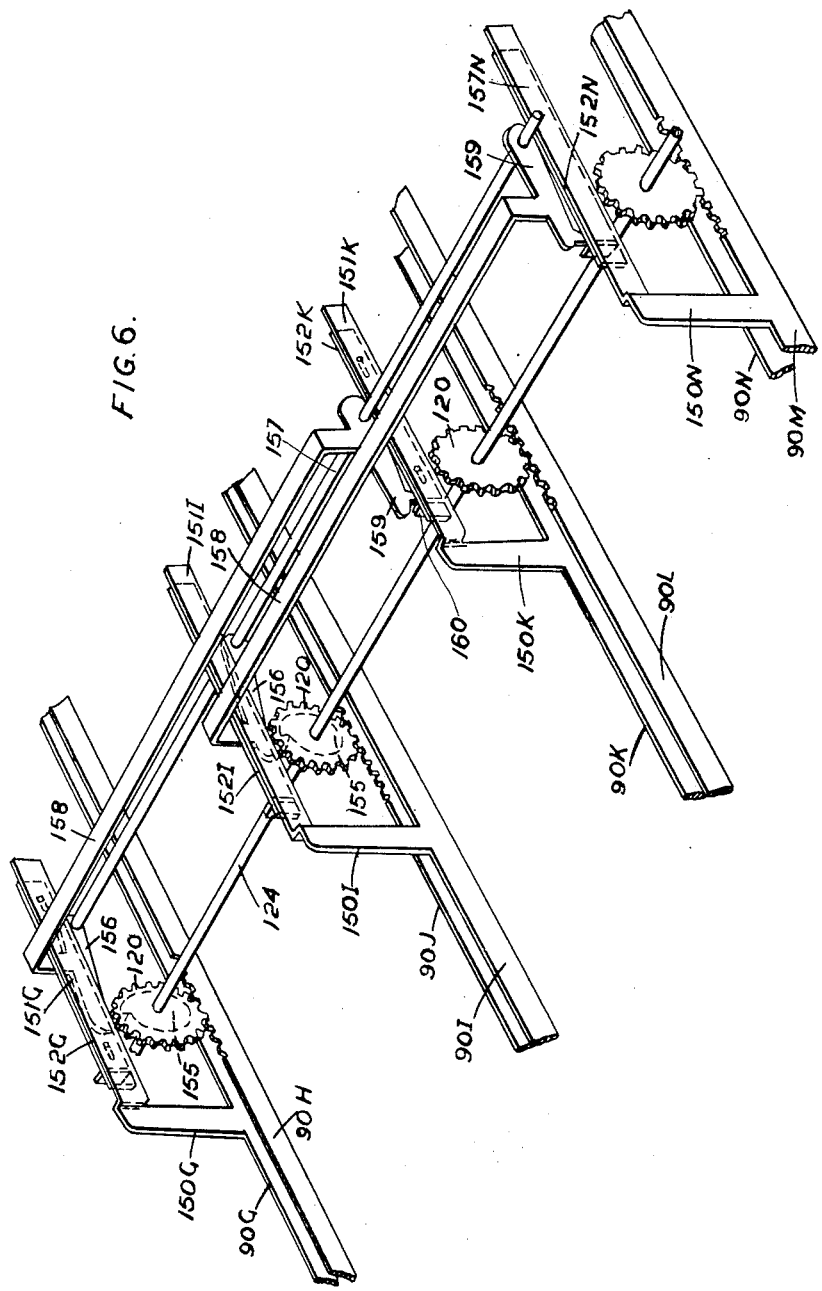

July 18, 1950  G. E. FORD  2,515,995
PARTIAL PRODUCT MULTIPLYING MACHINE
Filed Sept. 4, 1947  28 Sheets-Sheet 10
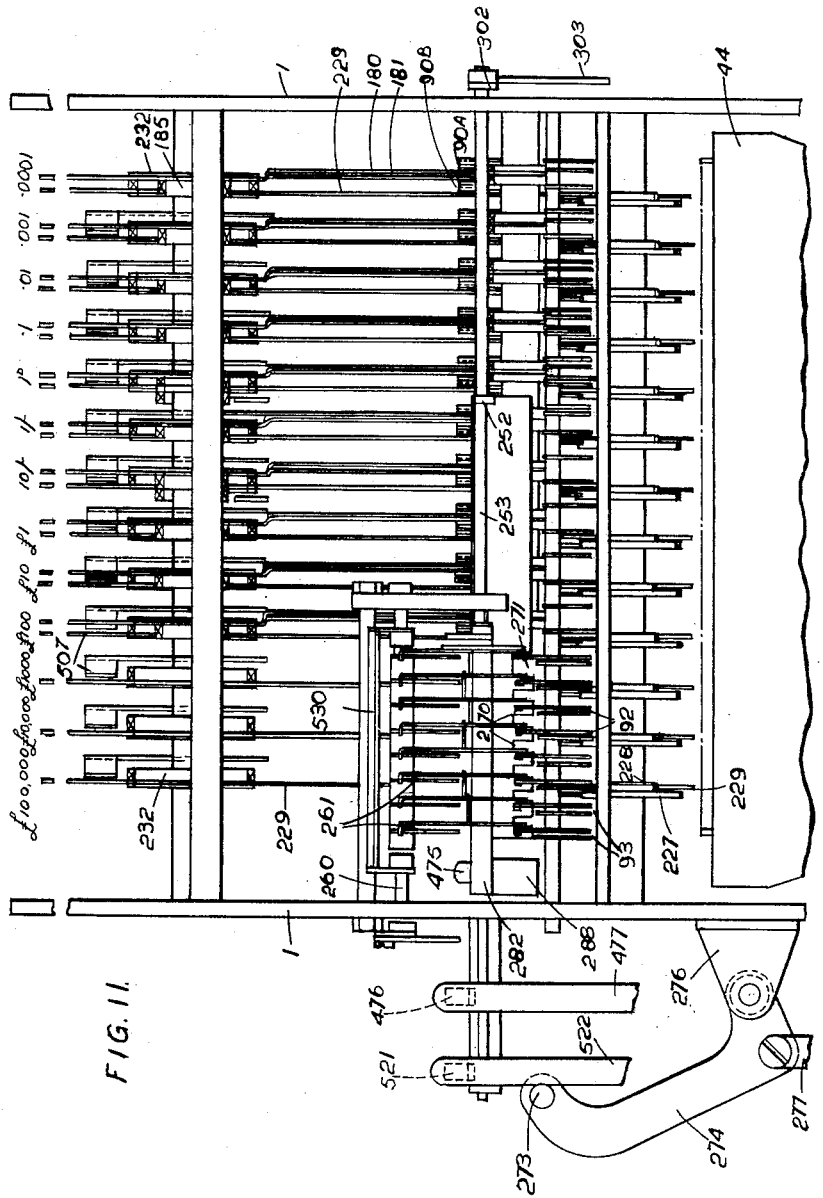
Inventor
GEORGE EDWARD FORD
By JL L Sterling
Attorney

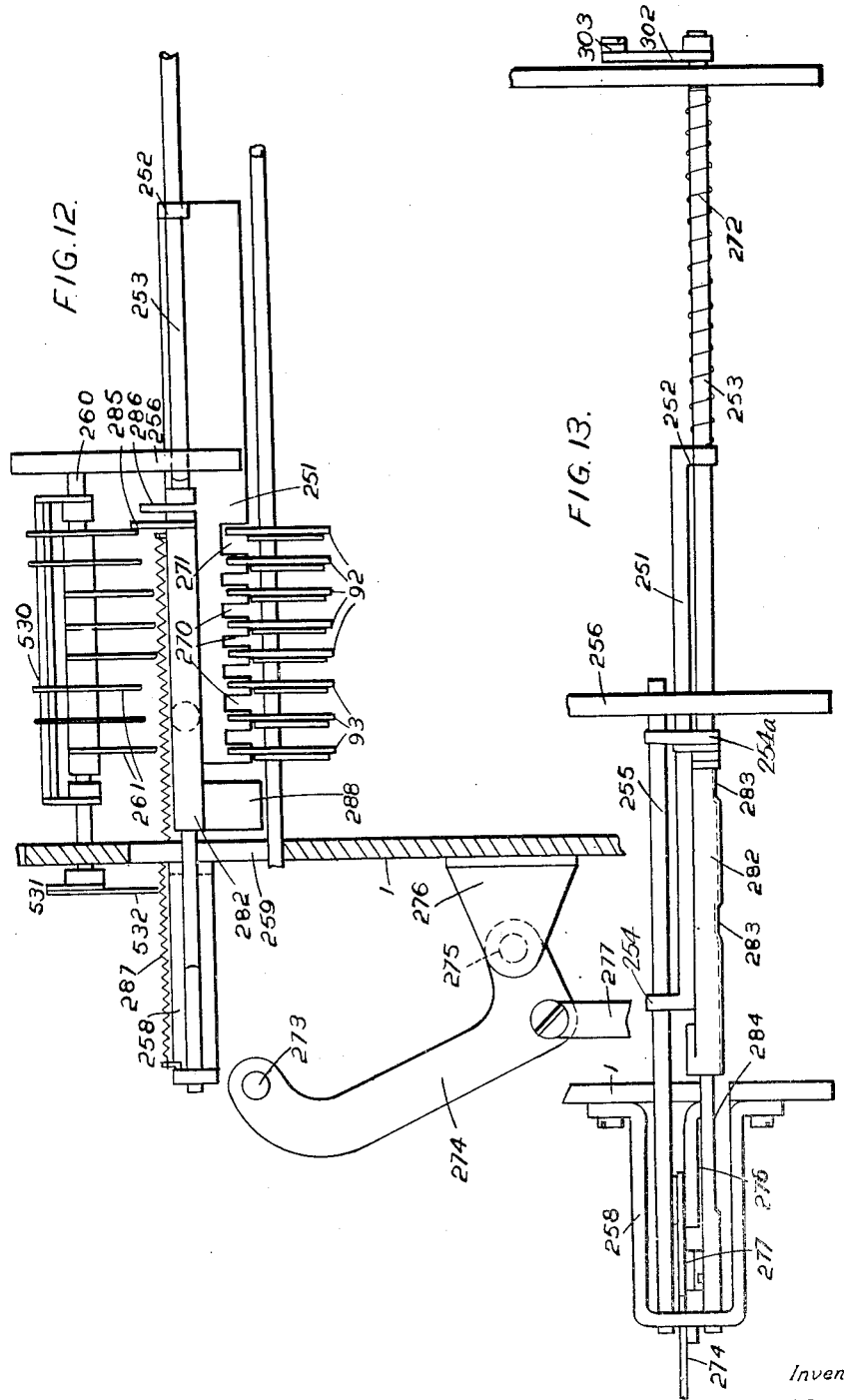

July 18, 1950 G. E. FORD 2,515,995
PARTIAL PRODUCT MULTIPLYING MACHINE
Filed Sept. 4, 1947 28 Sheets-Sheet 12

Inventor
GEORGE EDWARD FORD
By John L. Sterling
Attorney

July 18, 1950 G. E. FORD 2,515,995
PARTIAL PRODUCT MULTIPLYING MACHINE
Filed Sept. 4, 1947 28 Sheets-Sheet 13
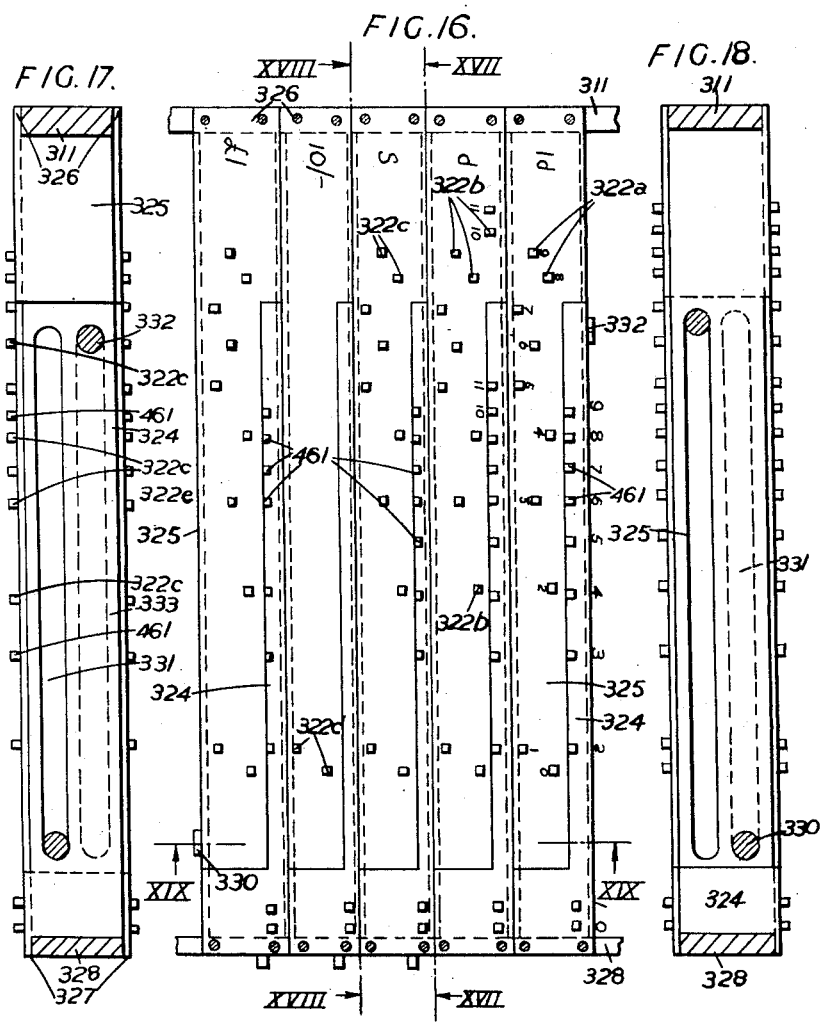
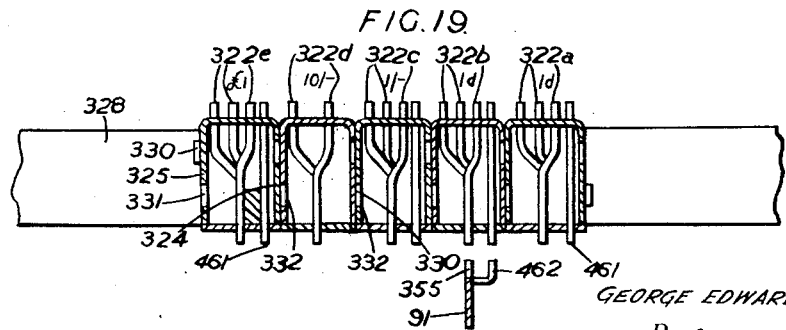
Inventor
GEORGE EDWARD FORD
By J. L. Sterling
Attorney

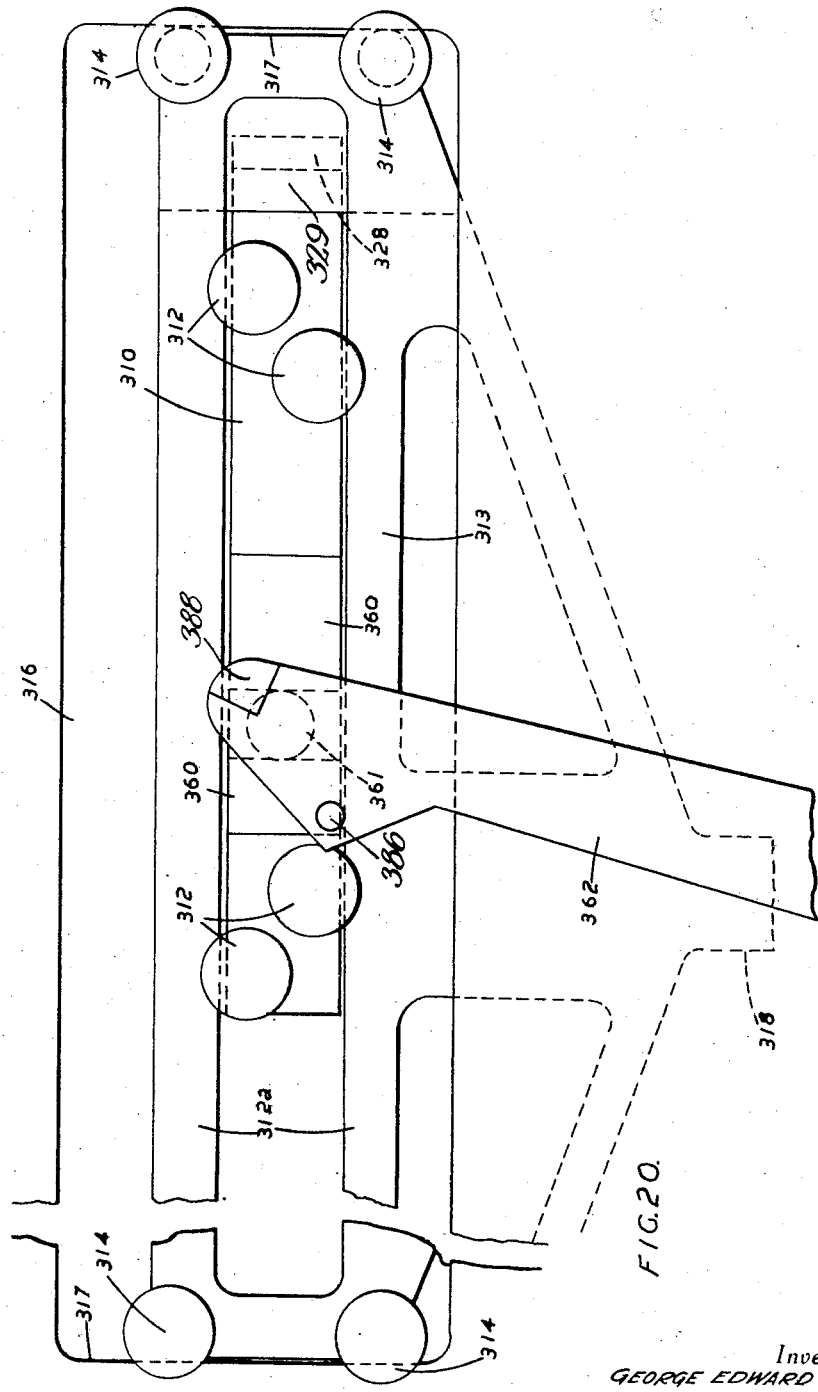

July 18, 1950 G. E. FORD 2,515,995
PARTIAL PRODUCT MULTIPLYING MACHINE
Filed Sept. 4, 1947 28 Sheets-Sheet 15
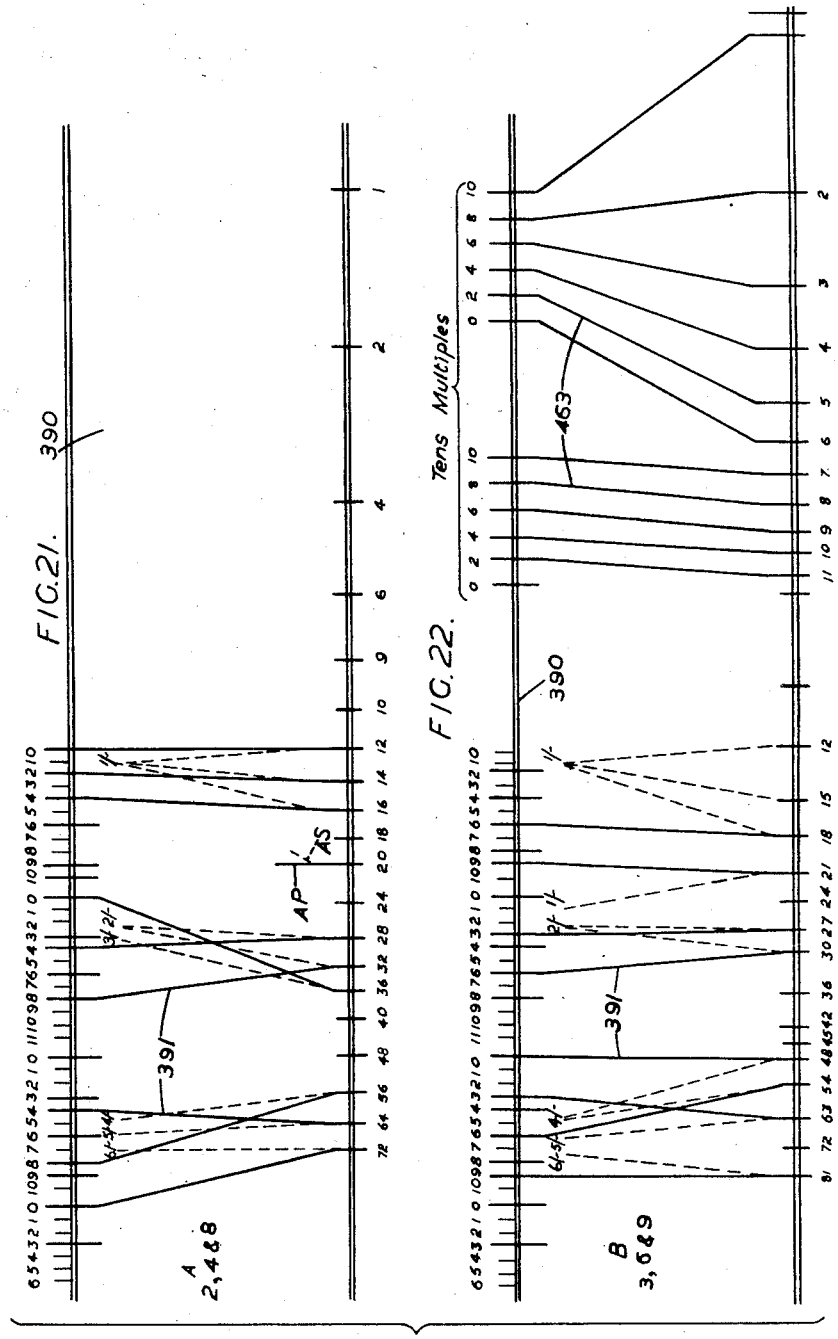
Inventor
GEORGE EDWARD FORD
Attorney July 18, 1950  G. E. FORD  2,515,995
PARTIAL PRODUCT MULTIPLYING MACHINE
Filed Sept. 4, 1947  28 Sheets-Sheet 16
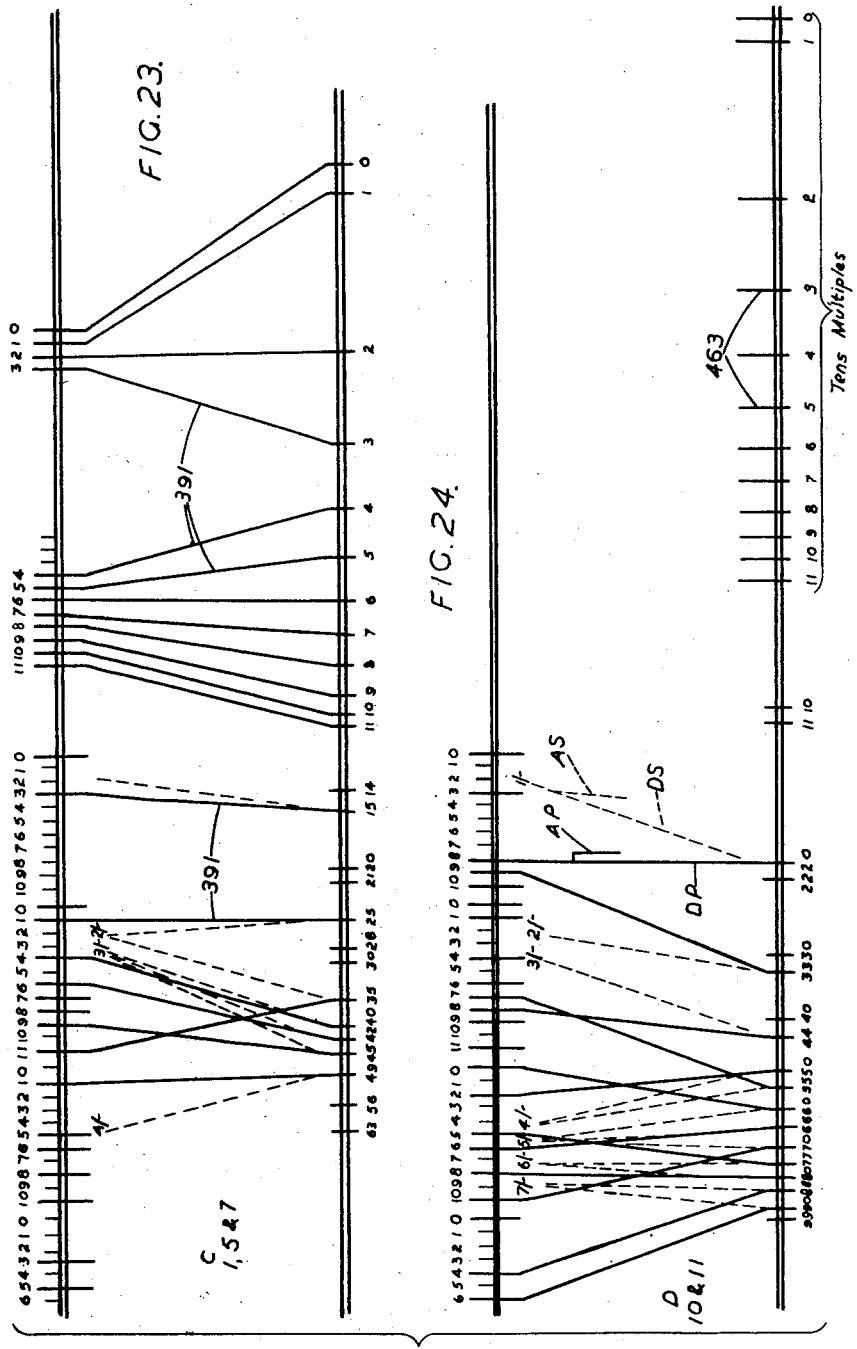
Inventor
GEORGE EDWARD FORD
By John L Sterling
Attorney July 18, 1950  G. E. FORD  2,515,995
PARTIAL PRODUCT MULTIPLYING MACHINE
Filed Sept. 4, 1947   28 Sheets-Sheet 17
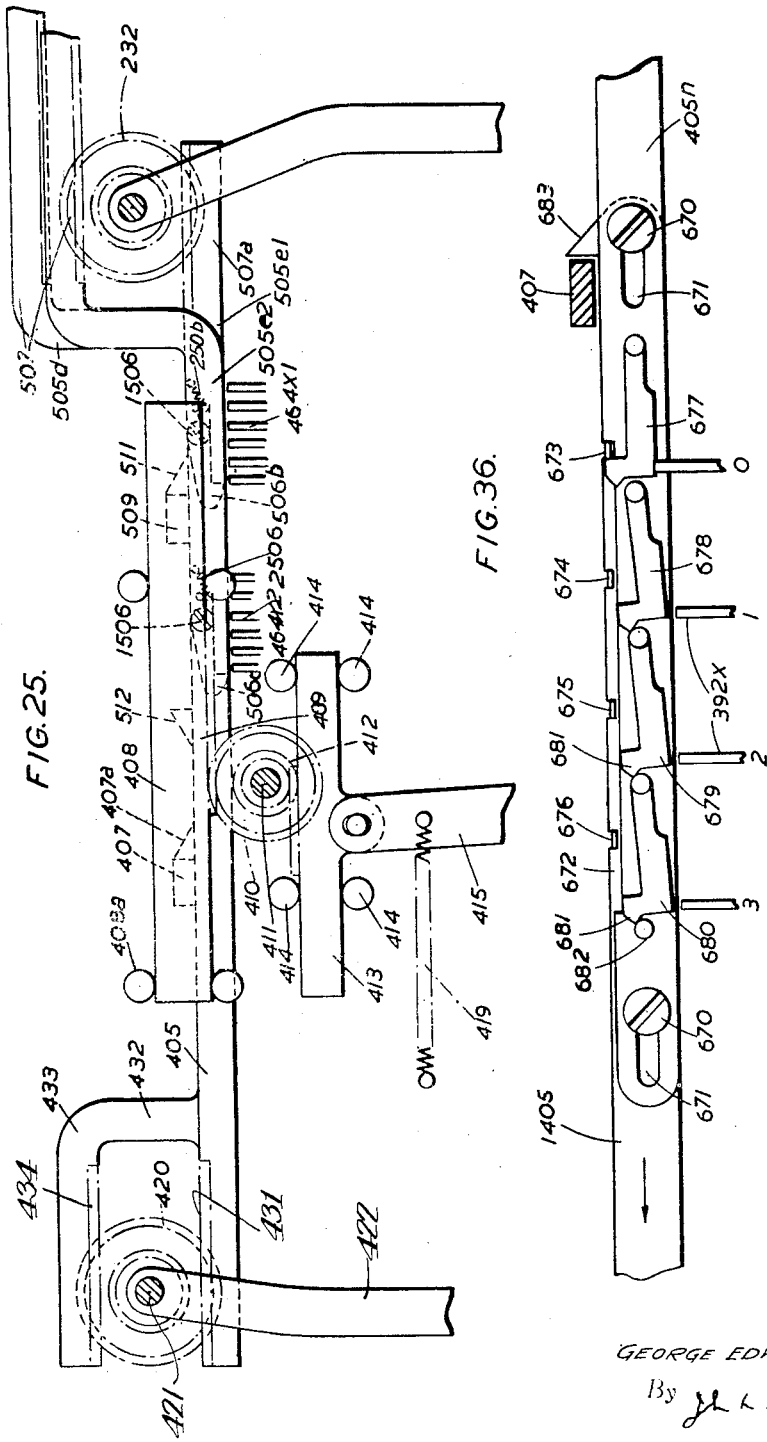
Inventor
GEORGE EDWARD FORD
By
Attorney

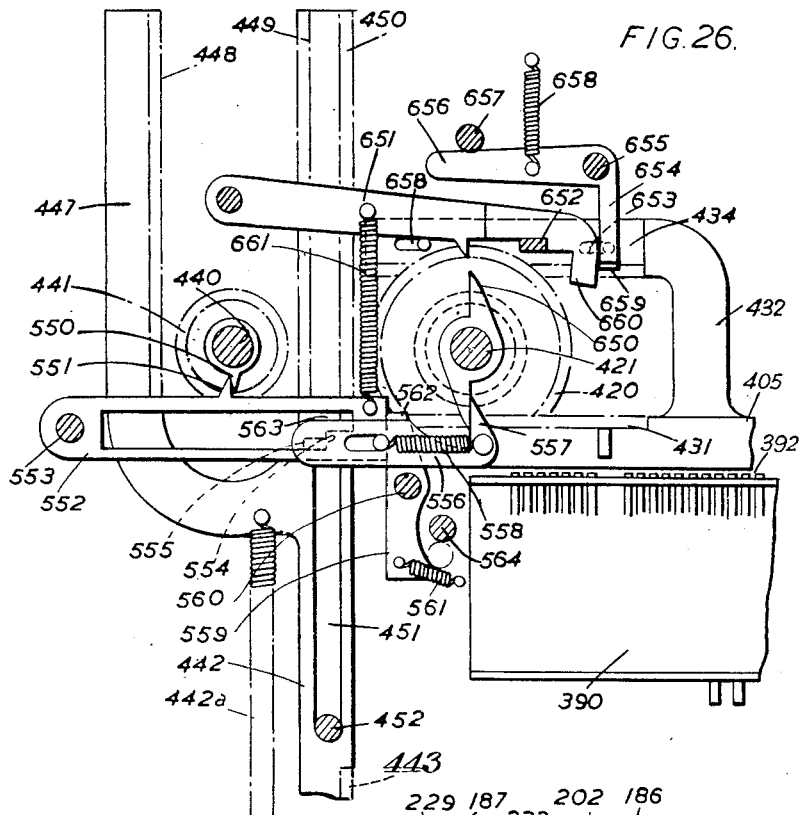
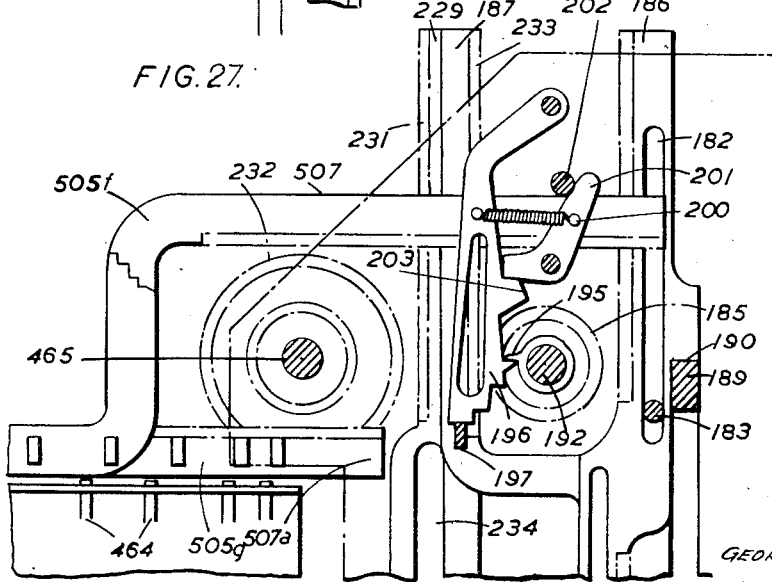

July 18, 1950 G. E. FORD 2,515,995
PARTIAL PRODUCT MULTIPLYING MACHINE
Filed Sept. 4, 1947 28 Sheets-Sheet 19
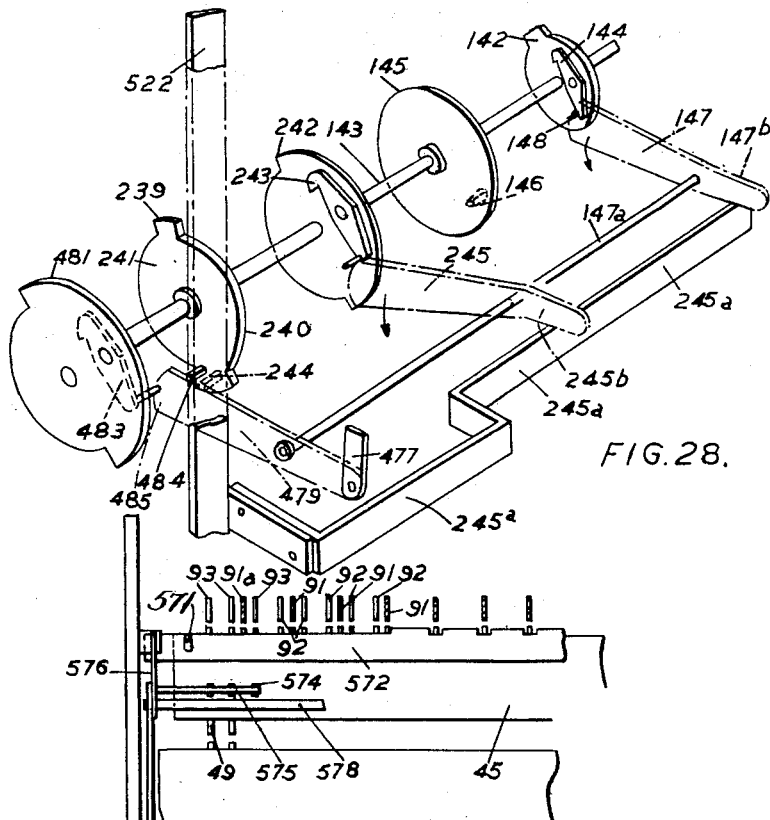
FIG. 28.
FIG. 29.
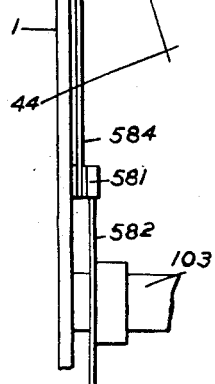
Inventor
GEORGE EDWARD FORD
By
Attorney

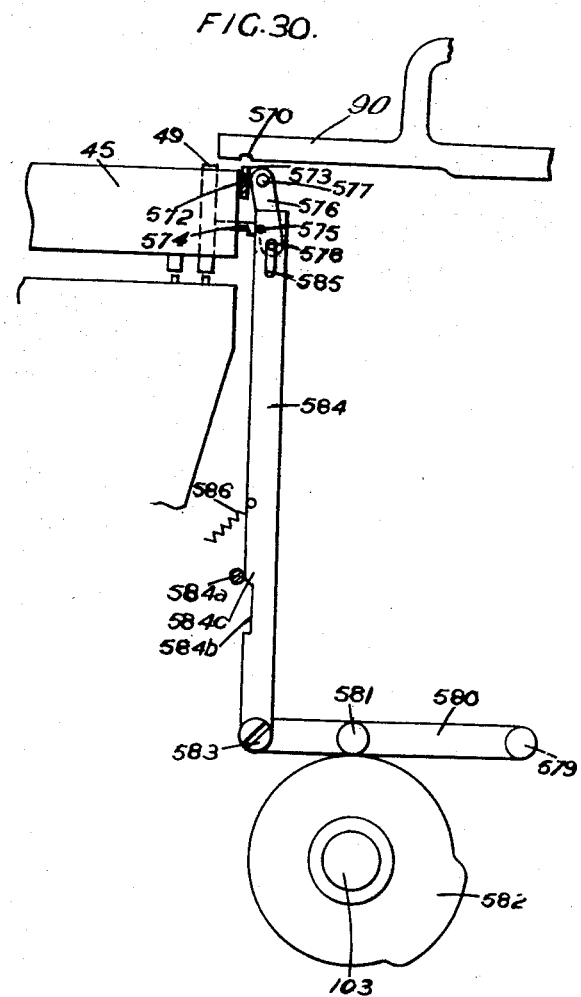

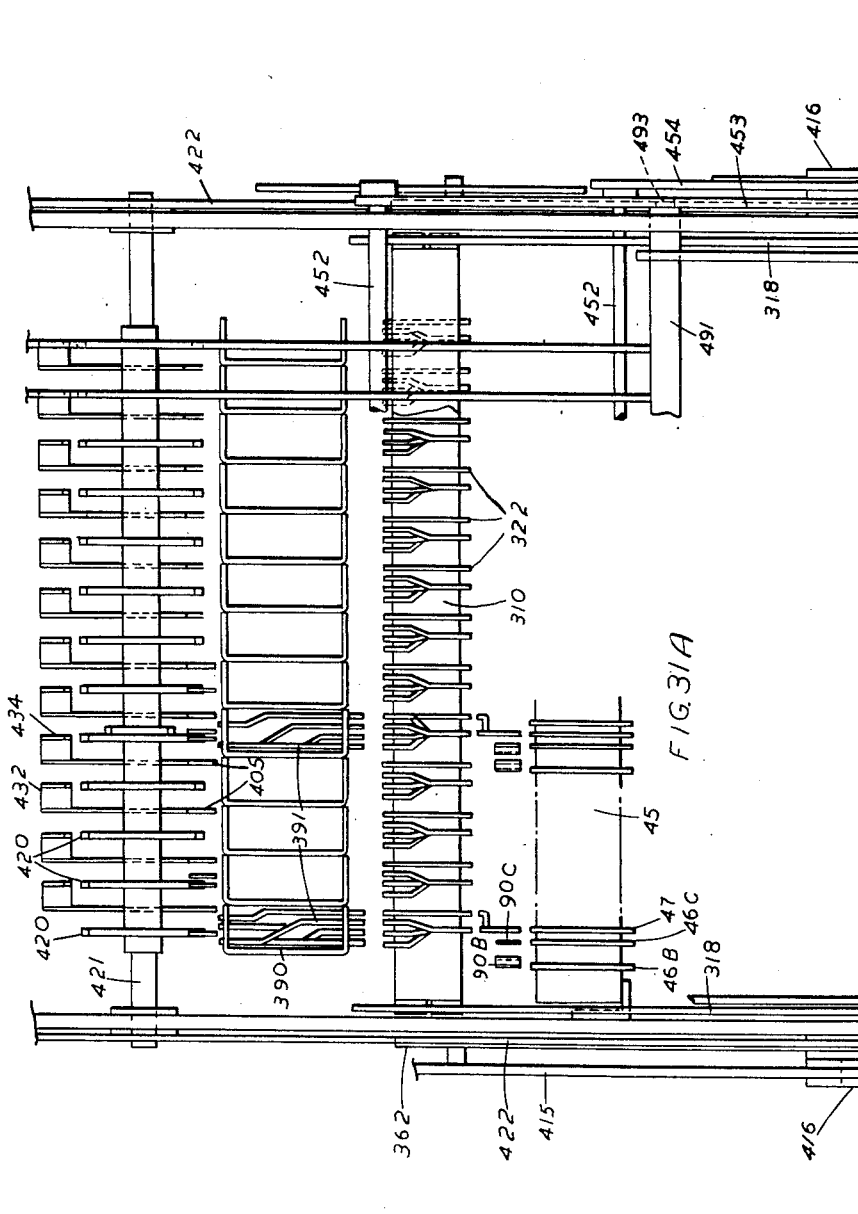

July 18, 1950 G. E. FORD 2,515,995
PARTIAL PRODUCT MULTIPLYING MACHINE
Filed Sept. 4, 1947 28 Sheets-Sheet 22
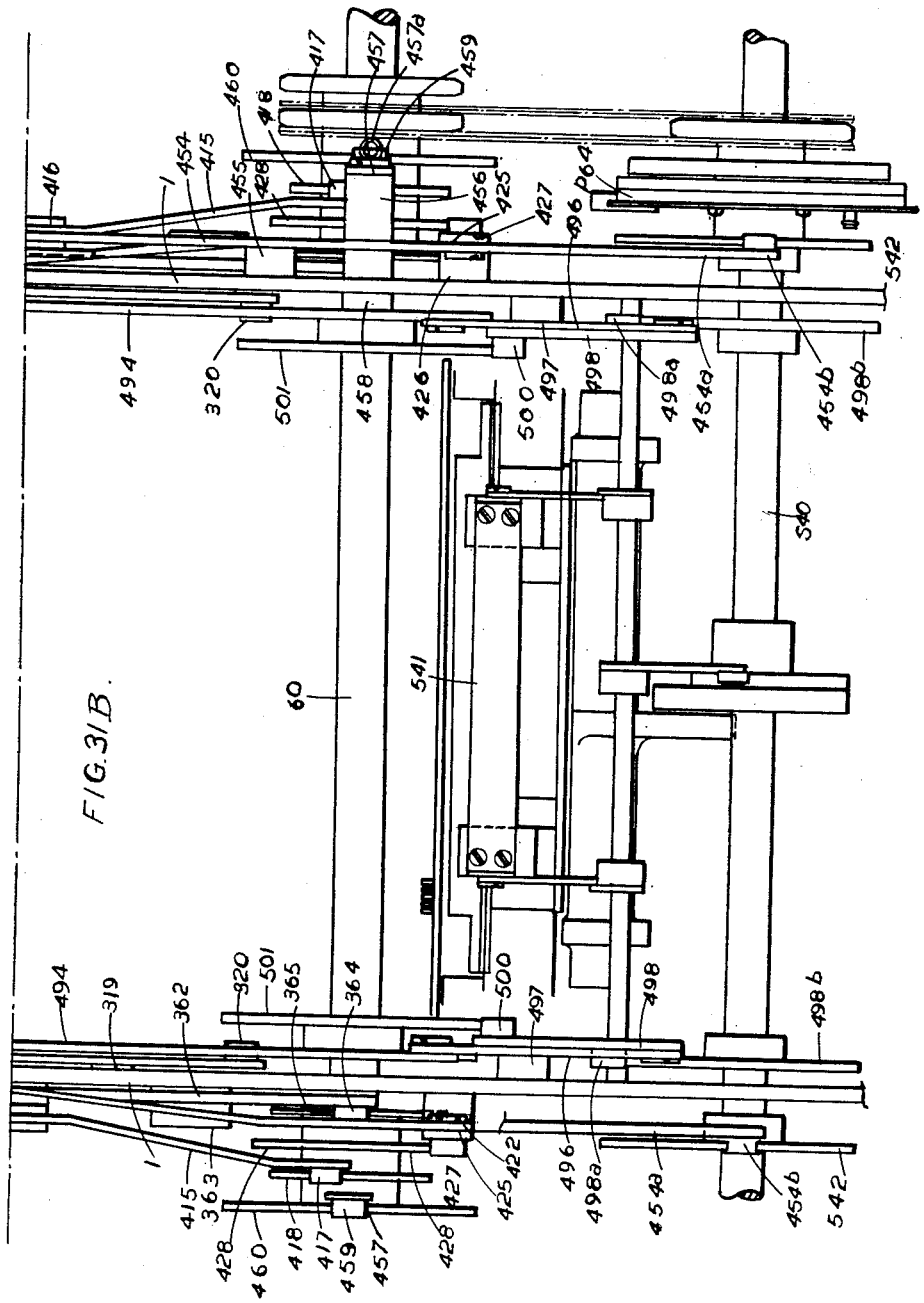
Inventor
GEORGE EDWARD FORD
By John L Sterling
Attorney July 18, 1950 G. E. FORD 2,515,995
PARTIAL PRODUCT MULTIPLYING MACHINE
Filed Sept. 4, 1947 28 Sheets-Sheet 23

Inventor
GEORGE EDWARD FORD
By *JL L Sterling*
Attorney

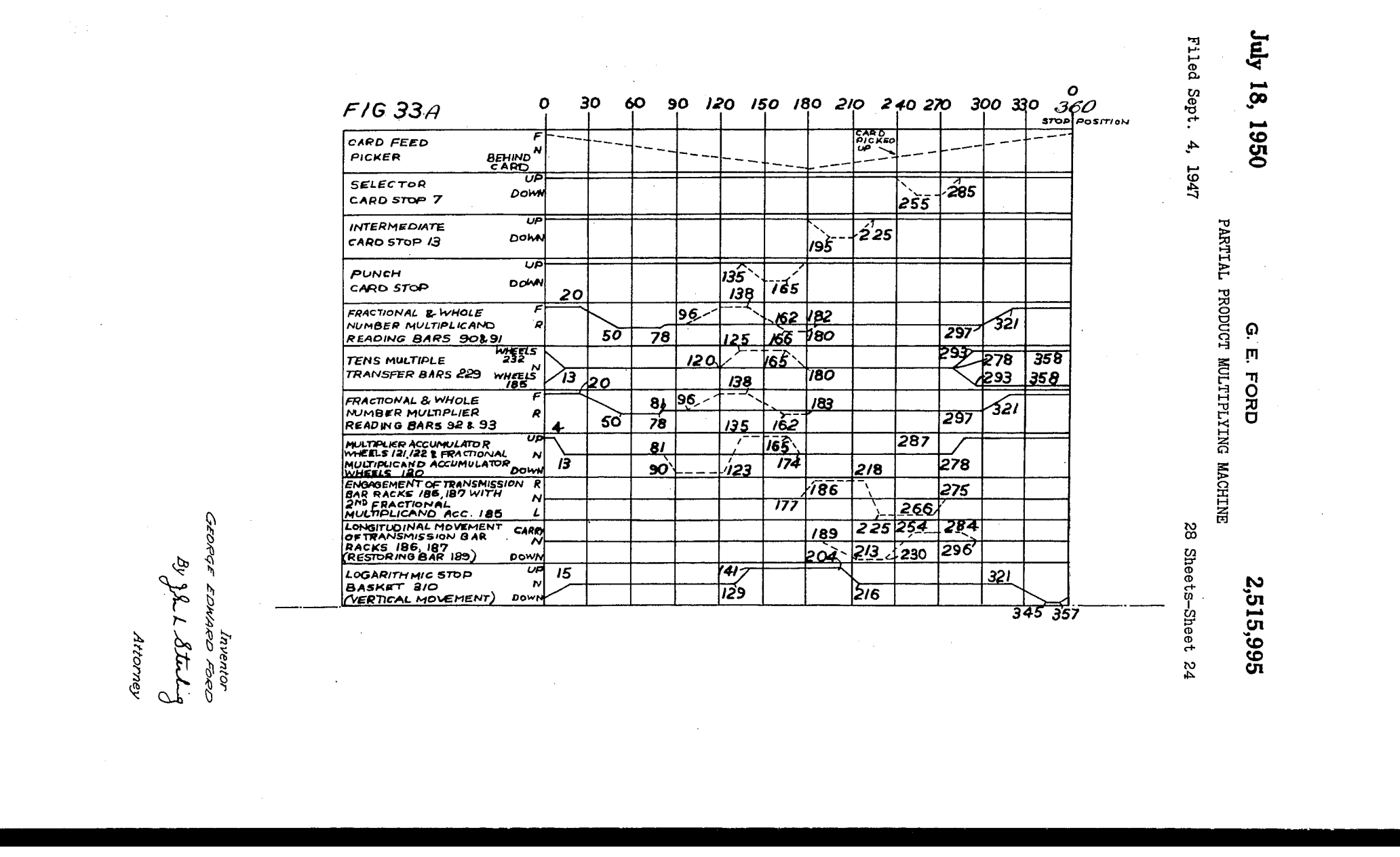

July 18, 1950

G. E. FORD 2,515,995

PARTIAL PRODUCT MULTIPLYING MACHINE

Filed Sept. 4, 1947

Inventor
GEORGE EDWARD FORD
By John L. Sterling
Attorney

FIG. 33B.

July 18, 1950 G. E. FORD 2,515,995
PARTIAL PRODUCT MULTIPLYING MACHINE
Filed Sept. 4, 1947 28 Sheets-Sheet 26
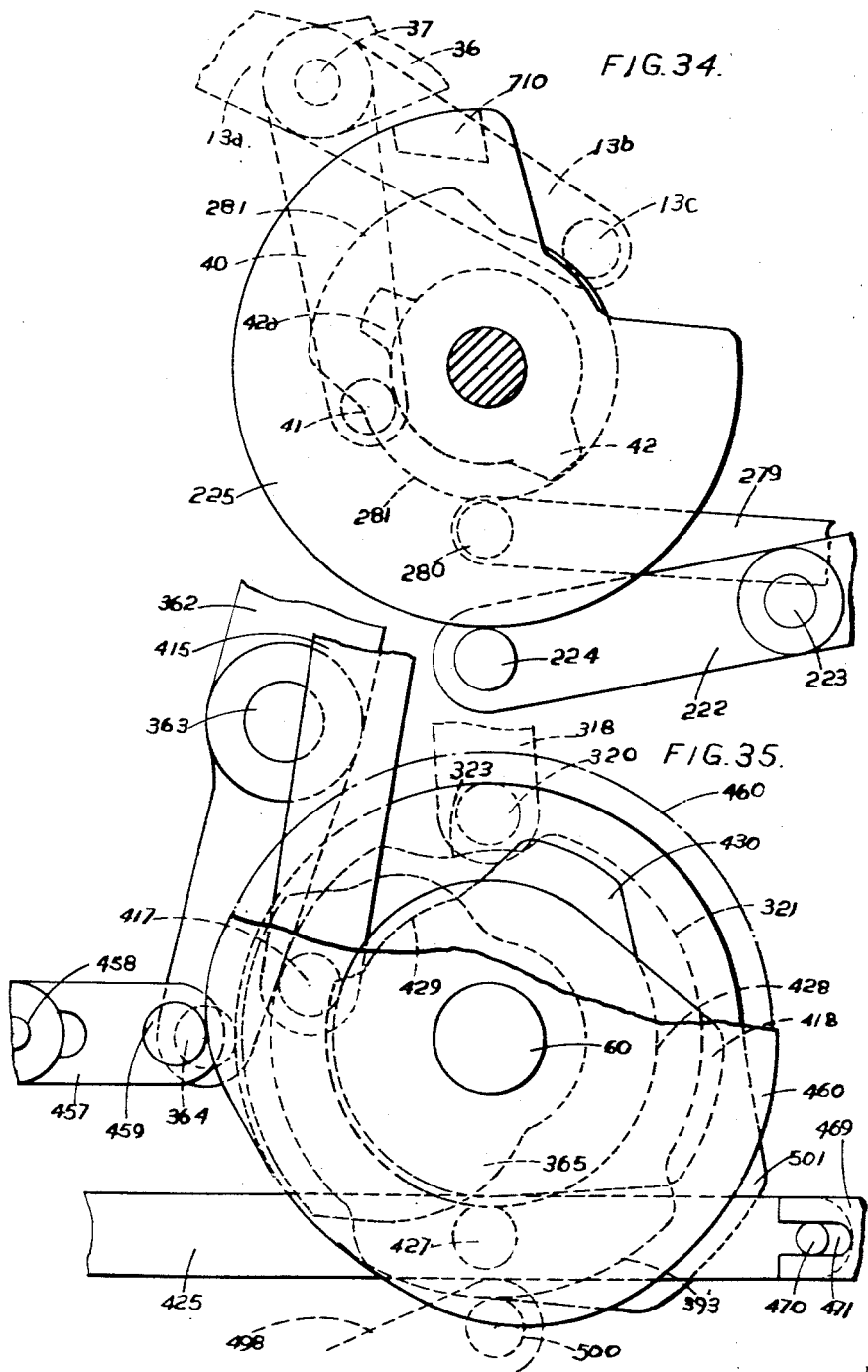
Inventor
GEORGE EDWARD FORD
By J. L. Sterling
Attorney July 18, 1950 G. E. FORD 2,515,995
PARTIAL PRODUCT MULTIPLYING MACHINE
Filed Sept. 4, 1947 28 Sheets-Sheet 27

*INVENTOR.*
GEORGE EDWARD FORD
BY John L. Sterling
ATTORNEY

*INVENTOR.*
GEORGE EDWARD FORD
BY *John L. Sterling*
ATTORNEY

Patented July 18, 1950

2,515,995

UNITED STATES PATENT OFFICE 2,515,995

PARTIAL PRODUCT MULTIPLYING MACHINE

George Edward Ford, Bromley, Kent, England, assignor to Powers-Samas Accounting Machines Limited, London, England, a British company Application September 4, 1947, Serial No. 772,165
In Great Britain July 9, 1943

Section 1, Public Law 690, August 8, 1946
Patent expires July 9, 1963

19 Claims. (Cl. 235—61)

This invention relates to multiplying machines and has for its object to provide a simplified form of machine for multiplying amounts expressed in either a uniform notation or in a non-uniform notation by amounts expressed in a uniform notation.

More particularly the object of the invention is to provide a machine capable of multiplying decimal or sterling amounts by decimal numbers, which will be simpler in construction and cheaper to produce than those hitherto proposed.

According to the present invention a multiplying machine includes in combination mechanism for setting up the logarithms of the individual digits of a multiplicand, mechanism for setting up successively in consecutive multiplying cycles, the logarithm of the individual digits of a multiplier, means operative under the joint control of both said set up mechanisms, in each multiplying cycle, to add the logarithms of the contemporaneous multiplier digit to the logarithms of the individual multiplicand digits, whereby the logarithms of a series of partial products are obtained, means for converting said logarithmic partial products into their arithmetical values, and means for accumulating the arithmetical partial products.

Preferably a multiplying machine according to the invention includes in combination a multiplicand set-up device having denominational columns of set-up elements settable to represent the logarithms of the individual digits of a multiplicand, a multiplier set-up device having denominational columns of set-up elements settable to represent the arithmetical values of the individual digits of a multiplier, means for moving said multiplicand set-up device from a datum position in a direction parallel to its columns at each multiplying cycle, means operative in successive machine cycles under the control of each column of multiplier set-up elements in turn, to dispose an abutment in the path of the multiplicand set-up device, and in advance of the datum position by a distance representing the logarithm of the contemporaneous multiplier digit, whereby on arrest of the multiplicand set-up device by said abutment each of the multiplicand set-up elements which has been set to represent logarithmically a multiplicand digit is positioned in advance of the normal zero position in the same column by a distance equal to the logarithm of the partial product of the said multiplicand digit plus the contemporaneous multiplier digit.

According to a feature of the invention the multiplicand may be entered, in each factor-entering cycle, into a multiplicand accumulator from which the logarithmic set-up device is set in each multiplying cycle, and the machine may include means operative at each multiplying cycle to enter into the multiplicand accumulator the tens multiple of the contemporaneous multiplicand, whereby in the first multiplying cycle the logarithmic set-up device is set from the multiplicand accumulator to the value of the multiplicand, and in subsequent multiplying cycles said logarithmic set-up device is set, also from said multiplicand accumulator, to the value of the tens multiple of the multiplicand employed in the preceding cycle.

In preferred constructions according to the invention the multiplicand is entered, in each factor-entering cycle, into an arithmetical stop basket from which it is read off, in said cycle, by denominational reading bars which transfer the multiplicand to the multiplicand accumulator, each of said reading bars being settable in each multiplying cycle from the accumulator and said setting operation disposing a lug on each reading bar under the appropriate stop in a corresponding denominational column of logarithmic multiplicand stops, of which the lower ends are spaced arithmetically and the upper ends logarithmically, said logarithmic multiplicand stops being housed in a basket mounted for horizontal movement in a vertically movable frame, and the frame being lowered after the reading bars have been set from the accumulator to effect setting of the stops by engagement of their lower ends with the lugs on the reading bars, after which the frame is raised and the logarithmic stop basket is permitted to advance in the frame to an extent representing the logarithm of the contemporaneous multiplier digit thereby positioning the upper ends of the set stops to represent the logarithms of the respective partial products.

According to a further feature of the invention, in order to enter the tens multiple of the contemporaneous multiplicand into the multiplicand accumulator, each multiplicand reading bar may carry a second lug, offset from the bar, and disposable by the setting operation under the appropriate stop in a column of tens multiple stops, said tens multiple stops being housed in a basket fixed in the vertically movable frame, and co-operating with corresponding translator wires of which the upper ends are spaced to represent the tens multiples of the values represented by the corresponding stops, the machine also including tens multiple reading bars settable from the tens multiple translator wires and co-operating with the multiplicand accumulator to transfer their settings to said accumulator after the multiplicand reading bars have been set therefrom in each multiplying cycle.

In each factor-entering cycle the multiplier may, according to the invention, be entered into a multiplier stop basket, from which it is read off in said cycle, by denominational multiplier reading bars which transfer the multiplier to a multiplier accumulator, said reading bars being settable from their respective multiplier accumulator wheels, under control of an escapement mechanism which permits each reading bar to advance in turn, one at each multiplying cycle, until arrested by arrival of its accumulator wheel at zero, and the advance of the logarithmic stop basket is controlled by a vertically movable plate having arithmetical steps co-operating with a setting member positioned by each multiplier reading bar in turn, whereby said plate is set in successive multiplying cycles to the value of the contemporaneous multiplier digit, said plate also having logarithmic steps so disposed in relation to the arithmetical steps that when any arithmetical step engages the setting member, the corresponding logarithmic step is disposed in the path of an abutment on the logarithmic stop basket.

According to yet another feature of the invention, in a machine for multiplying an amount, for example, an amount expressed in a non-uniform notation, such as sterling, by a whole number and/or a fraction, there may be provided a dividing mechanism operative under the control of the multiplicand-entering means to divide the multiplicand by a predetermined divisor and enter the resulting quotient into a fractional multiplicand accumulator, means operative during the last of a number of multiplying cycles equal to the number of digits in the integral portion of the multiplier to prevent entry into the multiplicand accumulator of the tens multiple of the contemporaneous multiplicand, and means operative in said last multiplying cycle to transfer the quotient from the fractional multiplicand accumulator to the multiplicand accumulator so that in the next succeeding cycle the logarithmic set-up device is set to the amount of said quotient for multiplication by the lowest digit of a number representing the fractional portion of the multiplier.

Machines according to the invention are particularly useful for multiplying amounts expressed in a non-uniform notation, for example sterling, by an amount expressed in a uniform notation, for example, a decimal number.

In the case of sterling multiplicands a convenient divisor is 960 in which case the number representing the fractional portion of the multiplier will be a number which when employed as the numerator of a fraction having 960 as denominator reduces to the fraction in the multiplier. For example, one third will be represented by 320.

The partial product digits may be read off from stops settable by the upper ends of the connection box wires, and the bar for reading off one denominational digit (e. g. the lower denominational digit) from a column of partial product wires may pass below the partial product accumulator wheel corresponding to the denomination to which the column of wires belongs, while the bar for reading off the other denominational product digit may carry an offset portion passing above the accumulator wheel of next higher denomination, said offset portion having rack teeth co-operating with said wheel, the accumulator wheels being engaged with the upper racks before the reading bars move out from zero and with the lower racks after the reading bars have been set from the stops whereby one digit of each partial product is entered into the accumulator during the outward movement of the reading bars and the other digit is entered into the accumulator during the return movement of the bars.

According to a further feature of the invention a restoring bar for controlling the advance of the multiplier reading bars is caused to operate twice in each factor-entering cycle, and the escapement device is rendered ineffective during the first of said operations of the restoring bar whereby at said first operation all the multiplier reading bars are permitted to move out to take a setting from the multiplier stop basket, after which they are restored to transfer the setting to the multiplier accumulator, the escapement device being thereafter rendered effective, so that during the second of said operations of the restoring bar only the first multiplier reading bar is permitted to advance, and the remaining multiplier reading bars are permitted to advance in turn, one at each subsequent cycle, the machine also including a restoring bar for the multiplicand reading bars which is likewise caused to operate twice during each factor entering cycle to permit the multiplicand reading bars to read the multiplicand and enter it into the multiplicand accumulator during the first operation and to become set from said accumulator during the second operation, whereby the entering of the factors and a multiplying operation both take place during a single machine cycle.

Machines according to the invention may be record card controlled, in which case there may be provided a selection shaft for operating the card feeding mechanism and a pin box for sensing the cards, a continuously rotatable main-shaft, and a one revolution clutch for connecting the selection shaft to the main shaft, while the escapement mechanism includes a setting finger to each multiplier reading bar disposed to be moved to a "set" position when its associated multiplier reading bar moves away from its zero position, an escapement pawl movable in each multiplying cycle from the "set" finger associated with the multiplier reading bar which is to be effective in the next cycle, to the next "set" finger, said pawl moving up to a fixed stop on leaving the last "set" finger and on so moving serving to cause engagement of the selection shaft clutch, said escapement mechanism further including an escapement bar having a spring tending to maintain it in engagement with the pawl so as to follow the step by step movement thereof, said bar standing in the path of abutments on the multiplier reading bars to prevent movement thereof, and having a slot disposable in register with a different multiplier reading bar in turn at each successive position to which the escapement bar moves under control of its pawl, whereby only said reading bar which is in register with said slot is permitted to move, the restoring bar for the multiplier reading bars also serving to restore said bars early in the cycle following that in which the escapement pawl last moved, and to an extent sufficient to relieve the pressure of said reading bars on the escapement bar, whereupon the latter then moves up to the pawl, under the action of a spring.

In order that the invention may be more clearly understood one embodiment thereof will now be described with reference to the accompanying diagrammatic drawings which show a record card controlled machine for multiplying sterling monetary amounts by decimal numbers and/or vulgar fractions.

In the accompanying drawings:

Figs. 1A and 1B together show the machine in left hand side elevation.

Figs. 2A and 2B together form a plan of partial product and tens multiple reading bars.

Fig. 3 is a sectional elevation of the upper part of the machine taken on the line 3—3 in Figs. 2A and 2B.

Figs. 4A and 4B together form a plan of the fixed stop basket and its associated reading bars.

Fig. 5 is a view of part of the machine in section on the line 5—5 in Fig. 1B showing certain operating mechanisms.

Fig. 6 is an exploded view of part of the fractional multiplicand accumulator.

Fig. 7 is a view in section on the line VII—VII in Fig. 5.

Figs. 8, 9 and 10 respectively are elevations of three of the operating cams of the machine.

Fig. 11 is a part front view of the upper part of the machine showing the multiplying cycle control mechanism in front elevation.

Fig. 12 is a front elevation of the multiplying cycle mechanism.

Fig. 13 is a plan thereof, and

Figure 14:
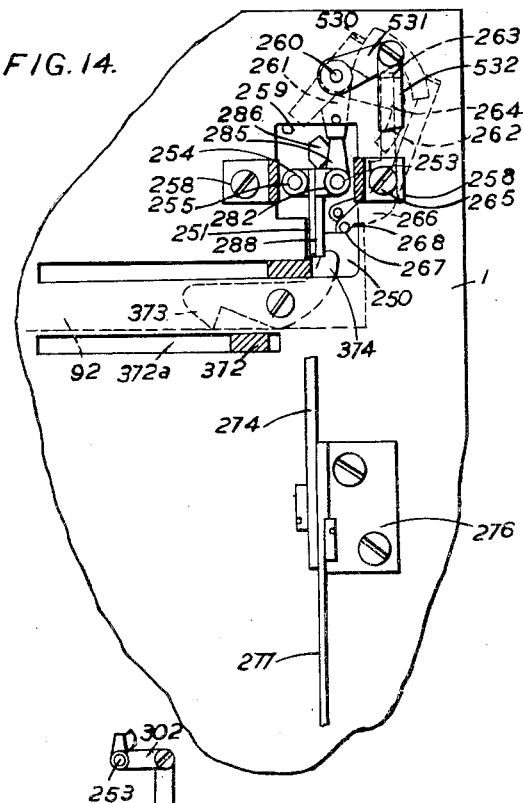

Fig. 14 is a sectional left hand side elevation thereof.

Figure 15:
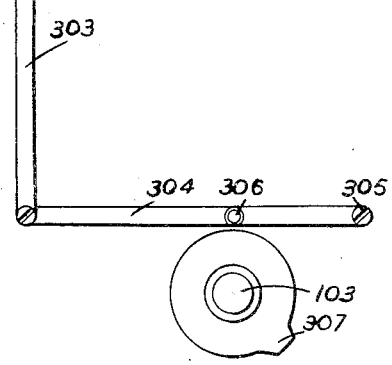

Fig. 15 illustrates in right hand side elevation a mechanism for operating part of the mechanism of Figs. 11 to 14.

Fig. 16 is a part plan view of the logarithmic multiplicand stop basket.

Figs. 17 and 18 are sectional side elevations on the lines XVII and XVIII respectively of Fig. 16.

Fig. 19 is a transverse section on the line XIX—XIX in Fig. 16.

Fig. 20 is a left hand side elevation, to a larger scale, of the logarithmic multiplicand stop basket.

Figs. 21 to 24 illustrate diagrammatically the arrangement of a group of columns of translator wires for converting logarithmic pence values into arithmetical pence and units of shillings values.

Fig. 25 shows to a larger scale the operating mechanism for the restoring bars for the partial product and tens multiple reading bars.

Fig. 26 shows to a larger scale the partial product and result accumulator mechanisms.

Fig. 27 shows to a larger scale the tens multiple accumulator mechanisms.

Fig. 28 is a perspective view of certain control cams and clutch devices, the spacing between said cams being exaggerated to illustrate the parts more clearly.

Figs. 29 and 30 illustrate in front elevation and left hand side elevation respectively, a mechanism for preventing the tens multiple computed during the last multiplying cycle from being entered into the tens multiple accumulator.

Figs. 31A and 31B together form a rear view of the machine.

Figure 32:
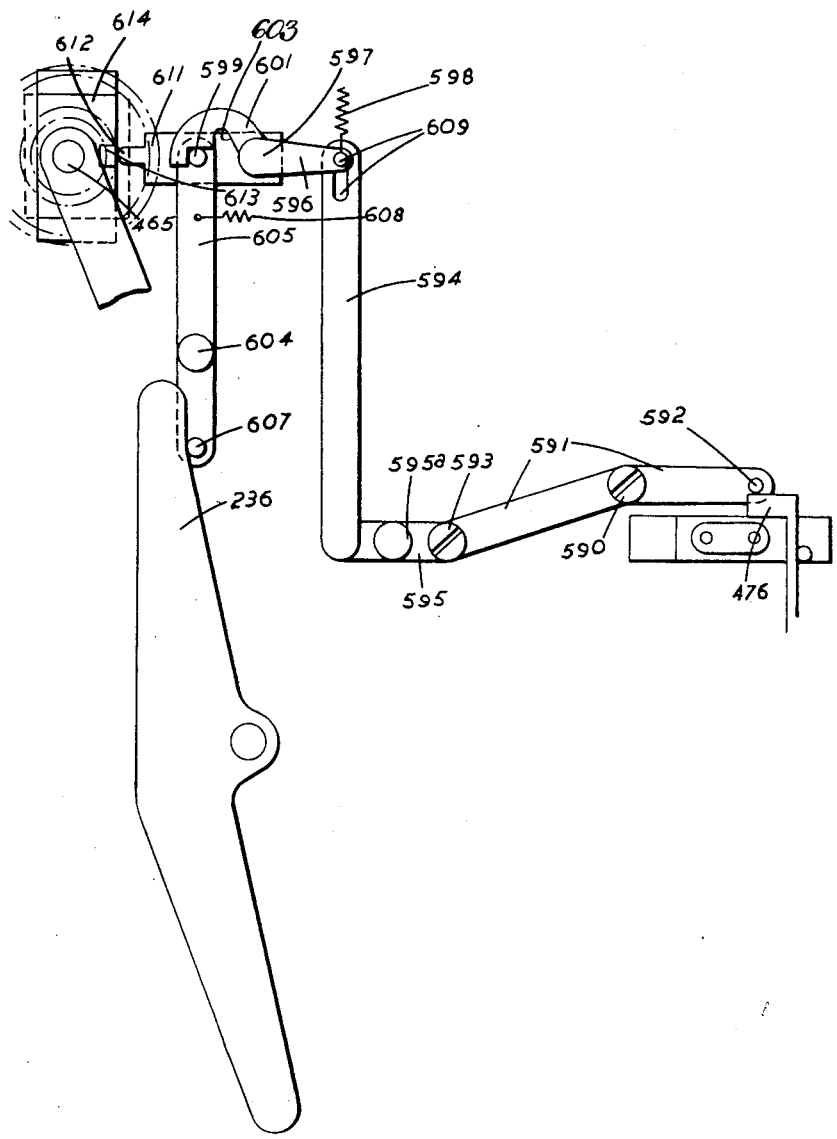

Fig. 32 is an elevation of mechanism for preventing the tens multiple computed during the last whole number multiplying cycle from being entered into the tens multiple accumulator when there is no fraction in the multiplier.

Figure 33B:
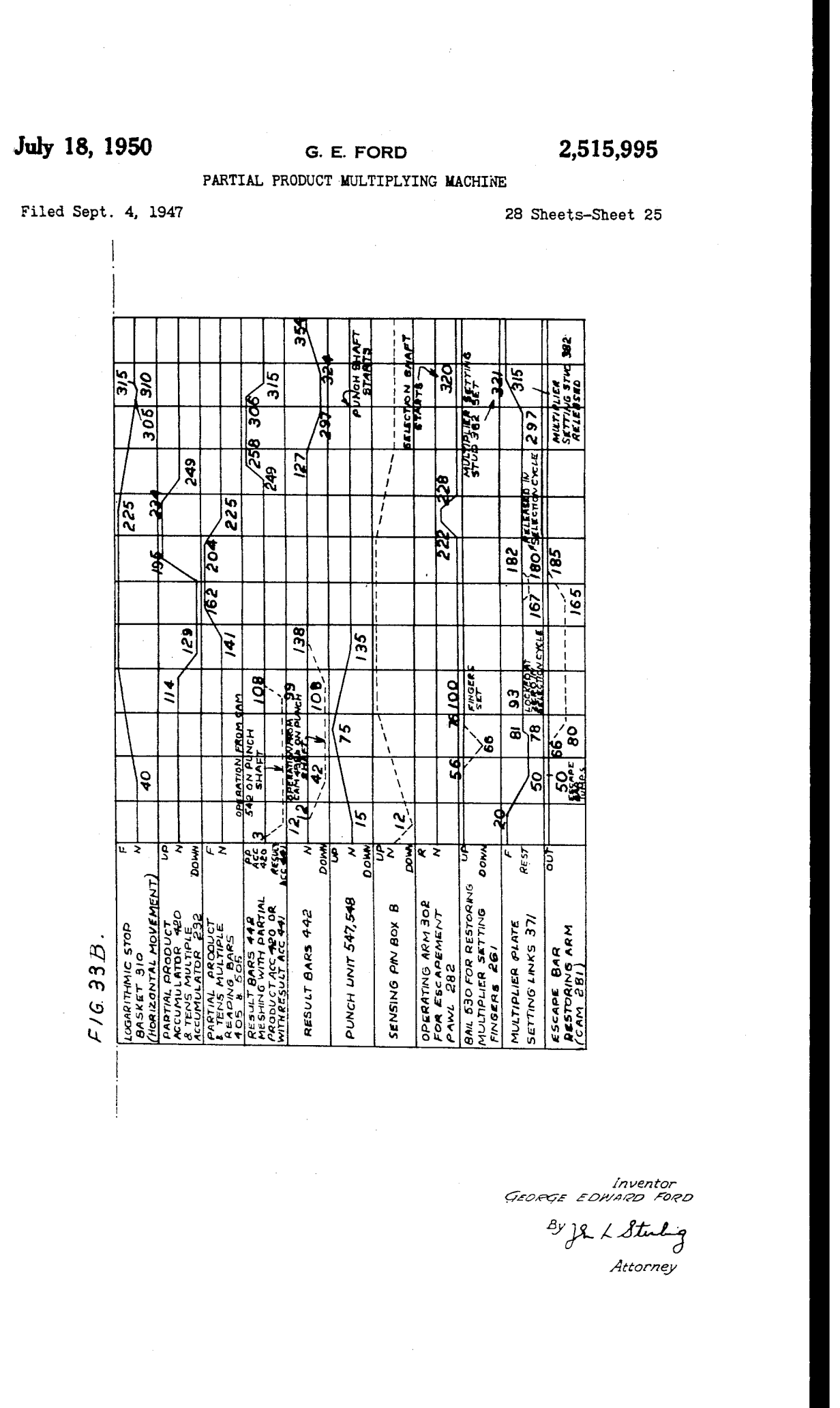

Figs. 33A and 33B are time diagrams.

Fig. 34 is an elevation of certain cams on the selection shaft.

Fig. 35 is an elevation of certain cams on the main shaft.

Fig. 36 illustrates a detail of the partial product mechanism.

Figure 37:
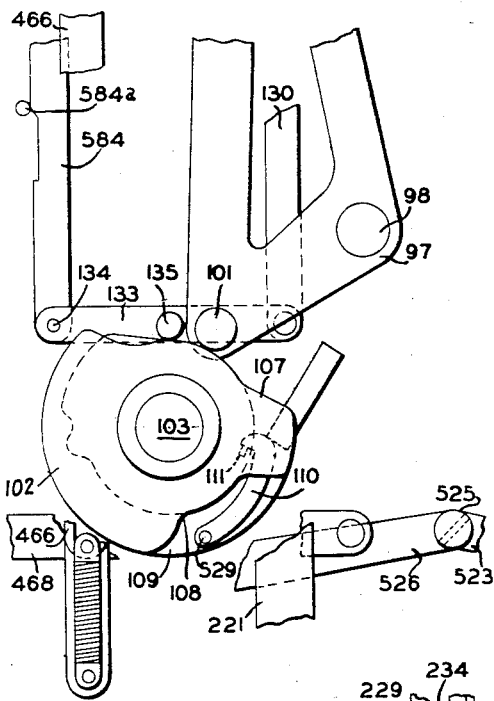
Figure 39:
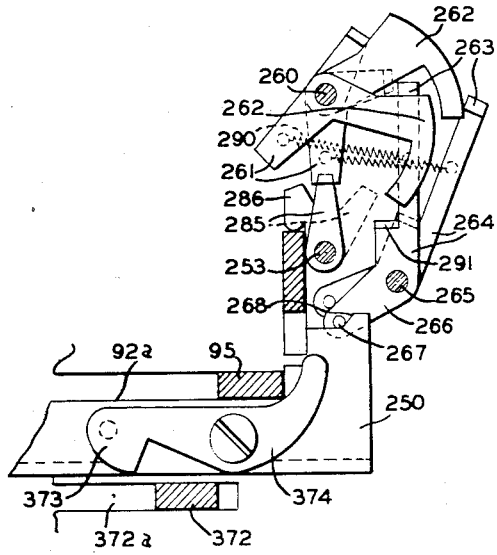
Figure 38:
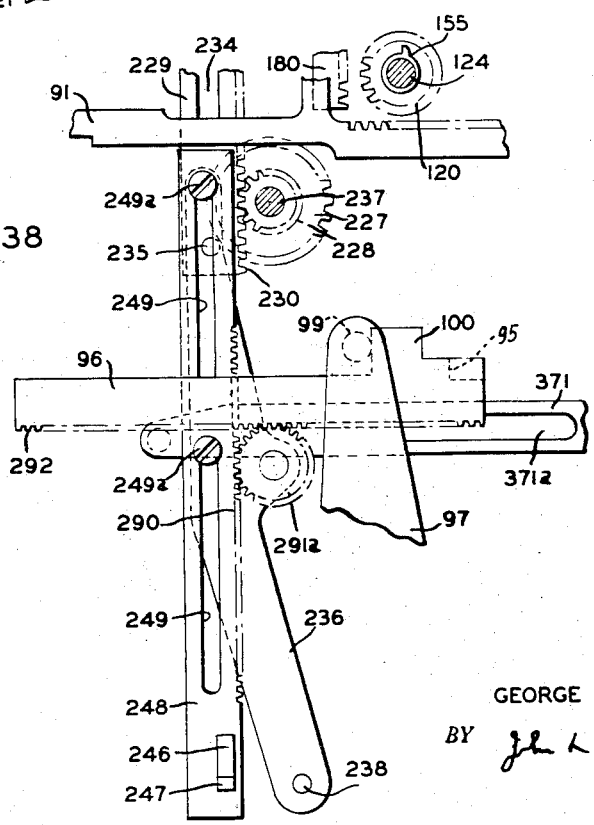
Figure 40:
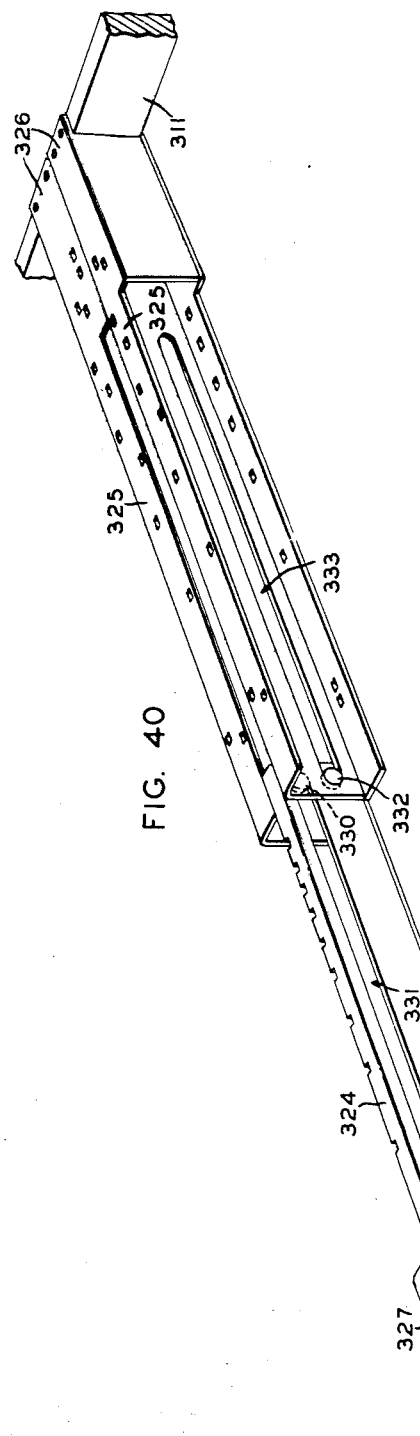

Fig. 37 shows to an enlarged scale a portion of the mechanism shown in Fig. 1B;

Fig. 38 shows to an enlarged scale a portion of the mechanism shown in Figs. 1B and 3;

Fig. 39 is a sectional elevation of the multiplying cycle mechanism shown in Fig. 14; and Fig. 40 is a perspective view of a portion of the logarithmic multiplicand stop basket shown in Figs. 16 to 19.

In the construction illustrated in the drawings the machine includes side plates 1 (Figs. 31A and 31B) within the lower part of which is housed a base section including the card feeding, sensing and punching mechanism, and within the upper part of which is housed an upper section including the multiplying mechanism.

In the base section are mounted a selection shaft 3 from which are driven the sensing pin box, the card picker, the selector card stop, which arrests the cards successively in position for sensing and an intermediate card stop hereinafter referred to; the base also houses a punch shaft 540 which operates the punching mechanism.

In the upper section are the main shaft 60 and two further shafts hereinafter referred to as the front lower and upper cam shafts 103, 143 respectively.

The mainshaft and the front upper and lower camshafts rotate continuously but the selection shaft 3 only rotates during card sensing cycles, during each of which it makes one revolution in the time taken for the main shaft to make one revolution. Towards the end of each revolution of the selection shaft the punch shaft commences to rotate and makes one revolution at the same speed as the selection and main shafts.

Referring now to the base section, this section includes a card magazine 4 from which cards are delivered by a reciprocating picker (not shown) to feed rolls 6 which feed them to a selector card stop 7 which arrests them for sensing by the sensing pinbox 8. The picker is reciprocated from the selection shaft 3 by mechanisms described in British Specification No. 516,553 and not shown in the present drawings. After the card has been sensed, further feed rolls 6a transport the card from the pinbox 8 to an intermediate card stop 13 whence feed rolls 5b convey the card to the punching mechanism of which the punches are indicated at 14 and from which feed rolls 6c deliver the card to a receiver 15 after the product has been punched therein.

The pinbox 8 is of the form described in British Specification No. 401,012 but the timing thereof differs from that described in the aforesaid prior specification.

In this connection it is here pointed out that in the present description all timings are given with reference to the main shaft 60. When the selection shaft 3 starts to make a revolution the main shaft is at 320° of its revolution and when the selection shaft stops, the pinbox is in a mid position about halfway down. When the selection shaft starts the pinbox remains in this mid position until the end of the cycle and at 0° it commences to move down, reaching its lowest position, in which the pins are sensing the card, at 12°, whereupon it immediately starts to move up until it reaches its highest position at 90°. The pinbox remains in its highest position until 210° when it commences to move down, reaching its mid position again at 270° where it remains until 0° in the next cycle. The selection shaft however stops at 320° with the pinbox in its mid position.

The mechanism for reciprocating the pinbox, apart from its different timing referred to above, and also the mechanism for operating the reciprocating plate or shutter of the pinbox (member 26 in British Specification No. 401,012) are the same as those described in British Specification No. 516,553.

The selector card stop 7 is driven independently of the pinbox by means of the following mechanism (Figs. 1A and 1B). The card stop passes at its upper end through a guide (not shown) and has at its lower end a downwardly extending rod 33 passing through a bar 34 mounted transversely between the side plates of the base section, and a spring 35 urges the card stop upwards. Passing through a slot in the card stop 7 is one arm 36 of a bell-crank 36—40 free on a transverse shaft 37 (Fig. 34) and projecting from the card stop 7 is a bracket 38 carrying a pin 39 on which the end of the arm 36 bears. The other arm 40 carries a roller 41 engaging with a cam 42 secured to the selection shaft 3.

Each time the shaft 3 rotates, the cam 42 rocks the arm 36 thereby withdrawing the card stop 7 at the appropriate time to permit release of the card from the pinbox and allowing the card stop to rise under the action of the spring 35 at the proper time to arrest the card for sensing.

The intermediate card stop 13 is similarly actuated by an arm 13a free on shaft 37 and having an extension arm 13b carrying a roller 13c engaging a cam 42a similar to cam 42.

In the present machine multiplication by the whole number portion of the multiplier is effected first, starting with the units digit and thereafter multiplication by the fractional portion of the multiplier is carried out, commencing with the units digit of the number which represents the fraction.

The sensing pins transmit the sensed factors through a connection box 44 to the stops in a fixed stop basket 45 (see Figs. 4A and 4B), having its stops arranged on an arithmetical scale. This stop basket comprises a section to receive the whole number multiplicand, a section to receive the fractional multiplicand, a section to receive the whole number multiplier and a section to receive the number which represents the fractional multiplier.

When the multiplicand is read from a card the whole number portion thereof is set up in the whole number multiplicand section of the stop basket 45 and also $$\frac{1}{960}$$

of this multiplicand is set up in the fractional multiplicand section of the basket.

In the whole number multiplicand section there are eleven denominational columns of stops 47 the denominations extending from ten-thousandths of one penny (0.000 1d.) to thousands of pounds inclusive.

In the connection box 44 the wires which set the whole multiplicand stops 47 lead directly from the sensing pins to the respective stops and are branched in the manner explained in Specification No. 516,553 so as to constitute a mechanism for dividing the multiplicand by 960 whereby when a wire representing a multiplicand digit is raised it actuates one or more wires representing the digits of $$\frac{1}{960}$$

of that multiplicand digit.

Thus, as explained in the aforesaid prior Specification No. 516,553 the raising of one wire representing a multiplicand digit may involve the setting of stops in several denominations of the fractional multiplicand section of the stop basket 45.

The arrangement of the wires in the connection box which handle the fractional multiplicand is fully described in Specification No. 516,553 and will therefore not be described in the present specification.

The stops in the fractional multiplicand section of the stop basket 45 are shown at 46 and there are the same number of these stops as there are columns of stops in the fractions stop basket 642 described in Specification No. 516,553. Further in the present drawings the columns of fractional multiplicand stops are given the same reference letters A, B . . . V, W, as the corresponding columns of stops in Specification No. 516,553.

In the whole number multiplier section of the stop basket 45 there are five columns of stops 48 and in the fractional multiplier section there are three columns of stops 49.

In the present machine the factors read from the card together with $$\frac{1}{960}$$

of the multiplicand are set up in the respective sections of the stop basket 45 and are entered into accumulators by means of reading bars hereinafter described, the multiplying mechanism being subsequently set from the accumulators. Accordingly after the amounts have been entered into the accumulators the stops in the basket 45 are reset and to this end each column of stops may be constructed in the manner described for the multiplier stop basket in Specification No. 490,358 and provided with a resetting slide which at the appropriate time in the cycle of operations is actuated from a cam secured to the selection shaft.

As already explained the main shaft indicated at 60 rotates continuously but the selection shaft 3 only rotates during card reading cycles, during each of which it makes one revolution. For this purpose the selection shaft is connected to the main shaft by a one revolution clutch and chain drive 3a. The construction of this clutch and the mechanism for controlling it will be described later.

When the machine is at rest the selection shaft 3 is clutched to the mainshaft and has made 40° of its one revolution the pinbox being in its mid position.

When the machine is started the main shaft 60 commences to rotate, and, since the clutch is engaged turns the selection shaft 3 with it. The pinbox immediately commences to descend and reaches its bottom position at 12° in the first cycle, but as there is no card in the box nothing is sensed. The pinbox immediately commences to rise and reaches its uppermost position at 90° but as no card has been sensed no setting is made in the stop basket 45. At 210° the pinbox commences to descend and reaches its mid position at 270° where it remains until 0° in the next cycle.

At 240° in the first cycle the picker commences to feed the first card and at 285° the selector card stop 7 closes and arrests the first card in the pinbox 8 for sensing. At 320° the clutch tends to disengage but as will be explained later, since no setting was made in the stop basket the clutch control mechanism is again actuated to cause engagement of the clutch and therefore the clutch remains in engagement. Accordingly the selection shaft 3 makes another revolution.

At 12° in the second cycle the pinbox senses the first card and at 90° when the pinbox is in its uppermost position the setting of the multiplicand read from the card is transferred to the various sections of the stop basket 45.

Co-operating with each of the columns of fractional multiplicand stops 46 is a fractional multiplicand reading bar 90 and for convenience of reference each of these reading bars 90 is shown in the drawings with a suffix letter A, B, C ... corresponding to the letter appropriated to the column of stops 46 with which it co-operates.

Co-operating with each column of whole number multiplicand stops 47 is a whole number multiplicand reading bar, 91, and co-operating with each column of whole number multiplier stops 48 is a reading bar 92. To the right of the highest denominational bar 91 are further bars 91A which have no corresponding columns of stops 47 but receive the higher denominational digits of the tens multiples. Each bar 91A however has a zero stop 47A which is set in each cycle of the selection shaft by mechanism similar to that described for setting the multiplicand zero stops 370 in Specification No. 490,358.

Finally, co-operating with each column of fractional multiplier stops 49 is a reading bar 93.

All the reading bars 90, 91, 92 and 93 are urged rearwardly by individual springs and the bars 90, 92, and 93 are held forwardly by a common restoring bar 95 carried between a pair of horizontal slides 96. The bars 91 are restored by a separate bar 246 operated by the same mechanism as bar 95 as will be explained later. The slides 96 are actuated in unison by corresponding levers 97 pivoted to the respective side plates 2 at 98 and carrying at their upper ends pins 99 engaging lugs 100 on the respective slides. Each lever 97 carries at its lower end a roll 101 engaging an actuating cam 102 (Figs. 1B and 5) secured to the front lower camshaft 103 which is driven continuously from and at the same speed as the mainshaft 60 by means of a chain and sprocket drive.

The cam 102 has two gaps 107 and 108 in its periphery but when the selection shaft 3 is stationary the gap 108 is masked by an overriding cam 109 free on the shaft 103 and normally latched to the cam 102 by a spring loaded latch 110 engaging a lug 111 on the side of cam 102.

As will be explained later the control mechanism which causes the selection shaft to make one revolution also disengages the latch 110 and holds the cam 109 stationary during the one revolution of the selection shaft so that during any revolution of the selection shaft the levers 97 and consequently the restoring bars 95 and 246 are actuated twice whereas during revolutions of the main-shaft 60 in which the selection shaft 3 is stationary the restoring bars 95 and 246 are only actuated once.

At the beginning of each revolution of the main-shaft 60 in which the selection shaft 3 is also rotating the restoring bar 95 is fully rearward, the roll 101 being at this time in the gap 107 of the cam 102. At 20° in the cycle in which the first card is sensed the high part 112 of the cam engages the roll 101 and rocks the levers 97 clockwise thereby moving the restoring bar 95 forward to the right to the fully restored position which is one step beyond the zero position, this movement being completed at 50°. At 78° the bar moves rearwardly to permit the reading bars to move to the zero position which is reached at 81°. The bars remain at zero until 96° when the gap 108 in the cam 102 comes into register with the roll 101. As the selection shaft 3 is rotating the overriding cam 109 is held stationary and accordingly the roll runs down into the gap 108 and the restoring bar 95 again moves fully rearward. This operation allows the reading bars 90, 91, 92, and 93 to move out to their respective stops so as to be positioned in accordance with the values of said stops.

While the reading bars are at zero the wheels of a multiplier accumulator, and a fractional multiplicand accumulator are connected to the corresponding reading bars so that as the latter move up to the stops the reading is entered into the respective accumulators.

The wheels of the fractional multiplicand accumulator are arranged in denominational pairs, indicated at 120 (Fig. 4B), those which receive the whole number portion of the multiplier are indicated at 121 and those which receive the fractional portion of the multiplier are indicated at 122. The whole number portion of the multiplicand is entered into the tens multiple accumulator, of which the wheels are indicated at 232 (Figs. 3 and 27).

The wheels 120, 121, and 122 of the fractional multiplicand and multiplier accumulators are freely mounted on a common shaft 124 guided for vertical sliding movement and having its ends carried in bearings in the upper ends of a pair of vertical links 130 (Figs. 1B and 5) one at each side of the machine. Each link 130 is guided for vertical reciprocation by means of a slot 132 in the link engaging over the front upper camshaft 143 and is pivoted at its lower end to a lever 133 pivoted to the side plate 2 at 134 and carrying a roll 135 engaging a cam 136, Fig. 37, secured to the lower shaft 103.

Each link 130 carries another roll 141 engaging a cam 142 (Fig. 7) free on the front upper camshaft 143. This shaft carries a sprocket connected by chain to a sprocket secured to the lower camshaft 103 which is rotating with the mainshaft 60.

The cam 142 is clutched to the shaft 143 at the proper time by the following mechanism.

Pivoted to the face of the cam is a latch 144 (Fig. 28) and secured to the shaft is a disc 145 carrying a lug 146. The latch is normally held clear of the lug by a lever 147, pivoted to a fixed stud 147a, which lever engages a pin 148 on the tail of the latch. On withdrawal of lever 147 a spring rocks the latch into the path of the lug 146 so that as the disc 145 rotates, the lug 146 takes the cam 142 around with it. Lever 147 is returned into the path of the latch before the cam has made one revolution so that at the end of one revolution the cam stops.

The control mechanism which effects engagement of the selection shaft clutch also controls the latch 144 to produce the one revolution of cam 142.

The arrangement of the fractional multiplicand reading bars will now be described.

Referring to Figs. 4A and 4B it will be observed that the fractional multiplicand stops fall into eight groups, of which the first two comprise three columns of stops each, the next three groups have four columns each, the sixth group has three columns, while the seventh and eighth groups have only one column each.

Referring to Figure 6 in which the arrangement of the reading bars 90G, 90H, 90I, and 90J co-operating with the $$\frac{\text{pence}}{100}$$

group of columns of stops 46G, 46H, 46I and 46J is shown, there is a pair of accumulator wheels 120 associated with this group, the left hand one of these wheels (In Figure 6) receiving amounts from the pair of reading bars 90G and 90H while the right hand wheel receives amounts from the bars 90I and 90J.

The bar 90G passes to the left of the left hand wheel 120 and below the shaft 124, and has an upstanding arm 150G carrying a horizontal arm 151G which passes above the shaft 124 and carries a rack member 152G with which the wheel 120 can mesh. This rack member is mounted on the arm 151G by means of pins and slots whereby it can slide along the arm to the extent of one tooth to effect a transfer of one unit from the next lower denominational group.

Adjacent the reading bar 90G is the reading bar 90H which passes below the wheel 120 and is formed with rack teeth with which the wheel can mesh.

Similarly the reading bar 90J passes below the right hand wheel 120 and is formed with rack teeth while the bar 90I passes to the right of this wheel 120 and has an upstanding arm 150I carrying a horizontal arm 151I, carrying a movable rack 152I for engagement with the right hand wheel 120.

The multiplier reading bars 92 and 93 are forked, the lower arm 92a, 93a, of each fork passing under the respective wheel 121, 122 while the upper arm 92b, 93b passes above the wheel and is provided with rack teeth for engagement therewith. The lower arms 92a, 93a have no teeth.

At the beginning of the second cycle (in which cycle the first card is sensed) the accumulator wheels are held in their upper position in engagement with their respective racks 152, 92b and 93b by the high part 136a, Fig. 37, of cam 136 engaging roll 135. At 4° the roll 135 passes off the high part 136a but does not engage the low part of the cam 136 because the accumulator wheels are prevented from dropping below the mid position by the roll 141 engaging the cam 142. In this position all the wheels are out of engagement with all the racks. Since this is a card reading cycle the cam 142 is rotating and at 81° the lowest part 170, Fig. 7, of cam 142 comes into register with the roll 141 whereupon the links 140 and 130 descend until the accumulator wheels are in their lowermost position, meshing with the lower racks, this movement being possible because the low part of cam 136 corresponds in radius to the lowest part 170 of cam 142.

When the accumulator wheels are in their lowermost position the fractional multiplicand wheels 120 are in engagement with the lower racks such as 90H, 90J and the multiplier wheels are still out of engagement with their racks 92b, 93b.

As already explained the reading bars 90, 91, 92, 93, start to move out at 96° at which time the fractional multiplicand wheels 120 are in engagement with the racks.

Accordingly as the reading bars come out to the stops the settings on the stops are wound on to those accumulator wheels 120 which are in mesh with the lower racks such as those on the bars 90H and 90J. In the case of the bar 90H the left hand wheel of the pair will receive the amount read from the column of stops 46H, while the right hand wheel of the pair will receive the amount read from the column of stops 46J.

Then at 123°, while the reading bars are still in engagement with the stops, the highest part of the cam 142 engages the roll and lifts the fractional multiplicand accumulator wheels 120 into their uppermost position in which the fractional multiplicand accumulator wheels 120 engage with the upper racks such as 152G and 152I while the multiplier wheels 121, 122 move into engagement with their racks, 92b, 93b.

At 138° the restoring bar moves back to restore the reading bars to normal position and during this movement the upper racks, e. g., 152G and 152I turn the wheels 120 (in the same direction as before) to wind on to them the amount to which the reading bars such as 90G and 90I were set. Accordingly when the reading bars have been restored the amounts read from the two columns of stops 46G and 46H have been entered into the left hand wheel 120 and the amounts read from the other two columns of stops 46I and 46J have been entered into the right hand wheel 120 of the same pair. At the same time the racks 92b, 93b enter the multiplier into the wheels 121, 122.

Since two amounts may be entered into each wheel 120, transfer mechanism is provided between corresponding wheels of adjacent pairs, this transfer mechanism being constructed as follows:

Referring to the wheels 120 associated with the reading bars 90G, 90H, and 90I (Fig. 6) there is attached to the side of the left hand wheel of the pair a transfer cam 155 co-operating with a transfer pawl 156 pivoted on a cross shaft 157 and connected by a bail 158 to a transfer latch 159 also pivoted on shaft 157 and normally engaging a lug 160 on the sliding rack 152K of the bar 90K in the next denominational group whereby said rack is held in its normal position relative to the corresponding arm 151K. When the left hand wheel 120 associated with bars 90G and 90H passes from 9 to 0 the pawl 156 is lifted and lifts the latch 159 whereby the rack 152K is permitted to move one extra step thereby carrying or transferring one unit to the left hand wheel 120 in the next group.

Similarly for the right hand wheel 120 associated with bars 90I and 90J there is provided a transfer pawl 156 connected by a bail 158 to a transfer latch 159 controlling the rack element 152N on the reading bar 90M associated with the right hand wheel 120 in the next group.

The above description of the entering of four partial quotient digits of course only refers to those denominations in which there are four partial quotients to enter. In some denominations there will be only three partial quotients, in others two and in others one only.

After the reading bars have been restored, one accumulator wheel 120 of each pair will hold a digit derived from the sum of two partial quotient digits in the respective denominations and the other wheel of the pair will hold a digit derived from the sum of the other two partial quotient digits in the same denomination. It is now required to add these two digits together and enter their sum into another accumulator 185 hereinafter referred to as the second fractional multiplicand accumulator.

To this end a pair of transmission bars 180, 181 (Fig. 3) are provided for each denomination in the fractional multiplicand. These bars are guided for vertical movement by slots 182 in the bars engaging cross rods 183 and each bar has teeth 184 at its lower end for engagement with the corresponding wheel 120 of the first fractional multiplicand accumulator.

The second fractional multiplicand accumulator has one wheel 185 for each pair of wheels 120 in the first fractional multiplicand accumulator and the two bars 180, 181 whose racks 184 engage with the respective wheels 120 of a pair of wheels of the first accumulator both engage with the one corresponding wheel 185 of the second accumulator, one bar 180 engaging with the right hand side of the wheel while the other bar 181 engages with the left hand side thereof.

To this end the bar 180 is offset to the right at its upper end this offset portion forming a rack 186, while the other bar 181 is offset to the left at its upper end, this offset portion forming a rack 187.

While the reading bars 90 are moving out to the stops and back again the transmission bars 180, 181 are maintained in a neutral position in which their lower racks 184 are out of engagement with the wheels 120 and both their upper rack portions, 186, 187 are out of engagement with the wheels 185. Further, the bars 180, 181 are held in their uppermost positions by a restoring bar 189 which engages under shoulders 190 formed on the portion 186 of the bar 180 and on a corresponding portion of the bar 181, this latter portion having no rack teeth.

In order to rock the racks, 184, 186, 187 into and out of engagement with their respective accumulator wheels 120 and 185 the bars 180, 181 are carried in a tilting frame comprising side plates 191 (Fig. 1B) pivoted on studs 192, these plates 191 being connected by the rods 183 which pass through the slots 182 in the bars 180, 181. The restoring bar 189 is guided in slots 193 in these plates 191 so that it maintains its position relative to the bars during rocking of the plates 191. The mechanism for rocking the plates and for actuating the restoring bar will be described later.

The wheels 120 of the first fractional multiplicand accumulator are completely out of engagement with their reading bars 90 at 174° in the cycle in which the first card is read and at this time the tilting frame 191 is rocked to bring the lower racks 184 on the transmission bars 180, 181 into engagement with the wheels 120 of the first fractional multiplicand accumulator and the right hand upper racks 186 into engagement with the second fractional multiplicand accumulator wheels. At 189° the restoring bar 189 descends permitting springs, not shown, to pull the bars downwards until arrested by the wheels 120 reaching zero this movement ceasing at 213°. Since the right hand upper racks 186 were in engagement with the wheels 185 of the second fractional multiplicand accumulator the amounts to which the bars 180 have been set will be entered in the wheels.

At 218° the bars 180, 181 rock clockwise bringing lower racks 184 out of engagement with the first accumulator wheels 120 and the left hand upper racks 187 into engagement with the second accumulator wheels 185, the right hand upper racks 186 being at the same time disengaged from these latter wheels.

While the bars 181 are being moved to cause the racks 186 to disengage the wheels 185 and the racks 187 to engage said wheels an aligner bar, not shown, is provided to prevent the setting of the racks from being disturbed, due to the downward action of the spring. This aligner bar is constructed to act in a manner well known in the art and engages teeth, not shown, on the rear edges of racks 186 and the corresponding portions of racks 187, the arrangement being such that the aligner bar engages said teeth just before the racks 186 are disengaged from the wheels 185 and acts to retain the racks 186, 187 in their set positions until just after the racks 187 engage the wheels 185 when it is tripped out of engagement with the racks.

At 230° the restoring bar 189 starts to move up thereby raising the bars 180 and 181 and winding on to the accumulator wheels 185 the amounts transferred to the bars 181 from the first accumulator wheels 120. It will be noted that as the racks 186 and 187 engage opposite sides of the wheels 185 both the up and the down movements of the racks turn the wheels in the same direction so that on the restoration of the bars 180, 181 to their uppermost position each wheel 185 holds the sum of the digits in the corresponding right and left hand wheels 120 of the first accumulator i. e., the sum of all the partial quotient digits in the respective denomination. Thus the fractional multiplicand is now held in the second fractional multiplicand accumulator 185 and can be read out of this accumulator when required.

The accumulator wheels 185 are provided with transfer mechanism of usual form comprising a transfer cam 195 in each wheel engaging a transfer pawl 196 co-operating with a lug 197 on the rack 187 in the next higher denomination whereby when any wheel 185 passes from 9 to 0 one unit is transferred to the wheel of the next higher denomination.

Pivoted on shaft 200, fixed in frame 191, is a latch 201 and when frame 191 is rocked to engage racks 187 with wheels 185 latch 201 and shaft 200, are moved counter-clockwise together with pawl 196. The tail of latch 201 is then moved out of engagement with rod 202.

If a transfer occurs pawl 196 is rocked clockwise and latch 201 engages with shoulder 203 and holds pawl 196 in transfer position.

When the racks 187 are moved out of engagement with wheels 185 the tail of latch 201 again engages fixed rod 202 before the racks are rocked fully to their neutral position. Thus during the last part of the movement of the racks the latch pivots anti-clockwise about the shaft 200 so that it is withdrawn from engagement with shoulder 203 and returns to the position shown in Fig. 3.

In order to rock the plates 191 each plate has pivoted to it at 210 a lever 211 pivoted at 212 to the machine frame and carrying at its lower end a roller 213, Fig. 7, co-operating with the cam 142 on the front upper camshaft 143.

The restoring bar 189 for the transmission bars 180, 181 is operated by the following mechanism.

Pivoted to the restoring bar 189 at 220 is a link 221 (Fig. 1B) pivoted at its lower end to a lever 222 which is pivoted at 223 to the side plate 1 of the base section of the machine and carries at its other end a roller 224 spring urged against a cam 225 (Figs. 1A and 34) secured to the selection shaft 3. Accordingly at each revolution of the selection shaft the spring rocks the lever 222 under control of cam 225 whereby the link 221 is moved up and down to reciprocate the restoring bar 189 in accordance with the timing already described.

The foregoing has described the entering of the multiplier into the multiplier accumulator and the entering of the fractional multiplicand into the second fractional multiplicand accumulator.

During these operations the whole number multiplicand is entered into the tens multiple accumulator by the following means.

As already explained there is a whole number multiplicand reading bar 91 co-operating with each column of whole number multiplicand stops 47 and these multiplicand reading bars are under the control of a separate restoring bar, 246.

The reading bars 91 (Fig. 3) are provided on their under edges with rack teeth 226 which are permanently in mesh with toothed wheels 227 and each wheel 227 has rigidly connected to it a coaxial toothed wheel 228 with which co-operates a vertical rack bar 229 hereinafter referred to as the tens multiple transfer bars.

Each bar 229 is formed with rack teeth 230 at its front lower edge which are permanently in mesh with the wheels 228 and at its upper end each bar 229 (Fig. 3) is formed with rack teeth 231 on its rear edge for engagement with the wheels 232 of the tens multiple accumulator and with rack teeth 233 on its front edge for engagement with the wheels 185 of the second fractional multiplicand accumulator.

In order to permit the rack teeth on the bars 229 to engage with the wheels 185 or the wheels 232 at the proper times the bars 229 are formed with longitudinal slots 234 through which pass transverse rods 235 fixed at their ends to a pair of levers 236 (Fig. 1B) one at each side of the machine, these levers 236 being pivoted about the shaft 237 on which the wheels 227, 228 are mounted.

The lower end of each lever 236 carries a roller 238 co-operating with a cam 239 (Figs. 8 and 28), secured to the front upper camshaft 143. This cam has two gaps 240 and 241 but except during cycles of the selection shaft the gap 240 is masked by an overriding cam 242 (Figs. 9 and 28) free on shaft 143 and latched to cam 239 by a latch 243 pivoted to the cam 242 and engaging a lug 244 on cam 239. The mechanism which engages the selection shaft clutch also operates a lever 245 pivoted on the fixed stud 147a to disengage the latch 243 and hold the overriding cam 242 stationary so that during selection cycles the two gaps 240 and 241 of the cam 239 are operative.

Bars 229 have a restoring bar 246 mounted in slots 247 in bars 248 guided for vertical movement by slots 249 in the bars engaging pins 249a on the levers 236, Fig. 38. Bars 248 have teeth 290 engaging idler wheels 291a meshing with teeth 292 on the undersides of slides 96. Consequently as slides 96 move rearwards to permit restoring bar 95 to release the reading bars 90, 92, 93, so the bars 248 descend to release bars 229.

Since the bars 229 are geared to the reading bars 91 the latter are free to move out with the other bars 90, 92, 93.

The operation of the above described mechanism is as follows.

At the beginning of the second cycle of the mainshaft 60 (in which cycle the first card is sensed) the selection shaft 3 is rotating and the latch 243 is therefore disengaged, so that the overriding cam 242 is stationary. The roller 238 is in the gap 240 in cam 239 and the rack bars 229 are in their extreme counter-clockwise position, so that the rack teeth 231 at their upper ends are in engagement with the wheels 232 of the tens multiple accumulator.

At 20° the restoring bar 95 moves forwardly to restore the reading bars and bar 246 moves up, but this movement is idle as the multiplicand bars and therefore bars 229 are already at zero.

At 358° in the first cycle the end of the gap 240 reaches the roll 238 and the rise of the cam 239 rocks the bars 229 into a neutral position in which their rack teeth 231 are disengaged from the wheels 232, reaching this neutral position at 13° in the second cycle.

At 96° the restoring bar 95 commences to move rearwardly bringing the restoring bar 246 down so that the multiplicand reading bars 90 commence to move out to the stops 47 while the bars 229 are still in the neutral position so that the bars 229, through the gears 227, 228, are set to the value of the whole number multiplicand.

Then at 120° the roll 238 drops into the gap 241 in the cam 239 whereby the bars 229 are rocked counterclockwise from the neutral position to bring the upper racks 231 into engagement with the tens multiple wheels 232. Consequently when the restoring bar 246 restores the multiplicand reading bars 90, the amount to which the latter were set, namely the whole number multiplicand, is wound on to the tens multiple accumulator wheels 232 through the bars 229.

Then at 165° the transmission bars 229 are rocked clockwise to bring their racks 231 out of engagement with the tens multiple accumulator wheels 232.

Accordingly at the end of the operations described above the whole number portion of the multiplicand is in the tens multiple accumulator 232, the fractional multiplicand is in the second fractional multiplicand accumulator 185, the whole number portion of the multiplier is in the whole number multiplier accumulator 121 and the fractional multiplier is in the fractional multiplier accumulator 122.

According the stop basket 45 can be cleared as soon as the reading bars have been restored. This clearing operation is effected during the descent of the pinbox from 210° to 270° during which time the stops, which have been held up by the pins in the pinbox, drop by reason of the descent of the latter.

Before the operation of entering the partial quotients into the second fractions accumulator 185 has been completed, multiplication by the units digit of the whole number multiplier commences, and the multiplying mechanism will now be described.

At 278° in the second cycle (the cycle in which the first card was sensed) the roll 238 drops into the gap 240 in cam 239 whereby the tens multiple transmission bars 229 again rock into engagement with the tens multiple wheels 232 and then at 297° the restoring bars 95 and 246 commence to move out again to release the reading bars 90, 91, 92, 93 to the action of their springs. As the stops have previously been reset the multiplicand reading bars 90, 91 move out until arrested by the tens mutiple wheels 232 reaching zero, whereby the multiplicand reading bars are set to the amount entered into the tens multiple accumulator, which is the original or whole number mutiplicand read from the card.

Before the restoring bar 95 commenced to move in the multiplier and first fractional accumulator wheels were raised into engagement with their respective upper racks by the high parts 136a of cam 136 engaging roll 135 at 278° in the cycle. When the restoring bar 95 moves out, the fractional multiplicand reading bars 90 remain at zero because their accumulator wheels 120 are at this time clear.

The multiplier accumulator wheels 121 and 122 are however positioned to the value of the multiplier and, under control of mechanism about to be described, the units whole number multiplier reading bar 92 moves in until arrested by the units accumulator wheel 121 reaching zero, all the other multiplier reading bars 121 and 122 remaining at zero.

The mechanism for controlling the movements of the multiplier reading bars, so that, in each multiplying cycle, only one multiplier reading bar is effective is constructed as follows (Figs. 11–14).

Each multiplier reading bar 92, 93 has a lug 250 at its front end and these lugs co-operate with an escapement bar 251 which is mounted to slide transversely of the reading bars. The escapement bar 251 has a lug 252 through which freely passes a rocking shaft 253 and another lug 254 through which freely passes a fixed guide rod 255 so that the transverse movement of the escapement bar 251 is guided by the shaft 253 and rod 255. The bar 251 also has another lug 254a through which both the rod 255 and the shaft 253 pass. The rod 255 is supported at one end by a frame plate 256 attached to the left hand side plate 2 by fixed rods 257 and at the other end by a U-shaped bracket 258 bolted to the outside of the side plate, the rod 255 passing through an aperture 259 in the side plate.

The shaft 253 is supported at one end in the right hand side plate 2 and at the other end in the U-shaped bracket 258 and passes through the frame plate 256 and the aperture 259 in the left hand side plate.

Pivoted on a shaft 260 mounted in the left hand side plate 2 and the frame plate 256 is a series of multiplier setting fingers 261, there being one finger for each denomination of the whole number multiplier and one finger for each denomination of the number representing the fraction in the multiplier. Each of these fingers, Fig. 39, has an arcuate tail 262 the upper edge of which is normally engaged by a lug 263 on a latch 264 pivoted on a shaft 265, the latch holding the finger in the position shown in Fig. 14. Each latch 264 is extended beyond the pivot shaft 265 by an arm 266 carrying a pin 267 standing in front of a cam face 268 on the lug 250 at the front end of the corresponding multiplier reading bar 92, 93.

Formed in the escapement bar 251 are seven narrow slots 270 and a wider slot 271. The escapement bar is urged to the left by a spring 272 and is returned to the right against the action of the spring by a restoring bar 273 carried by an arm 274 pivoted at 275 on a fixed bracket 276 and actuated through a link 277 pivoted at its lower end to a lever 278 pivoted to the side plate 2 at 279 and carrying at its other end a roller 280 engaging a cam 281 secured to the selection shaft 3 (Figs. 1A and 1B).

The escapement bar 251 moves step by step from right to left during multiplying operations, one step for each multiplying cycle and is restored by the restoring bar 273 during the next following card sensing cycle when the selection shaft 3 makes its one revolution.

The step by step movements of the escapement bar 251 are controlled by a pawl member in the form of a tube 282 through which passes the rocking shaft 253, the tube having two flats 283 therein engaging a flat 284 on the shaft 253 whereby the tube is rocked with the shaft, but is still free to slide along it. The tube 282 carries two pawl arms 285 and 286 at its right hand end which co-operate with the multiplier setting fingers 261 to control the movements of the escapement bar 251 in the manner explained below, and the tube 282 is urged to the left by a spring 287 and carries a depending lug 288 standing in the path of the escapement restoring bar 273 whereby the pawl 282 is restored with the escapement bar at each revolution of the selection shaft 3.

As will be explained later, just prior to any cycle in which the selection shaft 3 commences to make a revolution the escapement pawl 282 moves to the extreme left hand end of its travel. At 20° in the next multiplying cycle the restoring bar 95 commences to restore the multiplier reading bars 92 or 93 of the last multiplying cycle and at 50° this reading bar reaches its zero position, in which its lug 250 is clear of the escapement bar 251 which is consequently free to move. From 66° to 80° the cam 281 on the selection shaft actuates the restoring bar 273 to restore the escapement bar 251 and pawl 282 to their extreme right hand positions.

In this position of the escapement bar the wide slot 271 is in register with the units multiplier reading bar 92 and each of the seven narrow slots 270 is in register with a corresponding denominational multiplier reading bar. This position obtains in every card reading cycle, e. g., the second cycle already described.

At 96° in this second cycle the cam 102 commences to move the restoring bar 95 rearwardly and the multiplier reading bars 92, 93 are free to move out to take a setting from the stops, 48, 49, their lugs 250 passing through the slots 270 and 271 in the escapement bar 251. As each multiplier reading bar leaves the zero position the cam face 268 formed on its lug 250 engages the pin 267 on the corresponding arm 266 whereby the corresponding latch 264 is rocked clockwise about the shaft 265. This movement of the latch releases the corresponding setting finger 261 which consequently rocks anticlockwise about the shaft 260 under the action of a spring 290, Fig. 39, connecting the finger to the latch. This movement of the finger brings it into the path of the pawl arm 285 on the escapement pawl tube member 282.

Accordingly when all the multiplier reading bars 92, 93 have moved up to the stops 48, 49 which have been set in the respective denominational columns of the basket 45 the corresponding denominational setting fingers 261 will be standing in the path of the pawl arm 285 on the tube member 282. In order that significant zeros in the multiplier may be taken care of each latch 264 is formed with a lug 291, Fig. 39, which engages the next latch to the right so that the action of releasing any one of the latches 264 also releases all latches to the right of it and sets the corresponding fingers 261 irrespective of whether the corresponding multiplier reading bar has moved from its zero position. It is pointed out that the latch for the lowest denomination of the fractional multiplier does not engage the latch for the highest denomination of the whole number multiplier.

From the foregoing it will be seen that after the multiplier reading bars 92, 93 have taken a setting from the stops 48, 49 the corresponding setting fingers 261 will be set in the path of the pawl arm 285 including fingers in those denominations, lower than the highest denomination, in which a zero occurs in the multiplier.

The setting of the fingers 261 occurs at 100° in the card reading cycle (second cycle) and at 168° the restoring bar 95 has returned the multiplier reading bars to the zero position, at which time the escapement bar is free to move, the lugs 250 passing through the slots in the escapement bar 251 which is still held in the extreme right hand position. The restoring bar 95 continues to return, bringing the reading bars to the "transfer" position at 164° in which position the lugs 250 are clear of the escapement bar 251 so that the latter is free to move.

At 165° the cam 281 on the selection shaft 3 releases the escapement bar 251 to the action of its spring 272 so that as the reading bars reach zero at 162° the escapement bar 251 and the pawl tube 282 move to the left until arrested by the pawl arm 285 engaging the units multiplier setting finger 261 which, as explained above, is now in the path of the arm 285. This movement of the escapement bar 251 brings the narrow slots 270 out of register with the corresponding lugs 250 on the reading bars in denominations above the units, but the slot 271, being wider, is still in register with the lug 250 on the units reading bar, so that the latter is free to move out again when released by the restoring bar 95, while the reading bars in higher denominations and also the fractional multiplier reading bars are prevented from moving by engagement of their lugs 250 with the face of the escapement bar 251 between the slots 270.

Later in the second cycle (in which cycle the first card is sensed) namely from 278° to 293° the roll 238 drops into the gap 240 in cam 239 whereby the levers 236 rock the tens multiple transmission bars 229 counterclockwise into engagement with the tens multiple accumulator wheels 232. Also from 278° to 287° the high part 136a of cam 136 on the front lower camshaft 103 raises the multiplier accumulator wheels 121 and 122 into engagement with the racks 92b, 93b on the respective reading bars 92 and 93 and the first fraction accumulator wheels 120 into engagement with the teeth on the upper racks 153 of the fractional multiplicand reading bars 90. Then from 297° to 321° the gap 107 in the cam 102 permits the levers 97 to rock counterclockwise thereby moving the restoring bar 95 to release the reading bars 90, 91, 92, 93 to the action of their springs.

In this connection it will be remembered that the stops 46, 47, 48, 49 in the arithmetical stop basket 45 have been reset at 210° and are therefore not standing in the path of movement of the reading bars.

Considering first the whole multiplicand reading bars 91, these bars are connected through the gears 227, 228 to the tens multiple transmission bars 229 which are now in engagement with the tens multiple wheels 232 in which the whole multiplicand is contained. Accordingly the multiplicand reading bars 91 move in until arrested by the arrival of the tens multiple wheels 232 at zero whereby the multiplicand reading brs 91 are set to the amount of the original multiplicand read from the card.

The whole number and fractional multiplier reading bars 92, 93 with the exception of the units whole number bar are all held back by engagement with the face of the escapement bar 251 but the units whole number bar, being in register with the wide slot 271 moves forward until arrested by the units wheel 121 of the whole number multiplier accumulator reaching zero, whereby the units whole number reading bar 92 is set to the value of the units digit of the whole number multiplier.

Since the first fractions multiplicand accumulator 120 is already at zero the corresponding reading bars 90 do not move.

Secured to the shaft 253 on which the escapement pawl tube 282 is mounted is an arm 302 (Fig. 15) connected by a link 303 to a lever 304 pivoted at 305 to the machine frame and carrying a roller 306 engaging a cam 307 secured to the front lower camshaft 103 at its right hand end.

From 210° to 222° in each cycle the cam 307 rocks the shaft 253 clockwise (in Fig. 14) and from 228° to 240° the shaft 253 rocks back counter-clockwise under the action of a spring, not shown. The clockwise rocking of the shaft 253 takes the escapement pawl tube 282 with it whereby the pawl arm 285 is rocked out of the path of the units multiplier setting finger 261. This movement of the tube 282 also brings the other pawl arm 286 into the path of the units setting finger 261. As the arm 285 moves clear of the units finger, the tube 282 moves along the shaft 253 under the action of its spring 258 until it is arrested by engagement of the pawl arm 286 with the units setting finger 261, this movement being equal to half the pitch of the reading bars.

Then when the shaft 253 and tube 282 rock counterclockwise the arm 286 is rocked out of engagement with the units setting finger 261 and the arm 285 is rocked back in alignment with the setting fingers, but in a position between the units and tens setting fingers. Consequently the tube 253 moves further along the shaft until arrested by the pawl arm 285 engaging the tens setting fingers 261.

The left hand edge of the escapement bar 251 is behind the lug 288 on the escape pawl 282, the spring 272 tending to cause the escape bar to follow the movement of the tube 282.

The bar 251 does not, however, immediately follow the tube 282 because at the time when the tube moves, the restoring bar 95 is moving in so that the springs of the multiplier reading bars with the exception of the units bar are pulling the lugs 250 against the face of the bar 251 and the friction prevents the movement of the bar.

At 320° the selection shaft has completed its one revolution and therefore stops. At the end of the second cycle the multiplicand reading bars 91 are, as described above, in positions representing the multiplicand and the units whole number multiplier reading bar 92 is positioned to represent the units digit of the whole number multiplier.

The mechanism for adding the logarithm of the units multiplier digit to the logarithms of the individual digits of the multiplicand to produce logarithmic partial products will now be described.

Disposed above the multiplicand reading bars 90 is a logarithmic multiplicand stop basket (Figs. 1A, 1B, and 16–20 and 40) including a U-shaped frame comprising side arms 310 and a rear transverse bar 311. Each side arm 310 is provided with double flanged rollers 312 engaging rails 312a constituted by the sides of a frame 313 so that the frame 310—311 can move longitudinally.

Mounted within the U-shaped frame 310—311 is a number of telescopic frames, shown in plan in Fig. 16, there being one telescopic frame for each multiplicand denomination. Each telescopic frame comprises a fixed section 324 and a section 325, see Fig. 40, which is movable with the U-shaped frame 310—311. Each of these sections is in the form of an elongated rectangular box and each has a portion cut away to admit the other whereby a telescopic sliding movement of the two sections relatively to one another is attained.

The top and bottom plates of each movable section 325 are extended rearwardly to form lugs 326 embracing between them the transverse bar 311 of the U-shaped frame 310—311 and these lugs 326 are attached to said bar 311 whereby all the sections 325 are movable longitudinally as a unit with said frame 310—311.

At their forward ends the top and bottom plates of each fixed section 324 are extended to form lugs 327 embracing between them a transverse bar 328 having its ends fixed to the frame 313 by means of plates 329.

In order to guide the sections 325 in their sliding movement relatively to the sections 324, each section 325 carries a pin 330 engaging in a slot 331 in the next higher denominational section 324 and each section 324 has a pin 332 engaging in a slot 333 in the next lower denominational section 325.

The frame 313 carries double flanged rollers 314 at its corners engaging rails 317 formed by the edges of openings 316 in the side plate 2 so that the frame 313 can move up and down, taking the stop basket 310 with it. Accordingly the logarithmic stop basket 310 is enabled to move both horizontally and vertically.

The frame 313 is extended downwardly at each side to form an arm 318 guided by a pin and slot 319 and carrying at its lower end a roller 320 engaging a cam 321 on the mainshaft 60, Fig. 35, whereby the frame and the stop basket 310 are reciprocated vertically at each revolution of the mainshaft in the manner described below.

Housed in each movable section 325 of the logarithmic stop basket is a group of logarithmic stops 322 there being thus one group for each multiplicand denomination and in each group there is one stop for each digit of the denomination to which the group is appropriated, including the digit "zero."

Thus each decimal of one penny group has ten stops 322a the pence group has twelve stops 322b, the units of shillings group has ten stops 322c, the tens of shillings group has two stops 322d representing 0 and 1 respectively, while all the remaining groups have ten stops 322e respectively.

In each group the upper ends of the stops are spaced apart in the direction of longitudinal movement of the basket in accordance with the values of the logarithms of the digits represented by the stops, the lower ends of the stops being spaced arithmetically.

Thus the distance between the 2 stop and the 4 stop is the same as the distance between the 4 stop and the 8 stop, and the distance between the 3 stop and the 9 stop is the same as the distance between the 1 stop and the 3 stop.

It may here be pointed out that the distance between the 0 stop and the 1 stop is arbitrary but must be the same for each group.

For a constructional reason which will be explained later the upper ends of the settable stops 322 in any one group are staggered so that they are not disposed in a single column, but are arranged in three columns in the decimal groups, and four columns in the pence group.

The three columns in the decimal groups contain respectively the 1, 5 and 7 stops, the 2, 4 and 8 stops, and the 3, 6 and 9 stops while the pence group, in addition to these three columns, has a fourth column containing the 10 and 11 stops.

For the purpose of setting the stops 322 they are shaped so that the lower ends of the stops in one group are all disposed in a single column (see Fig. 19) and are equally spaced apart so that at their lower ends the stops represent the arithmetical digits while at their upper ends they represent the logarithms of these digits.

The logarithmic stops 322 are set from the multiplicand reading bars 91, each of which runs below the lower ends of the stops 322 of the corresponding denominational group. The stop basket 310 can occupy any one of three positions in the vertical direction, namely a lowermost position, a mid position and an uppermost position.

Towards the end of each cycle of the mainshaft 60 the stop basket 310 is in its lowermost position, the roller 320 being in engagement with the portion 323 of the cam 321. At 357° the cam commences to lift the frame 313 until at 15° in the next cycle the frame with the basket 310 has reached the mid position, in which it remains.

At the time in the cycle when the multiplicand reading bars 91 are taking their setting from the tens multiple wheels 232 the stop basket 310 is in its mid position so that the lower ends of the stops 322 do not interfere with the outward movement of the reading bars. Each multiplicand reading bar 91 carries at its leading end an upstanding lug 355 which, as the reading bar passes its successive digital positions, becomes positioned immediately below the corresponding stop in the associated column of stops 322 in the logarithmic stop basket. Accordingly when at 321° in the second cycle the multiplicand reading bars 91 become set to the value of the original multiplicand, their lugs 355 are positioned below the logarithmic stops 322 corresponding to the digits of the multiplicand.

Immediately after the reading bars have thus been set the roller 320 enters the lowermost part 323 of the cam 321 at 321° whereby the stop basket 310 descends to its lowermost position at 345° so that all the stops 322 under which a lug 355 has been positioned will become raised relatively to the basket. This operation therefore, sets up the multiplicand in the logarithmic stop basket 310.

At 351° the basket 310 rises to its mid position and stops there at 15° in the next cycle.

In order to lock the stops 322 after they have been set, a known form of locking slide co-operating with cam projections on the lower portions of the stops may be provided for each column. The action of raising any stop moves the locking slide to release any previously set stop in the same column after which the locking slide springs back to lock the newly set stop.

Immediately after the stops 322 have been set, the basket 310 moves forward to an extent representing the logarithm of the units multiplier digit, whereby this logarithm is added to the logarithms of the individual digits of the multiplicand, which digits are represented by the stops which have been set in the basket 310.

To this end the basket 310 carries two blocks 360, Fig. 20, at each side between which engages a roller 361 on a lever 362 pivoted at 363 to the side plate 1, and carrying at its lower end a roller 364 engaging a cam 365 secured to the mainshaft 60. The cam 365 and lever 362 positively return the basket from left to right, Fig. 1A, whereas the movement in the opposite direction is effected by a spring, not shown, under control of the following mechanism.

Mounted on each side of the frame 313 is a control plate 367 (Figs. 1A and 1B) for the forward movement of the basket, each plate 367 having slots 368 whereby it is guided for vertical movement on pins 369 projecting from the side plate 1.

Guided on one of the pins 369, by means of a slot 370 is a link 371 there being one of these links at each side of the machine and at their other ends these links are guided by pins, not shown, in slots 371a and are connected by a crossbar 372 disposed below the multiplier reading bars 92 and 93 and passing through slots 372a, Fig. 3, in the side plates. Pivoted to the side of each multiplier reading bar 92, 93 is a latch 373 (Figs. 3 and 14) and when the multiplier reading bars are prevented from moving forward by engagement with the face of the escapement bar 251 the tails 374 of their latches also engage the face of the escapement bar whereby the latches are held rocked clear of the crossbar 372.

When the restoring bar 95 moves out in the second cycle the latches 373 in denominations other than the units whole number denomination are still held clear of cross bar 372 by engagement of their lug 250 with the face of the escapement bar 251. The units whole number reading bar 92 passes through the wide slot 271 in the escapement bar and follows the restoring bar 95. The reading bar is arrested by the units multiplier wheel 121 reaching zero, but the restoring bar 95 continues its movement leaving the reading bar behind whereupon a spring 375 rocks the corresponding latch 373 counter-clockwise so that its nose stands in the path of the cross bar 372.

As already explained the units multiplier reading bar is set to the units multiplier digit at 321° in the second cycle (the cycle in which the first card is sensed) and in the manner explained below the crossbar 372 moves forward under spring action until it is arrested by the nose of the latch 373 attached to the units multiplier reading bar. Accordingly each of the links 371 pivoted to the ends of the crossbar 372 will move rearward an amount representing the units multiplier digit. This positioning of the links 371 is completed at 321° in the second cycle.

The crossbar 372 is urged to the left by springs, not shown, attached to each link 371 and has the same travel as the restoring bar 95, the initial stage of its rearward movement, equal to two stop pitches, being idle. At the front end of each link 371 is a pad 378 (Fig. 1B) which, when the slides 96 are fully restored to the right, engages with the front end of the corresponding slide 96. As the slides 96 move rearwardly the cross bar 372 also moves rearwardly until arrested by the nose of the latch 373 attached to the units multiplier reading bar. Accordingly each of the links 371 will also move rearwardly.

Freely mounted in the slot 370 in each link 371 is a stud 382 which is urged against the front end of the slot 370 by a spring 382a, and each stud co-operates with a series of arithmetical steps 383 on the associated control plate 367, the studs being normally under the zero step 383.

The front ends of the slots 370 are normally two stop pitches to the right of the studs 382 so that the initial rearward movement of the links 371 is idle to the extent of two stop pitches. After that the studs 382 are moved rearwardly by the links 371 to an extent representing the multiplier digit and, as they thus move, the plates 367 commence to descend under the action of springs, not shown.

Each stud 382 is carried in a member 400 which is free to slide on the link 371 and has ratchet teeth 401. Pivoted on stud 369 is a pawl 402 co-operating with said teeth 401.

When a digit, for example, six, is set up in any multiplier denomination, the slides 400 will be moved six pitches to the left by their links 371 as the corresponding denominational multiplier reading bar moves to the left. The slides 96 restore the links 371 before the plates 367 descend, but the studs 382 are maintained in the set position by the pawls 402, so that the descent of the plates 367 is arrested by engagement of the No. 6 steps 383 with the studs 382.

Formed in each plate 367 is a slot 385 of logarithmic form in accordance with the logarithms 1 to 9 and engaging in this slot is a pin 386 on the lever 362. When the studs 382 move away from the zero position the plates 367 descend until arrested by the upper edge of the slot 385 engaging the pin 386, this movement being equal to the depth of one of the steps 383.

This movement is completed by 321° in the second cycle by which time the crossbar 372 has been positioned in accordance with the units whole number multiplier digit.

At 40° the cam 365 releases the levers 362 to the action of their springs whereupon the levers 362 rock counterclockwise, their pins 386 sliding along the logarithmic slots 385 and thereby permitting of lowering of the plates 367 until arrested by one of the steps 383 engaging the stud 382 which has been positioned beneath it by the movement of the crossbar 372, this step representing the units digit of the whole number multiplier. By this means the plates 367 are positioned in accordance with the units whole number multiplier digit.

Formed along the upper edge of each plate 367 is a series of logarithmic multiplier steps 387 and when the plates are in their normal uppermost position a lug 388 on each lever 362 engages the zero step 387. The steps 387 are so formed that when a plate 367 descends to an extent corresponding to the arithmetical digit represented by one of the steps 383, a step 387 representing the logarithm of that digit is positioned in the path of the lug 388 on the corresponding lever 362.

As already mentioned the initial movement of the plates 367 before they are arrested by engagement of the upper edge of slot 385 with pin 386 is equal to the depth of one of the arithmetical steps 383 so that, as the levers 362 rock counter-clockwise and cause the plates 367 to descend further, each plate 367 is always one unit in advance of the lug 388. When the plate is arrested by engagement with the step 383, the lever 362 continues its movement until arrested by engagement of the lug 388 with the corresponding logarithmic step 387. During the movement of the lever 362, which is contemporaneous with the descent of the plate 367, the pin 386 on the lever is in engagement with the upper edge of the slot 385 and the movement of the lever after the plate is arrested brings the pin 386 into engagement with the lower edge of the slot 385.

In the last multiplying cycle the restoring bar 95 moves out and back twice, firstly to permit the plates 367 to be set to the amount of the last multiplier digit, and secondly to permit all the multiplier reading bars to move out to take a new setting from the stops. This second excursion of the reading bars must not affect the plates 367 and to this end a latch 700 is provided for the links 371. This latch is pivoted to the frame at 701 and is urged by spring 702 to a position on which it is clear of the pad 378. A pin 704 on the link 130 which raises and lowers the multiplier accumulator 120, 121, 122, lies above the other end of latch 700 and when, during the last multiplying cycle, the link 130 is lowered, the pin 704 rocks latch 700 counter-clockwise, thereby bringing it into the path of pad 378 whereby the links 371 are prevented from moving when released by the restoring bar 95.

As already explained, the levers 362 are pivoted to the logarithmic multiplicand stop basket 310 by the rollers 361 which engage between the blocks 360 at the side of the basket. Accordingly the counterclockwise movement of the levers 362 carries the stop basket 310 with them, thereby positioning it in advance of its normal position by an amount representing the logarithm of the units digit of the whole number multiplier.

This action has resulted in advancing all the set stops 322 in the logarithmic multiplicand stop basket 310 by an amount representing the logarithm of the units multiplier digit. The logarithmic scale of the steps 387 is the same as that of the stops 322. Accordingly the advance of the stop basket 310 has resulted in the addition of the logarithm of the units multiplier digit to the logarithms of each of the multiplicand digits individually so that the position of each multiplicand stop 322 with reference to the original position of the zero stop in the same denomination (before the basket 310 had moved) now represents the logarithm of the partial product arising from multiplication of the corresponding multiplicand digit by the units multiplier digit.

These logarithmic partial products are now converted into their arithmetical values and entered into a partial product accumulator.

To this end a translator 390 is provided for cooperation with the stops in the logarithmic stop basket 310. This translator comprises a frame or box within which are mounted a number of groups of columns of connection wires 391. It will be remembered that the upper ends of the stops 322 in each multiplicand group are staggered, each decimal group having three columns containing respectively the 1, 5 and 7 stops, the 2, 4 and 8 stops and the 3, 6 and 9 stops, while the pence group has a fourth column containing the 10 and 11 stops.

In the translator there is a group of columns of wires 391 for each group of columns of stops 322 and in each translator group there is a column of wires 391 corresponding to each column of stops in the corresponding group of multiplicand stops 322.

Within each translator group each column contains wires 391 spaced in accordance with the logarithms of all possible partial products obtainable from the digits represented by the stops 322 in the corresponding column of the multiplicand group associated with the translator group.

Considering the pense group of columns of translator wires 391 (shown in Figs. 21 to 24), this group comprises four columns of wires corresponding to the four columns of stops 322 in the pence group of the logarithmic multiplicand stop basket 310 (see Fig. 16).

The wires 391 of column A (Fig. 21) have their lower ends spaced to represent the logarithms of the partial products of the pence digits 2, 4 and 8 multiplied by all the digits 1, 2 ... 8, 9. The wires of column B (Fig. 22) have their lower ends spaced to represent the logarithms of the partial products of the pence digits 3, 6 and 9 multiplied by all the digits from 1 to 9, the wires of column C (Fig. 23) have their lower ends spaced to represent the logarithms of the partial products of the pence digits 1, 5 and 7 multiplied by all the digits 1 to 9, and the wires in the left hand half of column D (Fig. 24) have their lower ends spaced to represent the logarithms of the pence digits 10 and 11 multiplied by all the digits 1 to 9.

The wires 463 in the right hand half of column B and D are for handling tens multiples of pence and will be referred to later.

Although the translator wires 391 at their lower ends are logarithmically arranged in columns, their upper ends are arranged on an arithmetical scale, the wires being appropriately bent to achieve this arrangement. Thus the wires themselves serve as means for converting the logarithmic values of the partial products as expressed by the spacing of the lower ends of the wires to their corresponding arithmetical values as expressed by the spacing of the upper ends of the wires.

In the pence group of columns of wires 391 any wire of which the lower end represents the logarithm of a pence value greater than 11d. is branched, the upper end of one branch representing the pence digit while the upper end of the other branch represents the units of shillings digit of the partial product. In Figs. 21 to 24 the pence branches are shown in full lines and the units of shillings branches in dotted lines.

Thus the upper ends 392 of the four columns of pence wires 391 are arranged in two columns only, one for pence and the other for units of shillings. Accordingly where the same value occurs in two different columns of the same group, for example, the value 20 pence in columns A and D (Figs. 21 and 24) then the pence branch AP in column A is connected to the pence branch DP in column D and the units of shillings branch AS in column A is connected to the units of shillings branch DS in column.

In a decimal group there are only three columns of wires 391 corresponding to columns A, B, and C in Figs. 21, 22 and 23, the column D for the values 10 and 11 not being required. Further in a decimal group the upper ends of the wires are arranged in the decimal system instead of the duodecimal system used for pence.

The lower ends of the wires 391 in any column of the translator are disposed in the same vertical plane as the corresponding column of stops 322 in the associated group in the stop basket 310 so that when the stop basket moves forward its columns of stops 322 move along below the corresponding columns of translator wires.

In each group of columns of partial product translator wires 391 each wire is so positioned that when the stop basket 310 is in its normal position each stop 322 is below the product wire of corresponding value.

Considering a simple numerical example, if the multiplicand is £37 and the units multiplier digit is 6 then in the units of pounds group in the logarithmic stop basket 310 the No. 7 stop will be set and in the tens of pounds group the No. 3 stop will be set.

The links 371 will move rearward to the extent of six digits thereby positioning their studs 382 under the No. 6 arithmetical steps 383 in the control plates 367. Accordingly the plates 367 will descend until the No. 6 logarithmic step 387 is in register with the lugs 388, the accompanying movement of the levers 362 causing a movement of the stop basket 310 proportional to log 6.

The No. 7 stop in the units of pounds column was initially in advance of the zero stop by a distance proportional to log 7 plus the arbitrary distance K between the zero stop and the No. 1 stop; and the No. 3 stop in the tens of pounds column was initially in advance of the zero stop by an amount proportional to log 3 plus the distance K.

After the basket 310 has moved rearward until arrested by engagement of the lugs 388 with the No. 6 logarithmic stops 387 the No. 3 stop will be in advance of zero by an amount equal to log $3+\log 6+K$, which equals log $18+K$. Likewise the No. 7 stop will be in advance of zero by an amount equal to log $7+\log 6+K$ which equals log $42+K$.

In these positions the No. 3 and No. 7 stops will respectively be below partial product wires representing log 18 and log 42, these wires being displaced from the zero position by distances which represent these amounts+the distance K.

The stop basket 310 has completed its rearward movement at 120° in the third cycle and then at 129° the high part 393 of the cam 321 lifts the frame 313 and with it the basket 310 to its uppermost position in which the set stops 322 raise the partial product wires beneath which they have been positioned. The basket reaches its uppermost position at 141° and remains there until 204° when it descends again to its mid position remaining there until 321°.

At 225° cam 365 and levers 362 commence to return the basket 310 to the right and at 305° the basket reaches the zero position. The levers 362 however travel one step beyond zero position and engage a pin 402a, Fig. 1a, on the pawl 402 to release the stud 382 which returns to normal position under spring action.

At the same time the movement of the basket beyond the zero position brings the ends of the resetting slides for the stop 322 into engagement with a fixed bar (not shown) whereby the slides are actuated to release the steps which were set.

As already mentioned, the translator wires 391 at their lower ends are arranged in groups, one group for each group of logarithmic multiplicand stops 322, and each group containing a number of columns of wires. In each decimal group the wires represent all the partial products obtained from the multiplication table from $1\times1$ to $9\times9$ and in the pence group there are, in addition, wires representing the products of 10 and 11 multiplied by 1 to 9. Further the spacing of the wires is in accordance with the logarithms of the products which they represent. Now these wires which have to be spaced closest together are the wires representing log 80 and log 81 and owing to the logarithmic spacing the distance between the wires representing log 1 and log 99 will have to be approximately 370 times the distance between the wires representing log 80 and log 81.

Consequently if all the wires 391 of a group were arranged in a single column the length of the translator would be considerable. Further, since the same logarithmic scale must be used for the spacing of the logarithmic steps 387 in the control plates 367 the travel of the logarithmic stop basket would also be considerable.

By arranging the wires of a group in several columns a smaller scale may be chosen and the size of the machine correspondingly reduced.

Although the translator wires 391 at their lower ends are logarithmically arranged in columns, their upper ends are disposed on an arithmetical scale, the wires being appropriately bent to achieve this arrangement. Thus the wires themselves serve as means for converting the logarithmic values of the partial products as expressed by the spacing of the lower ends of the wires to their corresponding arithmetical values as expressed by the spacing of the upper ends of the wires.

As above mentioned, the upper ends of the wires 391 represent the arithmetical values of the products and in order that these values may be read, these upper ends of the wires serve as stops indicated at 392 to position reading bars 405 which transfer the values to a partial product accumulator.

Many of the pence partial products, when converted into shillings and pence contain the same pence digit, e. g. the pence digit 8d. arises in the following six cases: $8d.\times1=0s. 8d.$;

$10d.\times2=20d.=1s. 8d.$; $8d.\times4=32d.=2s. 8d.$
$11d.\times4=44d.=3s. 8d.$; $8d.\times7=56d.=4s. 8d.$ and $10d.\times8=80d.=6s. 8d.$ Since there is only one translator wire 391 for each partial product, and not two wires, one for the shillings or tens digit and the other for the pence or units digit, and since also these wires are logarithmically spaced, the distance between the 8d. wire and 80d. wire is too great for all the six wires above mentioned to actuate a single stop 392 representing 8d.

Accordingly four separate 8d. stops 392 are provided, each located 8 units in advance of an associated zero position and these zero positions are located so that the particular translator wire which is to actuate the associated 8d. stop can be appropriately branched without excessive splaying or bending of the wires. The wires representing 32 pence and 44 pence are connected to a common 8d. stop and the wires representing 56 pence and 80 pence are likewise connected to a common 8d. stop.

In a similar manner each pence partial product digit which is derived from more than one pence multiple has a plurality of pence stops assigned to it, all the stops assigned to any particular digit having the value of that digit.

Thus with the pence group of columns of translator wires there is associated a plurality of groups of pence stops 392 the stops in each group being related to a zero position individual to that group.

The arrangement is shown diagrammatically in Figs. 21–24.

Figure 2B:
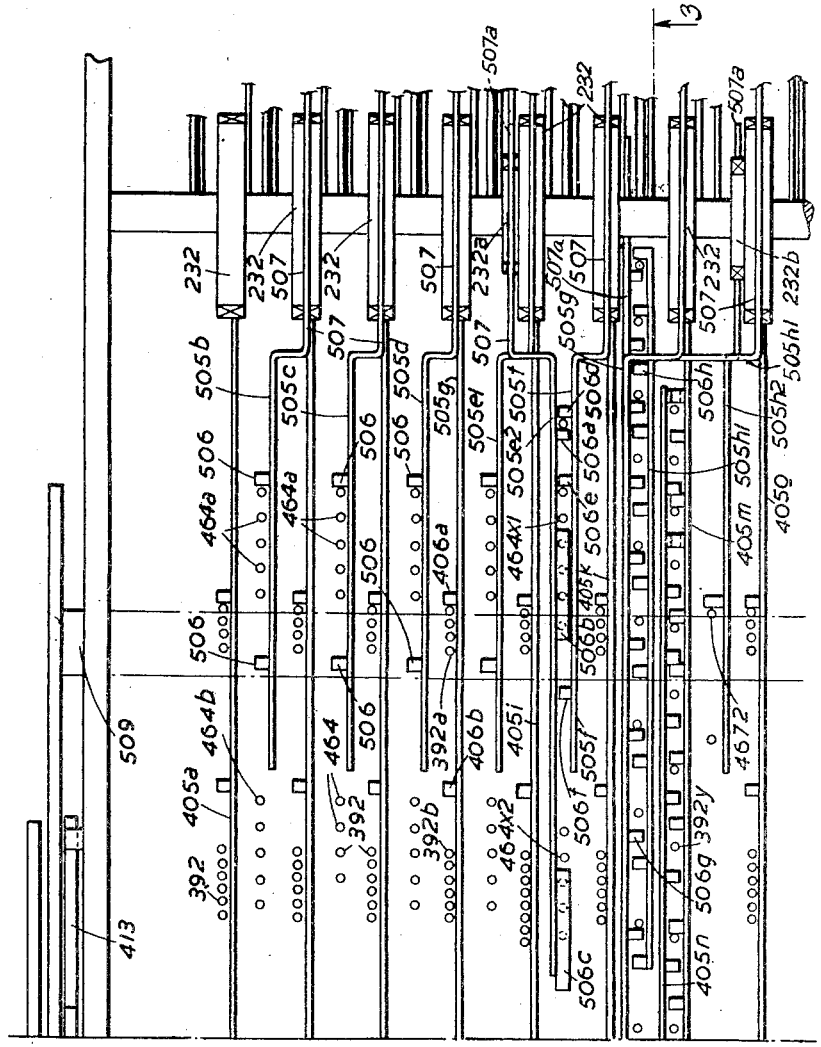

In Figs. 2A and 2B the partial product reading bars 405 in the denominations from 0001d. to units of pounds are indicated as follows:

The bar 405a receives $$\frac{\text{pence}}{10000}$$

digits derived from a multiple of a $$\frac{\text{pence}}{10000}$$

digit; the bar 405b receives $$\frac{\text{pence}}{1000}$$

digits derived from a multiple of a $$\frac{\text{pence}}{10000}$$

digit.

Bar 405c receives $$\frac{\text{pence}}{1000} \text{ from } \frac{\text{pence}}{1000}$$

Bar 405d receives $$\frac{\text{pence}}{100} \text{ from } \frac{\text{pence}}{1000}$$

Bar 405e receives $$\frac{\text{pence}}{100} \text{ from } \frac{\text{pence}}{100}$$

Bar 405f receives $$\frac{\text{pence}}{10} \text{ from } \frac{\text{pence}}{100}$$

Bar 405g receives $$\frac{\text{pence}}{10} \text{ from } \frac{\text{pence}}{10}$$

Bar 405h receives pence from $$\frac{\text{pence}}{10}$$

Bar 405i receives pence from pence
Bar 405j receives units of shillings from pence
Bar 405k receives units of shillings from units of shillings.
Bar 405l receives tens of shillings from units of shillings.
Bar 405m receives tens of shillings from tens of shillings.
Bar 405n receives units of pounds from tens of shillings.
Bar 405o receives units of pounds from units of pounds.

Referring for example to the bar 405g which receives $$\frac{\text{pence}}{10}$$

digits derived from a multiple of a $$\frac{\text{pence}}{10}$$

digit, there are disposed in operative relation to this bar six groups of stops indicated respectively at 392a, 392b, 392c, 392d, 392e, and 392f, and in some of the groups, for example 392d, for constructional reasons, some of the stops are on one side of the bar and others on the other side thereof.

For each group the bar carries a zero lug 406a, 406b ... 406f to arrest the bar by engagement with a raised stop.

Group 392a has stops representing the digits 0, 1, 2, 3; group 392b has stops representing the digits 0 and 4 to 9, and group 392c has stops representing the units digits 0, 2, 4, 5, 6, and 8 of the partial products 10, 12, 14, 15, 16, and 18.

The tens digit 1 of these partial products is represented by a stop 392g in the next column, with which co-operates the reading bar 405h for receiving pence digits derived from a multiple of $$\frac{\text{pence}}{10}$$

Group 392d has stops representing the units digits 0, 1, 2, 4, 5, 6, 7, and 8 of the partial products 20, 21, 24, 25, 27, 28, 30, and 36, the tens digits 2 and 3 being represented by stops 392h co-operating with the bar 405h.

Bar 405h has zero lugs 406g, 406h, 406i co-operating with the groups of stops associated with this bar.

The bar 405i which receives the pence digit derived from multiples of pence digits has stops 392 arranged to represent all the pence digits which may be thus obtained, while the bar 405j which receives units of shillings digits derived from multiples of pence digits has stops arranged to represent these units of shillings digits. Thus 11d.×7=77d.=6sh. 5d. is represented by a 5d. stop 392 in the group 392k associated with bar 405i and a 6/- stop 392 in the group 392l associated with bar 405j.

The bar 405k receives the units of shillings digits derived from multiples of units of shillings and has stops arranged as for the bar 405g.

The bar 405l receives the tens of shillings digits derived from multiples of tens of shillings and has stops representing the digits 0 to 8, arranged as for the bar 405h.

The bar 405m receives the tens of shillings digits derived from multiples of tens of shillings and has ten stops representing the unit digits of 10/-, i. e. 0, 1, 2, 3, 4, 5, 6, 7, 8 and 9.

The bar 405n receives the units of pounds digits derived from multiples of tens of shillings and has stops representing the digits 0 to 4 only.

The bar 405o with its associate bar and all higher denominational pairs of bars, since they handle decimal amounts, have stops arranged as for the bars 405g and 405h.

When any reading bar 405 is in its normal position each of its zero lugs 406 is at the zero position for the corresponding group of stops 392 so that when the bar is permitted to move out along the columns of stops it will be arrested by engagement of a raised stop 392 with the zero lug 406 associated with the group of stops to which said raised stop belongs. Since this zero lug was initially in the zero position for that group the movement permitted to the reading bar will represent the value of the raised stop.

The reading bars 405 are controlled by a restoring bar 407, Figs. 2A and 25, carried between two slides 408 one at each side of the machine, and engaging lugs 407a on the bars, said slides being guided for reciprocation by rollers 408a.

Each slide 408 has teeth 409 engaging a spur wheel 410 rotatable on a fixed stud 411 and secured to a spur wheel 412 meshing with teeth on another slide 413 guided for reciprocation by rollers 414. Each slide 413 is pivoted to a lever 415 pivoted to a bracket 416 and carrying at its lower end a roller 417 cooperating with a cam 418 on the mainshaft 60, with which the roller 417 is maintained in contact by a spring 419.

The amounts to which the reading bars 405 are set are transmitted to corresponding denominational partial product toothed accumulator wheels 420 by moving said wheels into engagement with rack teeth on the bars in the manner explained below.

It will be understood that the bars 405 are arranged in denominational pairs, except in the lowest and highest denominations in each of which there is only one bar.

In the partial product accumulator there is one wheel 420 for each denomination and the bar 405 which receives digits of that denomination derived from the same multiplicand denomination is formed with rack teeth 431 for engagement with the underside of the corresponding denominational wheel 420.

The bar 405 which receives digits derived from the next lower denomination is connected by a bent lug 432 to a parallel bar 433 having an offset rack portion 434 passing above the corresponding denominational wheel 420 for engagement with the top of said wheel.

As already described the logarithmic stop basket 310 reaches its uppermost position at 141° and in rising to this position has raised the partial product stops 392 representing the partial products of the original multiplicand multiplied by the units multiplier digit.

Before the basket 310 thus rises, however, the partial product accumulator wheels 420 are lowered into engagement with the lower racks 431 of the reading bars 405 by means of the following mechanism.

The accumulator wheels 420 (Fig. 26) are freely mounted on a shaft 421 carried at its end in vertically slidable bearings 423, each having pivoted to it a vertical link 422 (Fig. 1A), one at each side of the machine. At its lower end each link is pivoted to a lever 425 pivoted between its ends at 426 to the side plate and carrying at its other end a roller 427 cooperating with a cam 428 secured to the mainshaft 60 (Figs. 1A and 1B). This cam has a low portion 429 and a high portion 430 and at 114° in each cycle the roller 427 runs into the low portion 429 whereby the lever 425 rocks counterclockwise under spring action thereby lowering the partial product accumulator wheels 420 into engagement with the lower racks 431, this operation being completed at 129°.

At 141° the restoring bar 407 for the partial product reading bars moves to the left under control of the cam 418 thereby releasing the reading bars 405 to the action of their springs. The reading bars thereupon move to the left thereby winding on to each partial product wheel 420 the lower denominational digit of the partial product. At 180° the high part 430 of cam 428 engages the roller 427 and raises the accumulator wheels 420 into engagement with the upper racks 434. Then at 204° the restoring bar 407 returns the reading bars to the right whereby the upper racks 434 wind the higher denominational digits on to wheels 420. At this point the sum of the partial products of the original multiplicand multiplied by the units multiplier digit is contained in the partial product accumulator wheels 420. The wheels 420 then disengage from the racks at 249°.

For constructional reasons each accumulator wheel 420 is provided with 20 teeth, with two zero positions, the pence wheel having 24 teeth. When any wheel passes from 9 to 0 (or in the case of pence from 11 to 0) a transfer cam 650 lifts a transfer pawl 651 (Figs. 3 and 26) which normally engages over a lug 652 on the upper rack 434 whereby the upper rack is permitted to advance one unit further than the extent permitted by the stop setting.

Each upper rack is mounted on the reading bar by pins and slots 653 which permit the one unit movement of the rack relative to the bar under the action of a spring when the transfer pawl 651 is lifted. The 10/- wheel has a transfer tooth corresponding to every other tooth so that a transfer occurs when the wheel passes from 1 to 0.

Associated with each pawl 651 is a retaining latch 654 pivoted on a fixed cross rod 655 and having a tail 656 normally bearing against a rod 657 under the action of a spring 658. Rod 657 is carried between the links 422 which support the partial product wheels 420. When the links 422 rise to engage wheels 420 with the upper racks the rod 657 is lifted clear of the tails 656 of latches 654 whereby the springs 658 hold the latches with their lugs 659 against the tails 660 of pawls 651.

If any pawl 651 is lifted by its transfer cam 650 the associated latch 654 rocks clockwise to bring its lug 659 below the tail 660 of the latch, thereby retaining the latter in the lifted position. When the links 422 descend to return the wheels 420 to their neutral position the rod 657 descends also and rocks the latch 654 counterclockwise thereby bringing its lug 659 clear of the tail 660 of the pawl 651 which thereupon returns to its normal position under the action of a spring 661.

It will be understood that it may be required to enter digits from three sources into the units of pounds partial product wheel, namely from units of shillings, tens of shillings and units of pounds.

A digit derived from tens of shillings is entered by bar 405n and a digit derived from units of pounds is entered by bar 405o.

In order to enter a digit derived from units of shillings the mechanism shown in Fig. 36 is provided.

The highest units of pounds digit derived from units of shillings is £4. (9/-×9=81/-). The units of shillings translator wires are therefore wired to four stops, 392x (Fig. 36) representing 0, 1, 2, and 3 pounds respectively. No stop is provided for £4 because the reading element associated with these stops has a maximum travel equal to four units.

Mounted beside the bar 405n which receives units of pounds from tens of shillings is a slide 1405 carrying pins 670 engaging slots 671 in bar 405n, the slide 1405 being urged to the left in Fig. 36 relatively to bar 405n by a spring (not shown).

Bar 405n is cut away at 672 and into this cut away portion project four lugs 673, 674, 675, and 676. Pivoted to bar 405n are four latches 677, 678, 679, 680 each disposed above a respective one of the stops 392x.

When the bars 405 are restored, the lug 673 is in engagement with latch 677, lug 674 is one step behind latch 678, lug 675 is two steps behind latch 679 and lug 676 is three steps behind latch 680.

The maximum travel of bar 405n is four units since 10/-×9=£4.10.0. Accordingly the underside of each latch is made long enough to remain in effective cooperation with the associated stop 392x in any position of bar 405n. A nose 681 on each latch engages the pivot pin of the next latch to the left to prevent the latch from dropping down into engagement with any stop 392x which has not been raised, a stop pin 682 being provided for the extreme left hand latch 680.

The slide 1405 has a lug 683 co-operating with the restoring bar 407 which restores the slide 1405 together with the reading bars 405.

If there is no units of pounds digit derived from units of shillings, the zero stop 392x will be raised and will maintain latch 677 in front of lug 673 so that no relative movement of slide 1405 and bar 405n is possible, and in the movement of restoring bar 407 to the left, bar 405n and slide 1405 will move to the left an amount representing the units of pounds digit derived from tens of shillings.

If, for example, the units of pounds digit derived from units of shillings is £3. then the No. 3 stop 392x will be raised thereby lifting latch 680 and the zero stop will be lowered, so that slide 1405 will move to the left relatively to bar 405n until arrested by engagement of lug 676 with latch 680.

Lug 676 is normally three steps behind latch 680, so this relative movement causes slide 1405 to advance relatively to bar 405n an amount representing £3. thereby adding this £3. to the units of pounds digit represented by the movement of bar 405n.

The rack 433 which passes over the units of pounds wheel 420 is carried by the slide 1405, which, together with bar 405n forms a compound reading bar.

If the movement of slide 1405 is to represent £4. none of the stops 392x is raised and slide 1405 moves to the maximum extent permitted by the slots 671, this maximum movement representing £4.

After the partial products of the original multiplicand multiplied by the units multiplier digit have been entered into the partial product accumulator wheels 420 the sum thus obtained is transferred to a result accumulator by means of the following mechanism.

To the left of the partial product accumulator 420 there is mounted on a fixed shaft 440 the wheels 441 of the result accumulator (Fig. 26) and passing between the two accumulators is a series of vertical result bars 442. Each bar 442 is formed with rack teeth 443 at its front lower edge which co-operate with, but are normally out of engagement with a corresponding series of toothed wheels 444 which are permanently in mesh with rack teeth 445 on punch setting slides 446 hereinafter described.

At its upper end each bar 442 carries a branch 447 which passes up behind the corresponding result accumulator wheel 441 and is formed with rack teeth 448 on its front edge for engagement with the result wheels 441. The upper end of the bar 442 itself is formed with rack teeth 449 and 450 respectively which co-operate with the result wheels 441 and with the partial product wheels 420 respectively. The result bars 442 are urged downwardly by individual springs 442a and are restored upwardly by a restoring bar 491.

In order to permit the rack teeth of the bars 442 to engage with the proper set of wheels 420, 441, or 444 when required, the bars 442 are formed with longitudinal slots 451 (Figs. 1A and 3) through which pass transverse rods 452 fixed at their ends to a pair of vertical bars 453 one at each side of the machine, the bars 442 being thus mounted for vertical sliding movement relative to the rods 452.

Pivoted to each end of the lower rod 452 is a lever 454 pivoted to the machine frame at 455 and at 456 to a push rod 457 guided for horizontal reciprocation by a pin and slot connection 458 to the frame and carrying a roller 459 engaging a cam 460 on the main shaft 60, whereby at each revolution of the main shaft the bars 453 are rocked about the upper rod 452 which, in addition to being fixed to the bars 453, is pivotally mounted in the side frames of the machine.

Passing through openings 490 in each side of the machine frame are the ends of a restoring bar 491 for the result bars 442 and each end of this restoring bar is slidably mounted in a slot 492 in the corresponding bar 453 so that as bars 453 rock so the restoring bar 491 can rock with them and remain in operative relation with the result bar 442.

The restoring bar 491 is pivoted near each end inside the machine frame at 493 (Figs. 1A and 31) to a link 494 pivoted at its lower end 495 to a lever 496 pivoted to the machine frame at 497 and having its other end pivoted to a lever 498 pivoted to the machine frame at 499 and carrying a roller 500 co-operating with a cam 501 on the mainshaft 60.

From 249° to 258° the result bars 442 are rocked clockwise under control of cam 460 to bring their rack teeth 450 into engagement with the partial product accumulator wheels 420. The restoring bar 491 for the result bars then moves down from 267° to 297° under control of cam 501 during which time the result bars 442 move down under the action of their spring 442a until arrested by the partial product wheels 420 reaching zero.

The rocking of the result bars 442 into engagement with the partial product wheels 420 brings the teeth 448 on the branches 447 into mesh with the result wheels 441 so that the above described downward movement of the result bars transfers the amount of the partial product to the result accumulator.

Then from 306° to 315° the result bars 442 rock counterclockwise into their normal position and from 324° to 354° the result bars are restored by the upward movement of the restoring bar 491.

Thus at the end of the third cycle the product of the original multiplicand multiplied by the units whole number multiplier digit is contained in the result accumulator.

During the next (fourth) cycle the tens multiple of the multiplicand is to be multiplied by the tens multiplier digit and the resulting product transferred into the result accumulator.

The tens multiple of the original multiplicand is computed as follows:

Mounted in each fixed section 324 in the logarithmic stop basket 310 is an additional column of tens multiple stops 461 (Figs. 16 to 19) representing the digits 0 to 9, and, in the case of pence, the digits 0 to 11, of which the lower ends have an arithmetical spacing while their upper ends are spaced logarithmically. These stops are arranged in a single column without being staggered and are conveniently disposed alongside the three columns of multiplicand stops in each decimal group and in the same column as the 10 and 11 stops in the pence group.

Each of the multiplicand reading bars 91 is provided with a second lug 462 (Figs. 3 and 19) which is offset from the reading bar so as to be in the plane of the lower ends of the tens multiple stops 361 and is positioned on the reading bar so that when the bar moves forward to a stop in the arithmetical stop basket 45 representing a given digit the offset lug 462 is positioned below the tens multiple stop 461 corresponding to that digit.

Accordingly when, at 321° in the second cycle the logarithmic stop basket 310 moved to its lowermost position, not only were the stops 322 set but also the tens multiple stops 461 by engagement with the offset lugs 462.

The upper ends of the tens multiple stops 461 are in register with the lower ends of wires 463 (Fig. 24) in the translator 390 which, when actuated, set up in stops indicated by the generic reference 464 (Fig. 2B) formed by the upper ends of the wires 463 the tens multiple of the stop setting.

Considering a decimal denomination, e. g., the units of pounds, the digits of the tens multiples are the same as the original digits but are located in the next higher denomination.

There is thus no column of stops 464 for the $$\frac{d.}{10000}$$

denomination, the lowest denominational column being that for $$\frac{d.}{1000}$$

which has stops representing the digits 0 to 9 arranged in two groups 464a and 464b.

A similar column of stops is provided for the $$\frac{d.}{100}$$

and $$\frac{d.}{10}$$

denominations and each of these three columns co-operates with a tens multiple reading bar 505b, 505c, and 505d respectively, each bar having two zero lugs 506 to arrest the bar by engagement with one or other of the stops of the two groups associated with the bar, these bars being spring urged to the left in Fig. 2B.

Each of the above three bars has an offset rack portion 507 passing above the correspondingly denominational tens multiple accumulator wheel 232, the wheels being mounted so that they can be raised into engagement with the racks 507.

There are two pence bars, one 505e1, for receiving tens multiple of $$\frac{d.}{10}$$

and one 505e2, for receiving the pence digits derived from tens multiples of pence.

Pence bar 505e1, has a rack portion 507a passing below a gear wheel 232a attached to the pence wheel 232, but having half the diameter thereof, the pitch of the stops 464c with which bar 505e1 co-operates being half that of the stops 464a. The reason for this construction will become apparent later. Pence bar 505e2, has an offset rack portion 507 passing over the half diameter pence wheel 232a.

In the pence denomination two digits arise out of each tens multiple, the multiples being as follows:

|  | s. | d. |
|---|---|---|
| 1d. × 10 | 0 | 10 |
| 2d. × 10 | 1 | 8 |
| 3d. × 10 | 2 | 6 |
| 4d. × 10 | 3 | 4 |
| 5d. × 10 | 4 | 2 |
| 6d. × 10 | 5 | 0 |
| 7d. × 10 | 5 | 10 |
| 8d. × 10 | 6 | 8 |
| 9d. × 10 | 7 | 6 |
| 10d. × 10 | 8 | 4 |
| 11d. × 10 | 9 | 2 |

It will be noted that these multiples fall into two groups indicated by the space between them in the above table, and that in each group the difference between successive pence digits is −2 while the difference between two successive shillings digits is +1.

This property of the tens multiples of pence is made use of according to the invention to permit a single column of stops 464x, each having a compound shillings and pence value, to be read by two tens multiple reading bars 505e2, and 505f.

The column of stops 464x is arranged in two groups 464x1, and 464x2, the stops 464x1 having the values 0sh. 10d., 1sh. 8d., 2sh. 6d., 3sh. 4d., 4sh. 2d., and 5sh. 0d. while the stops 464x2 have the values 5sh. 10d., 6sh. 8d., 7sh. 6d., 8sh. 4d., and 9sh. 2d.

Bar 505e2, is spring urged to the right in Fig. 2B, and has three zero lugs 506a, 506b and 506c.

Adjacent to bar 505e2, and on the other side of the column of stops 464x is a bar 505f for reading the units of shillings digits of tens multiples of pence. Bar 505f is spring urged to the left and has three zero lugs 506d, 506e and 506f. Bar 505f also passes above the units of shillings wheel 232 and has a rack portion 507.

A single column of stops 464g is provided for the tens multiples of the units of shillings digits. In this column (Fig. 2B) there are a nought stop and nine value stops as follows: 10/−, £1, £1.10/−, £2, £2.10/−, £3, £3.10/−, £4, and £4.10/−.

Co-operating with this single column of stops 464g are two reading bars, one 505g, for tens of shillings and the other, 505h1, for units of pounds. The tens of shillings bar 505g has nine zero lugs 506g of which the second, fourth, sixth and eighth are normally just behind the £1, £2, £3, and £4 stops 464g respectively, while the first, third, fifth, seventh and ninth zero lugs are normally one unit of movement of the bar behind the 10/−, £1.10/−, £2.10/−, £3.10/−, and £4.10/− stops. Thus if a stop 464g representing an even amount of pounds is raised, the tens of shillings reading bar 505g will not move, whereas if the 10/− stop or any stop representing pounds and ten shillings is raised then the tens of shillings reading bar 505g will move one stop. This bar 505g is spring urged in the same direction as the pence bar 505e2, that is, to the right in Fig. 2B. Also bar 505g has an offset rack portion 507 passing over the 10/− wheel 232.

On the other side of this column of stops 464g there is disposed a units of pounds reading bar 505h1 which has nine zero lugs 506h of which the first lug is normally just in front of the 10/− stop 464g, while the second and third zero lugs are one unit of movement in front of the £1 and £1.10/− stops respectively, and so on.

The units of pounds reading bar 505h1 is spring urged in the opposite direction from the tens of shillings bar 505g, i. e. in the same direction as bars 505b, 505c, hence the zero lugs 506h on the former bar are referred to above as being in front of the stops 464g while the zero lugs 506g on the latter bar 505 g are referred to as being behind the stops. Bar 505h1 has an offset rack portion 507 passing over the units of pounds wheel 232.

With the above described arrangement, if the 10/− stop is raised the units of pounds reading bar 505h1 will not move, but if any of the stops representing an amount of pounds, or pounds and shillings is raised, then the units of pounds reading bar 505h1 will move to an extent representing that amount of pounds. For example, if either the £2 stop or the £2.10/- stop is raised, the units of pounds bar will move two steps in each case.

In order to handle the tens multiple of 10/- two stops 464z are provided representing 0 and £5 respectively and have a reading bar 505h2 with a zero lug 506i. This bar has an offset rack portion 507a passing under and co-operating with a half diameter wheel 232b connected to the units of pounds wheel 232, and the pitch of the stops 464z is half that of the remaining stops.

The remaining tens multiple reading bars are the same as the bar 505b.

A common restoring bar 509 is provided for all the tens multiple reading bars 505, the bars which move from right to left to take a setting from the tens multiple stops 464 being restored by movement of bar 509 from left to right, while the pence bar 505e2, and the tens of shillings bar 505g, which move from left to right to take a setting from the stops are restored by movement of bar 509 in the opposite direction.

The restoring bar 509 is carried between the slides 408 which actuate the restoring bar 407 for the partial product reading bars and engages lugs 511 on the tens multiple bars such as 505b which are spring urged to the left and lugs 512 on the pence and tens of shillings bars 505e2 and 505h1, which are spring urged to the right.

The accumulator wheels 232 are so mounted that they can not only be raised into engagement with the offset racks 507 but can be lowered into engagement with the racks 507a.

At 114° in the third cycle the tens multiple accumulator wheels 232 are lowered into engagement with the lower racks 507a on the tens multiple reading bars 505e1 and 505h2 and from 129° to 141° the logarithmic stop basket 310 rises in the manner already described, whereby the tens multiple stops 464 are set to the tens multiple of the value of the original multiplicand read from the card. From 141° to 162° the restoring bar 509 moves to the left whereby all the tens multiple reading bars, except bars 505e2 and 505g, move to the left under the action of their springs until arrested by the respective stops 464. Bars 505e2 and 505g are positively moved to the left by the restoring bar 509 against the action of their springs, this being a restoring movement of bars 505e2 and 505g.

During the movement of the bars to the left, the rack portions 507a of bars 505e1 and 505h2 are in engagement with the wheels 232a, 232b, respectively, and accordingly these bars enter on to the respective accumulator wheels 232 the amounts to which these bars are set by the stops.

If, for example, the pence multiplicand digit is 4d. then the 3sh. 4d. tens multiple stop in group 464x1 will be raised. Accordingly, during the movement of the reading bars to the left the units of shillings bar 505f will move three stop pitches to the left until arrested by engagement of its zero lug 506e with the right hand side of the 3sh. 4d. stop.

Also if the units of shillings digit of the multiplicand is 5, then the £2.10.0 stop will be raised, and when the restoring bar 509 moves to the left, the units of pounds reading bar 505h1 will move to the left under spring action until arrested by engagement of one of its zero lugs 506h with the right hand side of the £2.10.0. stop.

After the restoring bar 509 has completed its movement to the left, the wheels 232 are raised into engagement with the upper racks 507 and the restoring bar 509 then returns to the right.

During the return movement of the restoring bar 509 to the right the bars 505e1 and 505h2 which pass below the wheels, are out of engagement therewith; but the rack portion 507 of bar 505e2 which passes over wheel 232a is in engagement with said wheel. As restoring bar 509 returns to the right, bar 505e2 moves to the right under spring action until arrested by engagement of its zero lug 506b with the left hand side of the 3sh. 4d. stop, which is the stop which was engaged by the units of shillings bar 505f during the leftward movement of the latter. This movement of bar 505e2 is therefore equal to two stop pitches, and turns wheel 232a clockwise by an equivalent amount. Wheel 232a is however half the diameter of the pence wheel 232 to which it is fixed and accordingly the pence wheel 232 is turned through four teeth, whereby 4d. is entered.

Thus altogether the 3 stop pitch movement of the shillings bar 505f turns the shilling wheel through three teeth during movement of the bar 505f to the left, the 2 stop pitch movement of bar 505e2 to the right turns the pence wheel four teeth.

During movement of restoring bar 509 to the right the rack portion 507 of the tens of shillings bar 505g, which passes over the 10/- wheel 232, is in engagement with said wheel. As the restoring bar 509 returns to the right, bar 505g moves to the right under spring action until arrested by engagement of one of its zero lugs 506g with the left hand side of the £2.10.0. stop, which is the stop which was engaged by the units of pounds bar 505h1 during the leftward movement of the latter. During the righward movement of bar 505g until arrested by the £2.10.0. stop the rack portion 507 of said bar enters 1 unit (=10/-) on to the 10/- wheel 232.

At the same time bar 505h1 is restored to the right and enters two units (£2.) onto the units of pounds wheel 232. Also the remaining tens multiple bars which have racks 507 passing above the wheels are restored and enter their amounts on to the respective wheels.

The return of restoring bar 509 completely to the right restores all the tens multiple reading bars, except bars 505e2 and 505g, which are restored by the advance of the restoring bar 509 to the left in the next cycle, during which movement of bar 509 the reading bars, with the exception of 505e2 and 505g take a new setting from the stops.

Since, during such restoration of bar 505e2 a new stop may have been set, which would obstruct the restoration of bar 505e2, the zero abutments 506b, 506c, on said bar, are made as latches (Fig. 25) pivoted to the bar at 1506 and urged by springs 2506 into the path of the stops so that during the restoration of the bar 505e2 to the left the abutment latches can slip over any stop which may have been raised.

The rise and fall of the tens multiple accumulator 232 is effected by the following mechanism (Fig. 1B).

The wheels 232 are freely mounted on a shaft 465 supported in the ends of two vertical links 466, one at each side of the machine. At its lower end each link 465 is pivoted to a lever 468 which is pivoted between its ends to the machine frame at 469 and is hinged at its other end by a pin 470 and slot 471 to the lever 425 co-operating with the cam 428 which controls the partial product accumulator 420.

At 114° the low part 429 of the cam 428 engages the roller 427 and the accumulator wheels 232 are lowered into engagement with the lower racks 507a and then at 180° the high part 430 of cam 428 engages roller 427 and raises wheels 232 into engagement with the upper racks 507.

Since the machine is provided with mechanism for handling tenths of one penny, transfer mechanism is required between the pence and units of shillings wheels 232, but not between any other wheels. This transfer mechanism may be of any usual form.

During the third cycle the sum of the partial products of the original mutliplicand multiplied by the units whole number multiplier digit is entered into the result accumulator 441 and the tens multiple of the original multiplicand is entered into the tens multiple accumulator 232.

It will be remembered that at 240° in the second cycle the escapement pawl tube 282 moved into engagement with the tens whole number multiplier setting finger 261 but that at that moment the escapement bar 251 did not move because it was restrained by engagement with the multiplier reading bars.

As already described, in the third cycle, the restoring bar 95 returns the multiplier reading bars 92 to the zero position at 50°. In this position the bars 92 are out of contact with the face of the escapement bar 251 which accordingly jumps under the action of its spring until arrested by engagement with the pawl tube 282. When so arrested the wide slot 271 in the escapement bar is opposite the tens multiplier reading bar 92 and the remaining multiplier reading bars are prevented from moving forward when released by the restoring bar 95 by engagement with the face of the escapement bar.

At 278° in the third cycle the tens mutiple transmission bars 229 rock into engagement with the tens multiple wheels 232, and at 297° the restoring bars 95 and 246 move out to release the reading bars 90, 91, 92, 93 to the action of their springs. The multiplicand reading bars 91 move out until arrested by the tens multiple wheels 232 reaching zero whereby the multiplicand reading bars are set to the value of the tens multiple of the original multiplicand, the tens multiple wheels being left clear.

Before the restoring bar 95 commenced to move out, the multiplier and first fraction accumulators 120, 121, 122 were raised into engagement with their respective upper racks. When the restoring bar 95 moves out the fractional multiplicand reading bars 90 remain at zero because their accumulator wheels 120 are at this time clear.

The multiplier accumulator wheels 121, 122 however, with the exception of the units whole number wheel, which was cleared at the preceding cycle, still contain the multiplier digits and since the escapement bar 251 is positioned with the wide slot 271 in register with the tens multiplier reading bar 92 the latter bar moves forward until arrested by the tens multiplier accumulator wheel 121 reaching zero.

Consequently in the fourth cycle the links 371 are positioned in accordance with the tens multiplier digit and the control plates 367 move down accordingly whereby the logarithmic stop basket 310 is permitted to move rearward to an extent corresponding to the logarithm of the tens multiplier digit.

Before the basket thus moves rearward, it was lowered, at 321° in the third cycle, to set the stops 322 in accordance with the tens mutiple of the original multiplicand, by engagement of the lower ends of the stops 322 with the lugs 355 on the multiplicand reading bars, which have been set from the tens multiple accumulator wheels 232. The setting of a stop 322 in each group represents the logarithm of the corresponding denominational digit of the tens multiple.

Thus the rearward movement of the stop basket 310 in the fourth cycle effects the addition of the logarithm of the tens multiplier digit to the logarithms of the individual digits of the tens multiple of the original multiplicand read from the card.

Later in the same cycle the high part 393 of the cam 321 lifts the frame 313 and with it the basket 310 to its uppermost position, in which the set stops 322 raise the partial product wires 391 beneath which they have been positioned, whereby the partial products arising out of multiplication of the tens multiple of the multiplicand by the tens multiplier digit are set up in the stops 392.

These partial products are then read by the reading bars 405 and transferred to the partial product accumulator 420 and thence to the result accumulator 441 in the manner already described. The result accumulator 441 therefore now contains the product of the multiplicand multiplied by the units and tens multiplier digits.

In order to provide for the necessary transfer or carry in the result accumulator 441 the following mechanism is provided (Fig. 26).

On each result wheel 441 is a transfer cam 550 cooperating with a lug 551 on a transfer pawl 552 pivoted to the machine frame at 553 and having a step 554 which normally engages a lug 555 on a transfer pawl 556 slidably mounted on the next higher denominational reading bar 405. The nose 557 of pawl 556 co-operates with the transfer cam 650 on the higher denominational partial product accumulator wheel 420 and pawl 556 is urged to the left relatively to bar 405 by a spring 558. Pawl 552 is normally held in its upper position in Fig. 26 by spring 661.

The clockwise movement of result bars 442 brings their rack teeth 450 into mesh with the partial product wheels 420 and their rack teeth 448 into mesh with the result wheels 441. The restoring bar 491 then descends, and springs 442a pull the result bars 442 downwardly, and if there is no transfer in the result accumulator each bar 442 will descend until arrested by the corresponding partial product wheel 420 reaching zero at which point the transfer cam 650 engages the nose 557 of pawl 556 which is held stationary by engagement of its lug 555 with the stop 554 on the transfer pawl 552.

If a transfer occurs from a given denomination of the result unit to the next denomination the transfer cam 550 on the lower denominational wheel will engage the nose 551 on the pawl 552 as the said wheel passes from 9 to 0, and will thereby depress pawl 552. A latch 559 pivoted to the frame at 560 then rocks counterclockwise under the action of a spring 561 and a lug 562 on latch 559 moves over the top of pawl 552 and retains it in the depressed position.

When pawl 552 is thus depressed, the step 554 thereon is below the level of lug 555 which lug is now in line with a recess 563 in the pawl 552. Accordingly when, during descent of the next higher denominational result bar 442 the transfer cam 650 engages the nose 557 of the corresponding pawl 556, the latter will be pulled to the right against the action of its spring 558 until arrested by the lug 555 engaging the right hand face of the recess 563 thereby permitting the higher denominational partial product wheel 420 to turn one unit of movement beyond zero. Accordingly the higher denominational result wheel 441 will be turned one unit of movement in excess of that corresponding to the digit which stood on the corresponding denominational partial product wheel 420.

To permit the above action the springs 442a are made stronger than the springs 558.

When result bars 442 are rocked counterclockwise to disengage their racks 448, 450 from the wheels 441 and 420 respectively the spring 558 pulls the pawl 556 back to the left bringing the lug 555 out of the recess 563, thereby moving the wheel 420 forwardly to its zero position. A restoring bar 564 then rocks latch 559 clockwise, releasing the pawl 552 which is raised to its normal position by spring 661. Restoring bar 564 is carried between the links 442 which raise and lower the result wheels 441.

It will be understood that in the fourth cycle above described, the tens multiple of the contemporaneous multiplicand (or the hundreds multiple of the original multiplicand) is set up in the tens multiple stops 464 and read off therefrom and entered into the tens multiple accumulator 232 simultaneously with the entering of the partial products into the partial product accumulator 420.

Referring again to the third cycle, at 222° in that cycle the escapement pawl tube 282 is rocked and gets clear of the tens multiplier setting finger 261 but the escapement bar 251 itself does not move because it is restrained by engagement with the multiplier reading bars 92.

If there are further digits in the multiplier above the tens denomination the escapement pawl 282 will, at 240° in the cycle following that in which the first card is sensed, move until arrested by engagement of its pawl arm 285 with the hundreds multiplier setting finger 261. Then in the fourth cycle the escapement bar 251 will jump, until arrested by the escapement pawl 282 thereby positioning its wide slot 271 in register with the hundreds multiplier reading bar 92, so that at 297° in said fourth cycle the hundreds multiplier reading bar will go forward to read off from the hundreds wheel 121 of the multiplier accumulator the hundreds digit of the multiplier.

At the same time the multiplicand reading bars 91 will go forward and become set from the tens multiple accumulator 232 to the amount of the hundreds multiple of the original multiplicand and then at 321° in said fourth cycle the basket 310 descends whereby its stops 322 are set to said hundreds multiple so that in the fifth cycle the movement of the basket 310 under control of the hundreds multiplier reading bar 92 effects addition of the logarithm of the hundreds multiplier digit to the logarithms of the individual digits of the hundreds multiple of the original multiplicand.

Assuming, however, that there are no digits in the whole number multiplier above the tens denomination but that there are units and tens digits in the fractional multiplier, then in the higher denominations of the whole number multiplier, none of the fingers 261 will be set and the first finger 261 which stands in the path of the escapement pawl 282 when it is released in the third cycle will be the finger 261 in the units denomination of the fractional multiplier.

Accordingly at 240° in the third cycle the escapement pawl tube 282 will move across until arrested by engagement of its pawl arm 285 with the units fractional multiplier setting finger 261. As already explained, the escapement bar 251 does not immediately follow the pawl 282 because the bar 251 is held by engagement with the multiplier reading bars 92.

Then at 50° in the fourth cycle, during which cycle the product of the tens multiple of the original multiplicand multiplied by the tens multiplier digit is being entered into the result accumulator 441, the escapement bar 251 jumps across until arrested by the escapement pawl 282 in a position in which its wide slot 271 is in register with the units fractional multiplier reading bar 93.

At 278° in the same cycle the tens multiple transfer bars 229 would rock into engagement with the tens multiple accumulator 232 so that when the restoring bars 95 and 246 go forward the multiplicand reading bars 91 would be set to the hundreds multiple of the original multiplicand.

It is required however, that the multiplicand reading bars 91 be set to the value of the fractional multiplicand which is still contained in the second fractions accumulator 185.

Accordingly means is provided, whereby when the escapement pawl 282 passes from engagement with the setting finger 261 corresponding to the highest digit of the whole number multiplier to the setting finger corresponding to the lowest digit of the fractional multiplier, the movement of the pawl 282 initiates operation of mechanism for causing engagement of the tens multiple transfer bars 229 with the second fractional multiplicand accumulator wheels 185 instead of with the tens multiple accumulator wheels 232.

To this end the escapement pawl tube 282 carries a cam projection 475 (Fig. 11) which, as the tube passes from the setting finger 261 corresponding to the highest multiplier denomination to the setting finger corresponding to the lowest fractional multiplier denomination, engages a lug 476 on a link 477 (Figs. 1B and 11) whereby said link is lifted.

The link 477 is guided in a bracket 478 and pivoted at its lower end to a lever 479 which is pivoted to the machine frame on stud 147a.

Lever 479 controls a clutch for a cam 481 which is freely mounted on the front upper camshaft 143 outside and next to the cam 239. Pivoted to the cam 481 at 483a is a latch 483 which is normally held clear of a lug 484 on the rotating cam 239 by the end 485 of lever 479 (Figure 28).

Raising of the link 477 rocks the end 485 of lever 478 clear of the latch 483 which, under the action of a spring moves counterclockwise into the path of the lug 484. Then, as the cam 239 continues to rotate, the lug 484 engages the latch 483 and carries the cam 481 round with it.

The latch 483 is thus rocked at 240° in the third cycle but the lug 484 does not engage the latch until late in this cycle. The link 477 remains lifted until the escapement pawl 282 jumps at 240° in the next (fourth) cycle when the cam projection 475 passes beyond lug 476 on the link 476 which drops under spring action thereby releasing the latch 483. Then late in the fourth cycle, as the cam 481 rotates, the latch 483 engages the end 485 of the lever 479 and is withdrawn from engagement with lug 484 whereupon the cam 481 is arrested after completing one revolution.

The cam 481 has a high part of greater radius than that of cam 242 so that cam 481 over-rides cam 242 and at 278° rocks the tens multiple transmission bars 229 beyond their neutral position to bring the racks 233 into engagement with the wheels 185 of the second fractional multiplicand accumulator at 293°. The roller 238 on the follower lever 236 is long enough to engage all three cams 242, 239 and 481.

Accordingly when, at 297° in the fourth cycle, the multiplicand reading bars 91 go forward, they are set to the amount of the fractional multiplicand, the second fractional multiplicand accumulator 185 being cleared.

At the same time the units fractional multiplier reading bar 93 passes through the wide slot 271 in the escapement bar 251 and is set to the value of the units digit of the fractional multiplier, the corresponding accumulator wheel 122 being cleared.

Consequently in the fifth cycle the links 371 are positioned in accordance with the units digit of the fractional muliplier and the control plates 367 move down accordingly, whereby the logarithmic stop basket 310 is permitted to move forward to an extent corresponding to the logarithm of the units digit of the fractional multiplier.

Before the basket moves forward it was lowered at 321° in the fourth cycle to set the stops 322 in accordance with the value of the fractional multiplicand, by engagement of the lower ends of the stops with the lugs 355 on the multiplicand reading bars 91 which have been set from the second fractional multiplicand accumulator wheels 185.

Thus the forward movement of the stop basket 310 in the fifth cycle effects the addition of the logarithm of the units digit of the fractional multiplier to the logarithms of the individual digits of the fractional multiplicand.

Later in the fifth cycle the basket 310 moves to its uppermost position to set up the partial products in the stops 392 and the sum of the partial products is entered into the result accumulator 441 in the manner already described. The result accumulator therefore now contains the sum of the product of the whole multiplicand multiplied by the whole number multiplier plus the product of the fractional multiplicand multiplied by the units digit of the fractional multiplier.

In this fifth cycle the tens multiple of the fractional multiplicand is set up in the tens multiple stops 461 and read off therefrom and entered into the tens multiple accumulator 232 simultaneously with the entering of the partial products into the partial product accumulator 420.

It will be remembered, however, that in the fourth cycle the hundreds multiple of the whole multiplicand would have been entered into the tens multiple accumulator and that this accumulator would still hold this amount in the fifth cycle since the transfer bars 229 did not engage with the tens multiple wheels 232 and clear them in the fourth cycle but engaged with the second fractional multiplicand accumulator wheels 185 instead.

In order that the tens multiple accumulator 232 may be clear to receive the tens multiple of the fractional multiplicand in the fifth cycle, mechanism is provided for holding the tens multiple accumulator 232 in a neutral position during the cycle in which the partial products arising from multiplication by the highest significant digit of the multiplier are entered into the partial product accumulator.

Operation of this mechanism is initiated by the escapement pawl 282 when moving from the position corresponding to the highest multiplier digit to that corresponding to the lowest fractional multiplier digit.

To this end the following mechanism is provided:

Pivoted to the machine frame at 590 (Fig. 32) is a lever 591 carrying at one end a pin 592 overlying the pin 476 on the upper end of the link 477. Pivoted at the other end 593 of lever 591 is a lever 595 pivoted to the frame at 595a and to a link 594 which is pivoted by a pin and slot connection 609 to a lever 596 pivoted at 597 to a sliding block 611 and urged counterclockwise by a spring 598. Lever 596 is extended to form a latch 601 engaging a pin 599 carried by a lever 605 pivoted to the frame at 604, said latch being formed with a recess 603.

Lever 605 carries at its other end a pin 607 which is urged by a spring 608 against the upper part of lever 236.

When the escapement pawl tube 282 moves into the position corresponding to the lowest fractional multiplier digit the link 477 is raised, as already described, and its pin 476 rocks lever 591 counterclockwise whereby link 594 is held raised, this movement being permitted by the slot 609 in said link.

Then when at 278° in the third cycle levers 236 rock counterclockwise to move the bars 229 into engagement with the tens multiple wheels 232 in order to extract the tens multiple of the whole number multiplicand from the wheels 232, the lever 605 rocks counterclockwise, bringing the pin 599 below the recess 603 whereupon the spring 598 rocks latch 601 counterclockwise, thereby engaging recess 603 with pin 599.

Then when levers 236 rock back clockwise at 13° in the fourth cycle, lever 605 is positively rocked counterclockwise. The sliding block 611 has a locking nose 612 and when lever 605 is thus rocked counterclockwise it moves latch 601 and the block 611 pivoted thereto to the left and engages the nose 612 with a notch 613 formed in a vertically sliding bearing block 614 in which the corresponding end of the shaft 465 is mounted. By this means the blocks 614 and therefore the wheels 232 are locked in the neutral position of the wheels 232 in which they are out of engagement with the racks 507, 507a of the tens multiple reading bars 405.

In order to permit operation of links 466 in spite of the fact that the wheels 232 are thus locked, said links 466 are connected to their operating levers 468 by a pin and slot connection 615 (Fig. 1B).

Accordingly in the fourth cycle although the hundreds multiple of the original multiplicand is set up in the stops 461 and read therefrom by the reading bars 405 the tens multiple accumulator wheels 232 do not engage the racks of the reading bars and accordingly do not receive the hundreds multiple, but remain clear.

At 240° in the fourth cycle the escapement pawl 282 jumps into engagement with the setting finger 261 corresponding to the tens fractional multiplier denomination, thereby removing its cam projection 475 from engagement with the lug 476 on link 477 whereby the latter is restored under spring action and the lever 479 is returned by its spring into the path of the latch 483 so that in the fifth cycle the latch 483 is disengaged from the lug 484 and the overriding cam 481 is arrested after having made one revolution.

Also the restoration of link 477 to its lower position permits link 594 to descend under action of a spring (not shown) whereby latch 601 is rocked clear of the pin 599 in lever 605 thereby permitting the latter to return to its normal position, and also the block 611.

Accordingly in the fifth cycle the tens multiple transfer bars 229 revert to the control of the cam 242 and rock counterclockwise into engagement with the tens multiple wheels 232 whereby when, at 297° in said fifth cycle, the restoring bar 95 moves out, the multiplicand reading bars 91 are set to the tens multiple of the fractional multiplicand.

Further, at 50° in this fifth cycle, the escapement bar 251 jumps across into engagement with the escapement pawl 282 whereby its wide slot 271 is positioned in register with the tens fractional multiplier reading bar 93 so that when, at 297° in said fifth cycle the restoring bar 95 moves out, the tens fractional multiplier reading bar 93 passes through the wide slot 271 in the escapement bar 251 and is set to the value of the tens digit of the fractional multiplier, and the control plates 367 move down accordingly whereby the logarithmic stop basket 310 is permitted to move forward in the sixth cycle to an extent corresponding to the tens digit of the fractional multiplier.

Before the basket moves forward it was lowered at 321° in the fifth cycle, to set the stops 322 in accordance with the value of the tens multiple of the fractional multiplicand, by engagement of the lower ends of the stops 322 with the lugs 355 on the multiplicand reading bars which have been set from the tens multiple accumulator 232.

Thus the forward movement of the stop basket 310 in the sixth cycle effects the addition of the logarithm of the tens digit of the fractional multiplier to the logarithms of the individual digits of the tens multiple of the fractional multiplicand.

Later in the sixth cycle the stop basket 310 moves to its uppermost position to set up the partial products in the stops 392 and the sum of these partial products is entered into the result accumulator 441. The result accumulator therefore now contains the sum of the product of the whole number multiplicand multiplied by the whole number multiplier plus the product of the fractional multiplicand multiplied by the fractional multiplier (there being two digits in the whole number multiplier and two digits in the fractional multiplier in the present example). Accordingly the result accumulator 441 now contains the complete product and this product is subsequently punched, in the same card as that from which the factors were read, by means of mechanism which will be described later.

At 220° in the fifth cycle the escapement pawl 282 is rocked and since there are no further digits in the fractional multiplier the hundreds fractional multiplier finger 261 will not be set, so that the escapement pawl at 240° jumps to the limit of its travel, being arrested by engagement with the side plate 2. When the escapement pawl reaches this position the cam projection 475 thereon engages a lug 521 on a link 522 whereby said link is raised.

The lower end of link 522 is connected to a one revolution clutch which may be the same as that described in British Specification No. 490,358, whereby when link 522 is raised the selection shaft 3 is caused to make one revolution.

The lower end of link 522 is pivoted at 1522 to a lever 1523 (Figs. 1A and 1B) pivoted to the machine frame at 1524 and carrying a pin 1525 which, when lever 1523 is rocked counterclockwise by the raising of link 522, actuates a one revolution clutch similar to that shown in Figures 5, 6 and 7 of British Patent Specification No. 490,358 to clutch the selection shaft 3 to a constantly rotating member driven from the main shaft 60 through a chain and sprocket drive.

In Fig. 1A the parts of the clutch are given the same references as those parts in British Patent Specification No. 490,358, which perform similar functions but prefixed by the parts S. Latch S72 normally engages banking plate S74 and is pivoted to stop lever S69 which engages lug S68 on disc S64 thereby holding the clutch disengaged.

When lever 1523 is rocked counterclockwise the pin 1525 rocks latch S72 clear of the banking plate S74 and a spring, not shown, rocks the stop arm S69 clear of lug S68 whereby the clutch is engaged in the manner described in British Patent Specification No. 490,358.

Stop lever S69 forms one arm of a bell crank pivoted at S56 of which the other arm S78 carries a cam block S77 which is struck by the roller 76 described in Specification No. 490,358 to move the stop arm into the path of lug S68 in which position it is held by re-engagement of latch S72 with plate S74. When lug S68 strikes the stop arm S69 the clutch is disengaged as described in Specification No. 490,358 after having made one revolution.

The escapement pawl 282 raises link 522 at 240° but it is required that rotation of the selection shaft 3 shall not commence until 320°. When the stop arm S69 is rocked clear of lug S68 the spring 66 described in British Patent Specification No. 490,358 pulls disc S64 clockwise whereby the cam slots 63 force the dogs 61 (British Specification No. 490,358) into engagement with the periphery of driving disc 36. As the driving disc rotates, slots formed therein come into register with the clutch dogs, which are forced into engagement with the slots as described in British Specification No. 490,358. The time which elapses between actuation of link 522 and engagement of the dogs with the slots provides the delay of 80° required for the commencement of rotation of the selection shaft 3.

Link 522 is also pivoted at 522a to a lever 523 pivoted to the frame at 524 and at its other end 525 to a lever 526 pivoted to the frame at 527. The raising of link 522 raises also the free end 528 of lever 526 which stands in the path of a pin 529 on the latch 110 and disengages this latch from the lug 111 so that cam 103 on shaft 103 is held stationary during the one revolution of the selection shaft so that both gaps 107 and 108 in cam 102 are effective.

In order to operate the clutches for the cams 142, and 242, in the manner already described the link 522 carries an arm 245a extending under a tail 245b of lever 245, and a tail 147b of lever 147 (Fig. 28).

The selection shaft 3 starts rotating at 320° in the fifth cycle, during which cycle the product of the fractional multiplicand multiplied by the units fractional multiplier digit is entered into the result accumulator 441. In this cycle also the tens fractional multiplier reading bar 93 is set to the tens fractional multiplier digit and the tens multiple of the fractional multiplicand is set up in the logarithmic stop basket 310 as already described.

Since the selection shaft 3 is now rotating, the second card is sensed at 12° in the sixth cycle, in which cycle, as already explained, the product of the tens multiple of the fractional multiplicand multiplied by the tens fractional multiplier digit is entered into the result accumulator 441.

At 90° in said sixth cycle the pinbox 8 reaches its uppermost position as already explained in connection with the second cycle thereby setting up in the arithmetical stop basket 45 the multiplicand read from the second card, and also $$\frac{1}{960}$$

of said multiplicand.

Co-operating with the multiplier setting fingers 261 is a restoring bail 530 secured to the shaft 260 about which the fingers 261 are freely mounted and secured to the shaft 260 is an arm 531 (Figs. 11 and 14) connected by a link 532 to a lever (not shown) actuated by a cam (also not shown) secured to the selection shaft 3.

By means of this cam the restoring bail 530 is rocked clockwise from 56° to 66° in the cycle in which the second card is sensed, i. e., the sixth cycle of the series of cycles now being described whereby the setting fingers 261 are all reset and latched by their latches 264.

At 50° in the sixth cycle the tens fractional multiplier reading bar 93 is restored to zero position by the restoring bar 95 and all the bars 92 and 93 move beyond zero to the carry position. While the escapement bar 251 is thus freed from the pull of the multiplier reading bars it is restored by the restoring bar 273 actuated by the cam 281 on the selection shaft.

From 66° to 80° in the sixth cycle the cam 281 rocks the arm 274 clockwise whereby the bar 273 restores the escapement bar and holds it in the fully restored position until 165° in the same cycle.

As explained in connection with the reading of the first card, when the escapement bar 251 is in the fully restored position its wide slot 271 is in register with the units multiplier reading bar 92 and each of the seven narrower slots 270 is in register with a corresponding denominational multiplier reading bar 92 and 93.

At 96° in the sixth cycle (in which the second card is read) the cam 102 on the selection shaft 3 commences to move the restoring bar 95 rearwardly and the multiplier reading bars 92, 93 move out to take a setting from the stops 48, 49 of the arithmetical stop basket 45, this setting being the multiplier read from the second card. As already explained, the movement of the multiplier reading bars results in the setting of the fingers 261 in those denominations in which a multiplier digit occurs on the second card, this setting being effected at 100°.

For the purpose of the present description it will be assumed that the second card is punched with a multiplier containing but one digit, namely in the units whole number denomination. Consequently only one finger 261 will be set, i. e., in the units whole number multiplier denomination.

From 165° to 185° the escapement bar restoring arm 273 returns to its outermost position and at 162° the restoring bar 95 has returned the multiplier reading bars to the zero position, after which it continues to move them back to the carry position. As soon as the reading bars pass beyond the zero position the escapement bar 251 is free to move until arrested by engagement with the escapement pawl 282 in which position the wide slot 271 is in register with the units whole number multiplier reading bar.

As already explained, the forward and back movement of the reading bars 90 and 91 enters the whole multiplicand into the tens multiple accumulator 232 and $$\frac{1}{960}$$

of this amount into the second fractional multiplicand accumulator 185, while the whole number multiplier is entered in the corresponding accumulator wheel 121 there being in this example no fractional multiplier.

These operations are completed at 296° in the cycle in which the second card is sensed (the sixth cycle) in which cycle also the product of the tens multiple of the fractional multiplier from the first card multiplied by the tens fractional multiplier digit is entered into the result accumulator 441.

Since the complete product from the first card is now in the result accumulator this product can now be punched in the first card and this punching operation takes place early in the seventh cycle i. e., the fifth cycle following that in which the first card was sensed.

At 320° in the sixth cycle the selection shaft completes its revolution and would stop if there were more than one digit in the multiplier on the second card.

As pointed out above, during the cycle in which the second card is sensed $$\frac{1}{960}$$

of the multiplicand is entered into the accumulator 185. If there is no fraction in the new multiplier this entry of $$\frac{1}{960}$$

of the multiplicand into the accumulator 185 must be prevented.

To this end each fractional multiplicand reading bar 90 is formed with a recess 570 at its rear end (Figs. 1B and 30) and mounted by means of pins and slots 571, Fig. 29, on the front face of the fixed stop basket 45 is a bar 572 which is free to move up and down. This bar is formed with lugs 573 spaced so that they are below the recesses 570 in the fractional multiplicand reading bars 90.

Projecting from each of the fractional multiplier nought stops 49 is a lug 574 so positioned that when any stop 49 is down a pin 575 carried by an arm 576 is prevented from moving rearwardly by the lug 574 on said stop which is down. The arm 576 is pivoted to the machine frame at 577 and is connected by a cross rod 578 to a similar arm 576a at the other side of the machine. The arm 576a however, has no pin 575.

Pivoted to each side plate of the frame at 579 is a lever 580 carrying a roll 581 co-operating with a cam 582 on the front lower cam shaft 103, and pivoted at 583 to each lever 580 is a vertical link 584 of which the upper end has a slot 585 with which engage the projecting ends of the cross rod 578.

When the cam 582 rotates it lifts the links 584 and if there is a digit in the fractional multiplier one or more of the nought stops 49 will remain down so that the arm 576 will remain in its normal position and the links 584 will rise idly.

The links 584 normally rest against fixed studs 584a against which they are urged by springs 586. When the links 584 are lifted a recess 584b in each link comes into register with the stud 584a so that if there is no digit in the fractional multiplier, in which case all the zero stops 49 will be raised clear of the pin 575, the links 584 will be permitted to swing below the bar 572 under the action of the springs 586. Then as the links 584 continue to rise they raise the bar 572 until the lugs 573 thereon enter the recesses 570 in the fractional multiplicand reading bars, thereby preventing the latter from moving rearwardly when released by the restoring bar 95. Accordingly the entry of $$\frac{1}{960}$$

of the multiplicand into the second fractional accumulator wheels 185 is prevented. The links 584 are returned to the vertical position by engagement of cam faces 584c therein with the fixed studs 584a during descent of the links 584.

In order to effect the punching of the first card in the next following cycle the selection shaft 3 controls a one revolution clutch which may be similar to that employed on the selection shaft 3 and which, as the selection shaft approaches the end of its revolution starts up the punch shaft 540, at 300° in the cycle in which the second card is sensed.

In Fig. 1A the parts of the punch shaft clutch are given the same references as the equivalent parts in British Patent Specification No. 490,358 but prefixed by the letter P.

In order to effect engagement of the punch shaft clutch as the selection shaft 3 approaches the end of its one revolution the cam 225 on the selection shaft carries a cam block 710, which near the end of said revolution, engages a pin 711 on a lever 712 pivoted at 713 to the frame and carrying at its other end a pin 714 co-operating with the latch P72 for the stop lever P69 associated with the punch shaft clutch.

It has already been explained that at 255° in the second cycle (in which cycle the first card was sensed) the selector card stop 7 moved down and released the first card, which accordingly is fed forward to an intermediate card stop 13. While the selection shaft 3 rotates in the sixth cycle the intermediate card stop 13 opens at 195° allowing the first card to move forward until arrested by the punch card stop 541. Later at 255° the selector card stop 7 opens releasing the second card, which advances to the intermediate card stop 13 which is now closed again.

Also at 240° in the sixth cycle the picker commences to feed the third card, which is arrested by the selector card stop 7 at 285°, for sensing in the next revolution of the selection shaft. When the selection shaft 3 reaches the end of its revolution, the first card is held by the punch card stop 541 awaiting punching, the second card is held by the intermediate card stop 13 after having been sensed, and the third card is held by the selector card stop 7 awaiting sensing.

At 300° in the sixth cycle the punch shaft 540 starts, and then, at 3° in the seventh cycle a cam 542 on the punch shaft engages a roller 454b on an extension 454a of lever 454 and thereby rocks the result bars 442 into engagement with the result wheels 441. Thereafter a cam 498b (Fig. 31) on the punch shaft engages a roller 498a on the lever 493 whereby the restoring bar 491 is caused to descend, whereby the result bars 442 and therefore the punch setting slides 446 are set to the value of the product computed from the first card.

Each setting slide 446 carries a lug 543 which passes over a column of wires 544 in a punch connection box 545 to select for operation the appropriate punch 14 in the column, the arrangement being the same as that described in Specification No. 516,553 and including set bars 546 between the lower ends of wires 544 and the punches 14.

At 15° the punch dies 548 commence to rise, reaching their top position at 75° at which time the first card is punched. The dies immediately descend reaching their bottom position at 135°. The punch card stop 541 then opens, releasing the first card, which is ejected to a receiver by the feed rolls 6b.

From 99° to 108° the result bars 442 rock out of mesh with the result wheels 441 leaving them clear and from 108° to 138° the restoring bar 491 raises the result bars to their normal position.

At 222° in the sixth cycle the escapement pawl 282 rocks and since there is only one digit in the multiplier of the second card and consequently only the units finger 261 is set, the pawl 282 will jump across to its fullest extent thereby initiating another revolution of the selection shaft 3.

At 297° in the sixth cycle the restoring bar 95 moves out and the units multiplier reading bar 92 passes through the wide slot 271 in the escapement bar 251 and is set to the value of the units digit of the multiplier read from the second card. At 321° in the same cycle the logarithmic stop basket 310 is lowered, whereby its stops 322 are set to represent the logarithms of the individual digits of the multiplicand read from the second card.

Early in the seventh cycle the control plates 367 descend and the logarithmic stop basket 310 moves forward to an extent representing the logarithm of the units digit of the multiplier read from the second card.

Since the selection shaft 3 is still rotating, the third card is sensed at 12° in the same cycle and at 90° in said cycle the pinbox 8 reaches its uppermost position, thereby setting up in the arithmetical stop basket 45 the value of the whole multiplicand and the multiplier read from the third card.

At 68° in this seventh cycle the multiplier setting fingers 261 are restored by bail 530 actuated by the selection shaft 3, and at 50° the multiplier reading bars 92 are restored to zero position by their restoring bar 95 and move beyond zero to the carry position. While the escapement bar 251 is thus freed from the pull of the reading bars it is restored fully to the right together with the escape pawl 282, thereby bringing its wide slot 271 in register with the units multiplier reading bar 92 and each of the seven narrower slots 270 in register with a corresponding denominational multiplier reading bar 92 or 93.

As already explained at 75° in this seventh cycle the first card is punched.

At 96° in the seventh cycle the cam 102 on the selection shaft 3 commences to move the restoring bar 95 rearwardly and the multiplier reading bars 92, 93 are free to move out to take a setting from the stops 48, 49 of the arithmetical stop basket 45 this setting being the multiplier read from the third card. As already explained, the movement of the multiplier reading bars results in the setting of the fingers 261 in those denominations in which a multiplier digit occurs on the third card, this setting being effected at 100°.

For the purpose of the present description it will be assumed that the third card also is punched with a multiplier containing but one digit, namely in the whole number units denomination.

From 165° to 180° the escapement bar restoring arm 273 returns to its outermost position whereupon the escapement pawl moves to the left until arrested by its arm 285 engaging the units whole number finger 261 and at 162° the restoring bar 95 has returned the multiplier reading bars to the zero position after which it moves them back to the carry position at 165°. As soon as the reading bars pass beyond the zero position the escapement bar 251 is free to move until arrested by engagement with the escapement pawl 282 in which position the wide slot 271 is in register with the whole number units multiplier reading bar 92.

As already explained, the forward and back movement of the reading bars enters the whole multiplicand read from the third card into the tens multiple accumulator 232 while the whole number multiplier is entered into the corresponding accumulator 121.

As already mentioned, early in this seventh cycle, the logarithmic stop basket 310 advances to an extent representing the logarithm of the units digit of the multiplier read from the second card, and, later in the cycle, the stop basket 310 moves to its uppermost position to set up in the stops 392 the partial products derived from the second card and the sum of these partial products is entered into the result accumulator 441. Since there is only one digit in the multiplier on the second card this sum is the complete product for that card.

At 222° in the seventh cycle the escapement pawl 282 is rocked and since there are no further digits in the multiplier on the third card the escapement pawl jumps to the limit of its travel and the cam projection thereon initiates a further revolution of the selection shaft 3.

At 255° in the sixth cycle the selector card stop 7 moved down and released the second card which was accordingly fed forward to the intermediate card stop 13. While the selection shaft 3 rotates in the seventh cycle the intermediate card stop 13 opens at 195° allowing the second card to move forward until arrested by the punch card stop 541. Later, at 255° in the seventh cycle the selector card stop 7 opens, releasing the third card, which advances until arrested by the intermediate card stop 13.

At 300° in the seventh cycle the punch shaft 540 commences another revolution and at 3° in the eighth cycle, the cam 542 on the punch shaft rocks the result bars into engagement with the result wheels 441 and the restoring bar descends, whereby the result bars and therefore the punch setting slides 446 are set to the amount of the product computed from the second card. At 75° in the eighth cycle the punch dies 547, 548 reach their top position and the second card is punched. The punch card stop 541 then opens releasing the second card which is ejected to the receiver by the feed rolls 6b.

From 99° to 108° the results bars rock out of mesh with the result wheels 441 leaving them clear and from 108° to 138° the restoring bar raises the result bars to their normal position.

At 222° in the seventh cycle the escapement pawl 282 rocks and since there is only one digit in the multiplier of the third card and consequently only the units finger 261 is set the pawl will jump across to its fullest extent, thereby initiating another revolution of the selection shaft 3.

At 297° in the seventh cycle the restoring bar 95 moves out and the units multiplier reading bar 92 passes through the wide slot 271 in the escapement bar 251 and is set to the value of the units digit of the multiplier read from the third card. At 321° in the same cycle the logarithmic stop basket 310 is lowered, whereby its stops 322 are set to represent the logarithms of the individual digits of the multiplicand read from the third card.

Early in the eighth cycle the control plates 367 descend, and the logarithmic stop basket 310 moves forward to an extent representing the logarithm of the units digit of the multiplier read from the third card.

Since the selection shaft 3 is still rotating the pinbox performs a sensing operation at 12° in the eighth cycle and assuming that the third card was the last card, this sensing operation will be idle.

The sensing of "no card" in the eighth cycle sets knock-off mechanism to stop the machine but the machine must not be permitted to stop at the end of the eighth cycle because the third card will not have been punched. Accordingly the sensing of "no card" is arranged to set mechanism for stopping the machine at the end of the cycle next following that in which "no card" is sensed. This mechanism forms no part of the invention and will not be described in detail but may conveniently comprise a ratchet actuated by a pawl which is rocked at each cycle of the mainshaft but is normally held clear of the ratchet by a shield, the shield being withdrawn by the action of the "no card" sensing pin so that the pawl feeds the ratchet one tooth in the cycle in which no card is sensed. In the next cycle the pawl feeds the ratchet another tooth whereby a pin on the ratchet actuates the knock-off mechanism to stop the machine at the end of said next cycle.

The shield may be released to lift the pawl off the ratchet again by means of a link connected to the starting button the ratchet being returned to normal position by a spring.

At 66° in this eighth cycle the multiplier setting fingers 261 are reset by the bail 530 actuated by the selection shaft 3 and at 50° the multiplier reading bars are restored to zero position and move beyond zero to the carry position. While the escapement bar 251 is thus freed from the pull of the reading bars it is restored fully to the right thereby bringing its wide slot 271 into register with the units multiplier reading bar and each of the seven narrower slots 270 into register with the corresponding denominational multiplier reading bar.

As already explained, at 75° in this eighth cycle the second card is punched.

At 96° in the eighth cycle the cam 102 on the selection shaft 3 commences to move the restoring bar 95 rearwardly but in this cycle the multiplier reading bars do not move out as no stops have been set in the arithmetical stop basket 45. Accordingly none of the multiplier setting fingers 261 is set.

Later in the eighth cycle the escapement bar restoring arm 273 returns to its outermost position and since no fingers 261 are set the escapement pawl 282 jumps to the limit of its travel and its cam projection holds the link raised to initiate another cycle of the selection shaft at 320°. At 162° the restoring bar 95 has returned to the zero position, after which it continues to return, taking the reading bars with it to the carry position. As soon as the reading bars pass beyond the zero position, the escapement bar 251 is free to move, and since no finger 261 have been set and the escapement pawl 282 has already jumped to the full extent of its travel the escapement bar follows this movement.

Early in the eighth cycle, the logarithmic stop basket 310 advances to an extent representing the logarithm of the units digit of the multiplier read from the third card and later in the cycle the stop basket 310 moves to its uppermost position, to set up the partial products in the stops 392 and the sum of these partial products is entered into the result accumulator 441. Since there is only one digit in the multiplier on the third card this sum is the complete product for that card.

At 222° in the eighth cycle the escapement pawl is rocked, but is already at the extreme limit of its travel since no fingers 261 were set, and the cam projection thereon initiates a further revolution of the selection shaft 3.

At 225° in the seventh cycle the selector card stop 7 moved and released the third card which was accordingly fed forward to the intermediate card stop 13. While the selection shaft 3 rotates in the eighth cycle, the intermediate card stop 13 opens at 195° allowing the third card to advance until arrested by the punch card stop 541.

At 255° in the eighth cycle the punch shaft 540 commences another revolution and at 3° in the ninth cycle the cam on the punch shaft rocks the result bars into engagement with the result wheels 441 and the restoring bar descends whereby the punch setting slides 446 are set to the amount of the product computed from the third card. At 75° the third card is punched and is then ejected to the receiver.

At 12° in the ninth cycle the pinbox makes an idle sensing stroke and during the remainder of the cycle the machine performs idle operations. The escapement pawl is rocked at 222° and since no fingers 261 are set the pawl initiates another revolution of the selection shaft 3. Also at 300° the punch shaft 540 starts another revolution.

At the end of this ninth cycle the machine stops automatically with the selection shaft 3 having performed 40° of its revolution and the punch shaft having performed 60° of its revolution.

Assuming now that the machine is restarted with a new stack of cards in the magazine and that the first card has a multi-digit multiplier.

Since the selection shaft and punch shaft clutches were in engagement when the machine stopped, these shafts continue to revolve when the machine is started again.

At 12° in the first of the new series of cycles the pinbox senses no card, whereby the knock-off mechanism is set to stop the machine at the end of the next cycle. At 75° in this first cycle the punch dies effect an idle punching operation. Since no fingers 261 have been set the escapement pawl will initiate another revolution of the selection shaft at 320°.

At 240° in the first cycle the picker commences to feed the first card of the new batch which is arrested by the selector card stop 7 at 285°. Also at 300° in the first cycle the punch shaft 540 commences another revolution.

Then at 12° in the second cycle the first card is sensed and during this cycle its amounts are entered into the respective accumulators. Also at 100° in the second cycle the multiplier setting fingers 261 are set.

At 165° in the second cycle the escapement bar restoring arm 273 returns and the escapement pawl moves into engagement with the units while number multiplier setting fingers 261 thereby positioning the wide slot 271 in the escapement bar in register with the units reading bar 83.

At 222° the escapement pawl is rocked and moves into engagement with the tens setting finger 261. As already explained however, the escapement bar 251 remains in the units position and does not jump into the tens position until the reading bars are restored to the carry position in the next cycle.

Since the escapement pawl is thus unable to jump to the limit of its travel the selection shaft clutch is disengaged at 320° in the second cycle and remains disengaged. At 300° however, the punch shaft commenced a further revolution and goes on rotating until its clutch is disengaged at 300° in the third cycle.

During the latter part of the second cycle the units multiplier reading bar moves forward to an extent representing the units multiplier digit and the stops in the logarithmic stop basket 310 are set to the value of the multiplicand read from the first card.

As the knock-off mechanism was set in the first cycle by the sensing of "no card" the machine stops at the end of the second cycle, and to continue the operations the operator restarts the machine. The machine then commences the third cycle, the selection shaft 3 remaining stationary, but the punch shaft continues to complete the revolution which started in the second cycle.

Since, during the second cycle, the first card was sensed, the knock-off mechanism was not set and accordingly the machine does not stop at the end of the third cycle but continues its operations on the first and succeeding cards of the new batch in the manner already described. The punch shaft however, stops at 300° in the third cycle.

I claim:

1. A multiplying machine having factor entering cycles including in combination a logarithmic multiplicand set-up device having denominational columns of set-up elements settable to represent the logarithm of the individual digits of a multiplicand, a multiplier set-up device having denominational columns of set-up elements settable to represent the arithmetical values of the individual digits of a multiplier, means for moving the multiplicand set-up device as a whole from a datum position beyond zero position in a direction parallel to its columns at each multiplying cycle, a plurality of abutments each disposable in the path of the multiplicand set-up device and in advance of the datum position by a distance representing the logarithm of a different multiplier digit, and means operative in successive machine cycles under the control of each column of multiplier set-up elements in turn, to dispose in the path of the multiplicand set-up device the one of said abutments which represents the logarithm of the contemporaneous multiplier digit, whereby on arrest of the multiplicand set-up device by said abutment each of the multiplicand set-up elements which has been set to represent logarithmically a multiplicand digit is positioned in advance of the normal position of the zero element in the same column by a distance equal to the logarithm of the partial product of the said multiplicand digit and the contemporaneous multiplier digit, means for converting the logarithmic partial products into their arithmetical values, and means for accumulating the arithmetical partial products.

2. A multiplying machine of the character described and having factor entering and multiplying cycles including in combination a logarithmic multiplicand set-up device having denominational columns of set-up elements settable to represent the logarithms of the individual digits of a multiplicand, a multiplicand register, means operable in each factor-entering cycle to enter a multiplicand into said register, means operative in each multiplying cycle to set the logarithmic multiplicand set-up device from said register, and means also operative in each multiplying cycle, after said set-up device has been set from said register, to enter into said register the tens multiple of the contemporaneous multiplicand, whereby, in the first multiplying cycle, the logarithmic set-up device is set from the multiplicand register to the value of the multiplicand, and, in each subsequent multiplying cycle, said logarithmic set-up device is set, also from said multiplicand register, to the value of the tens multiple of the multiplicand employed in the preceding cycle.

3. A multiplying machine of the character described having multiplying and factor entering cycles including in combination denominational columns of arithmetical stops, means operable in each factor-entering cycle to enter the multiplicand into said stops, a corresponding plurality of denominational reading bars, a multiplicand register associated with said bars, means operative in each factor-entering cycle to permit said reading bars to take a setting from said stops, means also operative in each factor-entering cycle to transfer the setting of said reading bars to the multiplicand register, means operative at each multiplying cycle to transfer to the reading bars the amount held in the multiplicand register, a vertically movable frame, a stop basket movable horizontally in said frame, a plurality of denominational columns of logarithmic multiplicand stops mounted in said basket, said stop basket constituting the logarithmic multiplicand set-up device, the lower ends of the stops in each column being spaced arithmetically in line above the path of the corresponding denominational reading bar while their upper ends are spaced logarithmically, a lug on each reading bar disposable by movement of the reading bar during transfer thereto of an amount held in the multiplicand register, under the logarithmic stop appropriate to the corresponding denominational digit of the multiplicand, actuating means for said vertically movable frame, said actuating means operating to lower said frame after the reading bars have been set from the multiplicand register whereby the logarithmic stops are set by engagement of their lower ends with the lugs on the reading bars, and said actuating means then operating to raise said frame, and multiplier set up means operative after said frame is raised, to advance the stop basket within the frame from a datum position parallel to the direction of its column of stops an extent representing the logarithm of a multiplier digit, whereby this logarithm is added to the logarithms of the multiplicand digits set up in said stops.

4. A multiplying machine including multiplicand reading bars, a multiplicand register associated with said bars and a vertically movable frame, means for entering into the multiplicand register the tens multiple of the contemporaneous multiplicand including a tens multiple stop basket fixed in the vertically movable frame, a plurality of denominational columns of logarithmic tens multiple stops housed in said basket, the lower ends of the stops in each column being spaced arithmetically in line parallel to the path of the corresponding denominational multiplicand reading bar, while the upper ends of said stops are spaced logarithmically, a lug on each multiplicand reading bar, each of said lugs being disposable by movement of its associated reading bar during transfer thereto of the amount held in the multiplicand register, under the tens multiple stop appropriate to the corresponding denominational digit of the multiplicand, corresponding columns of tens multiple translator wires of which the lower ends are disposed above the corresponding tens multiple stops, while their upper ends are spaced to represent the tens multiples of the values represented by the corresponding stops, a plurality of corresponding denominational tens multiple reading bars settable from said translator wires, and means operative in each multiplying cycle to transfer the settings of said tens multiple reading bars to the multiplicand register after the multiplicand reading bars have been set from said register.

5. A multiplying machine according to claim 3 wherein the multiplier set-up means is in the form of a stop basket having denominational columns of multiplier stops, the machine including also denominational multiplier reading bars settable from said stops, a multiplier register, means for transferring the setting of said reading bars to said register, means operative in each multiplying cycle to engage said reading bars with their respective register wheels, an escapement mechanism operative in each multiplying cycle to permit each reading bar to advance in turn, one at each multiplying cycle, while in engagement with its respective register wheel, until arrested by arrival of its register wheel at zero, a vertically movable plate formed with arithmetical steps and with corresponding logarithmic steps, a setting member disposable by each multiplier reading bar in turn in the path of said arithmetical steps whereby said plate is set in successive multiplying cycles to the value of the contemporaneous multiplier digit, said logarithmic steps being so located with respect to said arithmetical steps that when any arithmetical step engages the setting member the corresponding logarithmic step is positioned to arrest the logarithmic stop basket during its advance from the datum position.

6. In a multiplying machine having multiplying and factor entering cycles a logarithmic multiplicand set up device comprising a stop basket movable horizontally from a datum position beyond zero position to positions representative of the logarithms of multiplier digits, and, mounted in said basket, a plurality of columns of logarithmic multiplicand stops, a multiplier set-up device including a stop basket having denominational columns of multiplier stops, denominational multiplier reading bars settable from said stops, a multiplier register, means for transferring the setting of said reading bars to said register, means operative in each multiplying cycle to engage said reading bars with their respective register wheels, an escapement mechanism operative in each multiplying cycle to permit each reading bar to advance in turn, one at each multiplying cycle, while in engagement with its respective register wheel, until arrested by arrival of its register wheel at zero, a vertically movable plate formed with arithmetical steps and with corresponding logarithmic steps, a setting member disposable by each multiplier reading bar in turn in the path of said arithmetical steps whereby said plate is set in successive multiplying cycles to the value of the contemporaneous multiplier digit, said logarithmic steps being so located with respect to said arithmetical steps that when any arithmetical step engages the setting member the corresponding logarithmic step is positioned to arrest the logarithmic stop basket during its advance from the datum position.

7. A multiplying machine according to claim 3 for multiplying an amount expressed in a non-uniform notation by a whole number and a fraction including a dividing mechanism operative under the control of the multiplicand entering means at each factor-entering cycle to divide the multiplicand by a predetermined divisor, a fractional multiplicand accumulator, means operative under control of said dividing mechanism to enter the quotient computed therein into said fractional multiplicand accumulator, normally ineffective means for blocking entry into the multiplicand register of the tens multiple of the contemporaneous multiplicand, means for detecting the last of a number of multiplying cycles equal to the number of digits in the integral portion of the multiplier, means responsive to said detecting means, when it detects said last multiplying cycle, to render said blocking means effective, normally ineffective means for transferring the quotient from the fractional multiplicand accumulator to the multiplicand register, and means responsive to said detecting means, when it detects said last multiplying cycle, to render said transferring means effective, whereby in the next following cycle the logarithmic set-up device is set to the amount of said quotient for multiplication by the lowest denominational digit of a number representing the fractional portion of the multiplier.

8. A multiplying machine having multiplying and factor entering cycles for multiplying an amount expressed in a non-uniform notation by a whole number and a fraction including multiplicand entering means, a multiplicand register, a logarithmic set-up device, a dividing mechanism operative under the control of the multiplicand entering means at each factor-entering cycle to divide the multiplicand by a predetermined divisor, a fractional multiplicand accumulator, means operative under control of said dividing mechanism to enter the quotient computed therein into said fractional multiplicand accumulator, means operative in each multiplying cycle to enter into said register the tens multiple of the contemporaneous multiplicand, normally ineffective means for blocking entry into the multiplicand register of the tens multiple of the contemporaneous multiplicand, means for detecting the last of a number of multiplying cycles equal to the number of digits in the integral portion of the multiplier, means responsive to said detecting means, when it detects said last multiplying cycle, to render said blocking means effective, normally ineffective means for transferring the quotient from the fractional multiplicand accumulator to the multiplicand register, and means responsive to said detecting means, when it detects said last multiplying cycle, to render said transferring means effective, whereby in the next following cycle the logarithmic set-up device is set to the amount of said quotient for multiplication by the lowest denominational digit of a number representing the fractional portion of the multiplier.

9. A multiplying machine according to claim 1 wherein the means for converting the logarithmic partial products to their arithmetical values comprises a connection box having denominational columns of wires, each column including wires representing the partial products of all the digits from 1 to 9, the lower ends of the wires being spaced logarithmically above the path of the corresponding column of set up elements in the logarithmic multiplicand set up device while their upper ends are spaced arithmetically and branched to represent the higher and lower denominational digits of the partial products, partial product accumulator wheels, reading bars for reading off the partial product digits from the upper ends of said connection box wires, the reading bar which reads off one denominational digit from a column of partial product wires passing below the corresponding denominational accumulator wheel, an offset portion on the bar which reads off the other denominational digit, said offset portion passing above the wheel of next higher denomination, rack teeth on said reading bar and on said offset portion, means for engaging the accumulator wheels with one set of rack teeth before the reading bars move out from zero, and with the other set of rack teeth after the reading bars have been set from the connection box wires, whereby one digit of each partial product is entered into the accumulator during the outward movement of the reading bars and the other digit is entered into the accumulator during the return movement of the bars.

10. A multiplying machine according to claim 3 wherein the multiplier set up means includes settable denominational multiplier reading bars and an escapement mechanism operative in each multiplying cycle to permit each multiplier reading bar to advance in turn, one at each multiplying cycle, and including a restoring bar for controlling the advance of the multiplier reading bars, a restoring bar for controlling the advance of the multiplicand reading bars means for effecting two operations of both said restoring bars in each factor-entering cycle, and means rendering the escapement mechanism ineffective during the first of said two operations of said restoring bars, whereby in a single machine cycle, the entering of the two factors takes place during the first operation of said restoring bars and a multiplying operation takes place during the second operation of said restoring bars.

11. A multiplying machine according to claim 6 wherein the logarithmic multiplicand set up device also includes denominational multiplicand reading bars and means to advance said bars, and including a restoring bar for controlling the advance of the multiplier reading bars, a restoring bar for controlling the advance of the multiplicand reading bars means for effecting two operations of both said restoring bars in each factor-entering cycle, and means rendering the escapement mechanism ineffective during the first of said two operations of said restoring bars, whereby in a single machine cycle, the entering of the two factors takes place during the first operation of said restoring bars and a multiplying operation takes place during the second operation of said restoring bars.

12. A multiplying machine according to claim 4 for handling sterling multiplicands, including a single column of stops representing tens multiples of pence multiplicand digits, a pence reading bar spring urged in one direction to take a setting from said stops, and a units of shillings reading bar spring urged in the opposite direction to take a setting from said stops, whereby movement of the pence reading bar up to one of said stops represents the pence digit of a tens multiple of a pence multiplicand digit and movement of the units of shillings reading bar up to the opposite side of the same stop represents the units of shillings digit of the tens multiple of the same pence multiplicand digit.

13. A multiplying machine including a single column of stops representing tens multiples of pence multiplicand digits, a pence reading bar spring urged in one direction to take a setting from said stops, a unit of shillings reading bar spring urged in the opposite direction to take a setting from said stops whereby movement of the pence reading bar up to one of said stops represents the pence digit of a tens multiple of a pence multiplicand digit and movement of the units of shillings reading bar up to the opposite side of the same stop represents the units of shillings digit of the tens multiple of the same pence multiplicand digit, a restoring bar common to both the pence and the units of shillings reading bars, said restoring bar being movable in one direction to restore one of said reading bars while permitting the other of said reading bars to take a setting from the stops, and said restoring bar returning in the opposite direction to restore said last mentioned reading bar while permitting said first mentioned reading bar to take a setting from the stops, accumulator wheels, and means for engaging said accumulator wheels with said reading bars during the return of the restoring bar.

14. A multiplying machine having multiplying and factor entering cycles of operation including multiplicand storage means, means for entering a multiplicand into the storage means in each factor entering cycle, logarithmic set-up means, means for setting said logarithmic means from said storage means in each multiplying cycle the latter being reset to zero thereby, and means operative in each multiplying cycle for reentering the multiplicand into the tens denominationally shifted position of said storage means whereby in a first multiplying cycle said logarithmic set-up means is set from said multiplicand storage means to the value of the multiplicand and in subsequent multiplying cycles said logarithmic set-up means is also set from said multiplicand storage means to the value of the tens multiple of the multiplicand employed in the preceding cycle.

15. A multiplying machine including in combination mechanism for setting up the logarithms of the individual digits of a multiplicand, mechanism for setting up successively in consecutive multiply cycles the logarithms of the individual digits of a multiplier, means operative under the joint control of both said set up mechanisms, in each multiplying cycle, to add the logarithms of the contemporaneous multiplier digits to the logarithms of the individual multiplicand digits, whereby the logarithms of a series of partial products are obtained, means for converting said logarithmic partial products into their arithmetical values, and means for accumulating the arithmetical partial products, said multiplicand logarithm set up mechanism comprising a stop basket and mounted therein a plurality of columns of logarithmic multiplicand stops, the basket being movable under control of said multiplier logarithm set up mechanism, parallel to said columns an extent representing the logarithm of a multiplier digit whereby this logarithm is added to the logarithms of the multiplicand digits set up in said stops, and said means for converting the logarithmic partial products to their arithmetical values comprising a connection box having denominational columns of wires, each column including wires representing the partial products of all the digits from 1 to 9 multiplied by all the digits from 1 to 9, the lower ends of the wires being spaced logarithmically above the path of the corresponding column of stops in the logarithmic stop basket while their upper ends are arranged arithmetically and branched to represent the higher and lower denominational digits of the partial products.

16. A multiplying machine of the character described having multiplying and factor-entering cycles including in combination denominational columns of arithmetical stops, means operable in each factor-entering cycle to enter the multiplicand into said stops, a corresponding plurality of denominational reading bars a multiplicand register associated with said bars, means operative in each factor-entering cycle to permit said reading bars to take a setting from said stops, means also operative in each factor-entering cycle to transfer the setting of said reading bars to the multiplicand register, means operative at each multiplying cycle to transfer to the reading bars the amount held in the multiplicand register, a vertically movable frame, a stop basket movable horizontally in said frame, a plurality of denominational columns of logarithmic multiplicand stops mounted in said basket, said stop basket constituting the logarithmic multiplicand set up device, the lower ends of the stops in each column being spaced arithmetically in line above the path of the corresponding denominational reading bar while their upper ends are spaced logarithmically, a lug on each reading bar disposable by movement of the reading bar during transfer thereto of an amount held in the multiplicand register, under the logarithmic stop appropriate to the corresponding denominational digit of the multiplicand, actuating means for said vertically movable frame, said actuating means operating to lower said frame after the reading bars have been set from the multiplicand register whereby the logarithmic stops are set by engagement of their lower ends with the lugs on the reading bars, and said actuating means then operating to raise said frame, multiplier set up means operative after said frame is raised, to advance the stop basket within the frame from a datum position parallel to the direction of its column of stops, and means for converting the logarithmic partial products to their arithmetical values comprising a connection box having denominational columns of wires, each column including wires representing the partial products of all the digits from 1 to 9 multiplied by all the digits from 1 to 9, the lower ends of the wires being spaced logarithmically above the path of the corresponding column of stops in the logarithmic stop basket while their upper ends are arranged arithmetically and branched to represent the higher and lower denominational digits of the partial products.

17. In a multiplying machine having multiplying and factor-entering cycles a logarithmic multiplicand set up device comprising a stop basket movable horizontally from a datum position beyond zero to positions representative of the logarithms of multiplier digits, and, mounted in said basket a plurality of columns of logarithmic multiplicand stops, a multiplier set up device including a stop basket having denominational columns of multiplier stops, denominational multiplier reading bars settable from said stops, a multiplier register, means for transferring the setting of said reading bars to said register, means operative in each multiplying cycle to engage said reading bars with their respective register wheels, an escapement mechanism operative in each multiplying cycle to permit each reading bar to advance in turn, one at each multiplying cycle, while in engagement with its respective register wheel, until arrested by arrival of its register wheel at zero, a vertically movable plate formed with arithmetical steps and with corresponding logarithmic steps, a setting member disposable by each multiplier reading bar in turn in the path of said arithmetical steps whereby said plate is set in successive multiplying cycles to the value of the contemporaneous multiplier digit, said logarithmic steps being so located with respect to said arithmetical steps that when any arithmetical step engages the setting member the corresponding logarithmic step is positioned to arrest the logarithmic stop basket during its advance from the datum position, means for converting the logarithmic partial products to their arithmetical values comprising a connection box having denominational columns of wires, each column including wires representing the partial products of all the digits from 1 to 9 multiplied by all the digits from 1 to 9, the lower ends of the wires being spaced logarithmically above the path of the corresponding column of stops in the logarithmic stop basket while their upper ends are arranged arithmetically and branched to represent the higher and lower denomination digits of the partial products.

18. A multiplying machine including in combination mechanism for setting up the logarithms of the individual digits of a multiplicand, mechanism for setting up successively in consecutive multiplying cycles, the logarithms of the individual digits of a multiplier, means operative under the joint control of both said set up mechanisms, in each multiplying cycle, to add the logarithms of the contemporaneous multiplier digit to the logarithms of the individual multiplicand digits, whereby the logarithms of a series of partial products are obtained, means for converting said logarithmic partial products into their arithmetical values, means for accumulating the arithmetical partial products, said multiplicand logarithm set up mechanism comprising a stop basket and mounted therein, a plurality of columns of stops, the basket being movable under control of said multiplier logarithm set up mechanism parallel to said columns an extent representing the logarithm of a multiplier digit whereby this logarithm is added to the logarithms of the multiplicand digits set up in said stops, and said means for converting the logarithmic partial products to their arithmetical values comprises a connection box having denominational columns of wires, each column including wires representing the partial products of all the digits from 1 to 9 multiplied by all the digits from 1 to 9, the lower ends of the wires being spaced logarithmically above the path of the corresponding column of stops in the logarithmic stop basket while their upper ends are arranged arithmetically and branched to represent the higher and lower denominational digits of the partial products, partial product accumulator wheels, reading bars for reading off the partial product digits from the upper ends of said connection box wires, the reading bar for reading off one denomination digit from a column of partial product wires passing below the corresponding denominational accumulator wheel, an offset portion on the bar for reading off the other denominational digit, said offset portion passing above the wheel of next higher denomination, rack teeth on said reading bar and on said offset portion, means for engaging the accumulator wheels with one set of rack teeth before the reading bars move out from zero, and with the other set of rack teeth after the reading bars have been set from the connection box wires, whereby one digit of each partial product is entered into the accumulator during the outward movement of the reading bars and the other digit is entered into the accumulator during the return movement of the bars.

19. A multiplying machine of the character described having multiplying and factor-entering cycles including a drive shaft mechanism for feeding cards punched with holes representing the factors to be multiplied, a reciprocable pin box for sensing said cards, stop means settable from said pin box, movable reading bars controlled by said stop means, a selection shaft for operating said card feeding mechanism and said pin box, a one revolution clutch for connecting said selection shaft to said drive shaft mechanism, an escapement mechanism operative in each multiplying cycle to permit each reading bar to advance in turn, one at each multiplying cycle, said escapement mechanism including a setting finger disposed to be moved to a "set" position when its associated multiplier reading bar moves away from its zero position, an escapement pawl movable in each multiplying cycle from the "set" finger associated with the multiplier reading bar which is to be effective in the next cycle to the next "set" finger, and means operable by said pawl, on leaving the last "set" finger, to effect engagement of the one revolution clutch, said escapement mechanism further including an abutment on each multiplier reading bar, an escapement bar, a spring tending to maintain said escapement bar in engagement with said escapement pawl whereby said bar tends to follow the step by step movement of said pawl, said escapement bar standing in the path of the abutments on the multiplier reading bars to prevent movement thereof and having a slot disposable in register with a different multiplier reading bar at each successive position to which the escapement bar moves under control of its pawl, whereby only the multiplier reading bar which is in register with said slot is permitted to move, the restoring bar for the multiplier reading bars operating to restore said bars to an extent sufficient to relieve the pressure of said reading bars on the scapement bar and thereby permit the latter to move up to its pawl under the action of its spring.

GEORGE EDWARD FORD.

REFERENCES CITED

The following references are of record in the file of this patent:

UNITED STATES PATENTS

| Number | Name | Date |
|---|---|---|
| 2,083,947 | Furber | June 15, 1937 |
| 2,374,374 | Neidich | Apr. 24, 1945 |
| 2,379,169 | McClure | June 26, 1945 |
| 2,432,569 | Gleser et al. | Dec. 16, 1947 |
| 2,467,419 | Avery | Apr. 19, 1949 |

FOREIGN PATENTS

| Number | Country | Date |
|---|---|---|
| 366,203 | Great Britain | Feb. 4, 1932 |
| 423,189 | Germany | Dec. 24, 1925 |
| 450,247 | Germany | June 4, 1926 |
| 490,358 | Germany | Aug. 12, 1938 |